US009460327B2

(12) United States Patent
Kamiya

(10) Patent No.: US 9,460,327 B2
(45) Date of Patent: Oct. 4, 2016

(54) RFID TAG MOVEMENT DISTINGUISHING METHOD AND RFID TAG MOVEMENT DISTINGUISHING PROGRAM

(75) Inventor: Hajime Kamiya, Tokyo (JP)

(73) Assignee: MIGHTY CARD CORPORATION, Tokyo (JP)

( * ) Notice: Subject to any disclaimer, the term of this patent is extended or adjusted under 35 U.S.C. 154(b) by 327 days.

(21) Appl. No.: 14/131,450

(22) PCT Filed: Jul. 12, 2012

(86) PCT No.: PCT/JP2012/067832
§ 371 (c)(1),
(2), (4) Date: Mar. 4, 2014

(87) PCT Pub. No.: WO2013/008886
PCT Pub. Date: Jan. 17, 2013

(65) Prior Publication Data
US 2014/0167920 A1    Jun. 19, 2014

(30) Foreign Application Priority Data

Jul. 12, 2011   (JP) .................................. 2011-154261
Aug. 30, 2011   (JP) .................................. 2011-186974

(51) Int. Cl.
*G06K 7/10*   (2006.01)
*G01S 13/58*   (2006.01)
(Continued)

(52) U.S. Cl.
CPC ........... *G06K 7/10366* (2013.01); *G01S 13/52* (2013.01); *G01S 13/58* (2013.01); *G01S 13/76* (2013.01); *G01S 13/505* (2013.01); *G01S 13/78* (2013.01)

(58) Field of Classification Search
CPC ........ G01S 13/52; G01S 13/58; G01S 13/76; G01S 13/78; G01S 13/505; G01S 13/84; G06K 7/0008; G06K 7/10; G06K 7/10366; G06K 19/0723; G06K 7/00; G06K 7/10108; H04Q 5/22; H04W 8/005; G06F 17/00; G08C 19/16

USPC .............. 340/10.1, 10.4–10.5; 342/104, 118, 342/127, 147, 159

See application file for complete search history.

(56) References Cited

U.S. PATENT DOCUMENTS 7,817,014 B2   10/2010   Krishna et al.
2008/0129461 A1*   6/2008   Abraham ............. G06K 7/0008
340/10.1

(Continued)

FOREIGN PATENT DOCUMENTS

JP   2006-260062 A   9/2006
JP   2006-330861 A   12/2006

(Continued)

OTHER PUBLICATIONS

International Search Report of PCT/JP2012/067832 mailed on Aug. 21, 2012.

*Primary Examiner* — Brian Wilson
(74) *Attorney, Agent, or Firm* — Typha IP LLC

(57) ABSTRACT

Provided are an RFID tag movement distinguishing method and an RFID tag movement distinguishing program with which are an RFID tag that has moved in front of an antenna and an RFID tag that is static are identified. Chronological read data of RFID tags including a moving RFID tag and a static RFID tag is acquired by an RFID reader, and the static RFID tag is specified by a static RFID tag filter based on information of read RFID tags. In the RFID tag movement distinguishing method, the static RFID tag filter identifies the moving RFID tag by identifying the static RFID tag and the moving RFID tag using an individual static RFID tag filter among a quick-read filter, an RSSI absolute value filter, an RSSI non-contiguous increase filter, an RSSI valley-shaped filter, an excess read filter, a phase shift reduction filter, and a vertical direction movement filter.

5 Claims, 44 Drawing Sheets

(51) Int. Cl.
*G01S 13/76* (2006.01)
*G01S 13/52* (2006.01)
*G01S 13/50* (2006.01)
*G01S 13/78* (2006.01)

(56) References Cited

U.S. PATENT DOCUMENTS

2010/0109903 A1* 5/2010 Carrick ............... G01S 5/14
340/8.1

2010/0214073 A1 8/2010 Kasai et al.

FOREIGN PATENT DOCUMENTS

| JP | 2007-303935 A | 11/2007 |
| JP | 2009-80133 A | 4/2009 |
| JP | 2009-129072 A | 6/2009 |
| JP | 2009-276939 A | 11/2009 |
| JP | 2010-055254 A | 3/2010 |
| WO | 2008-146520 A | 12/2008 |

* cited by examiner

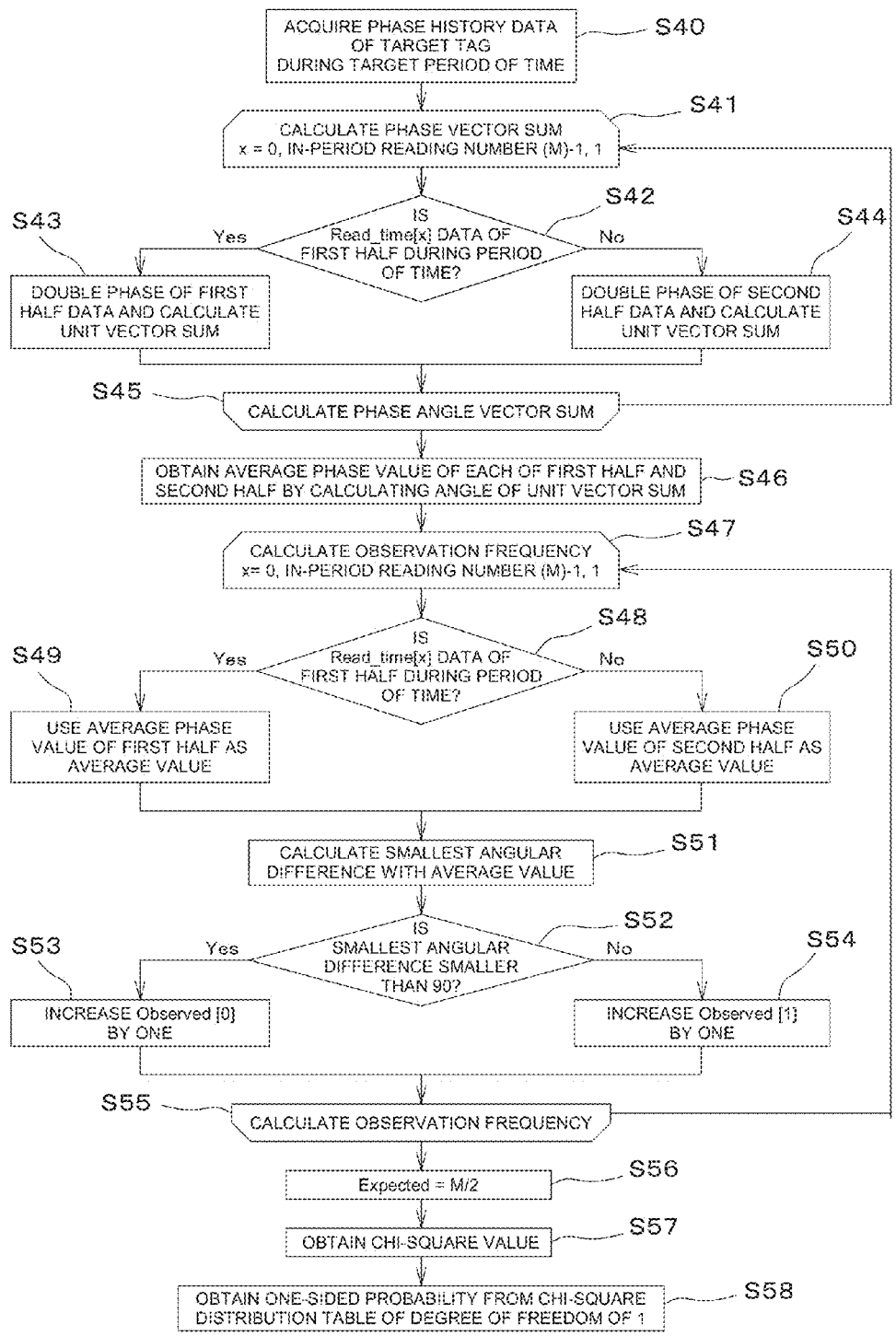

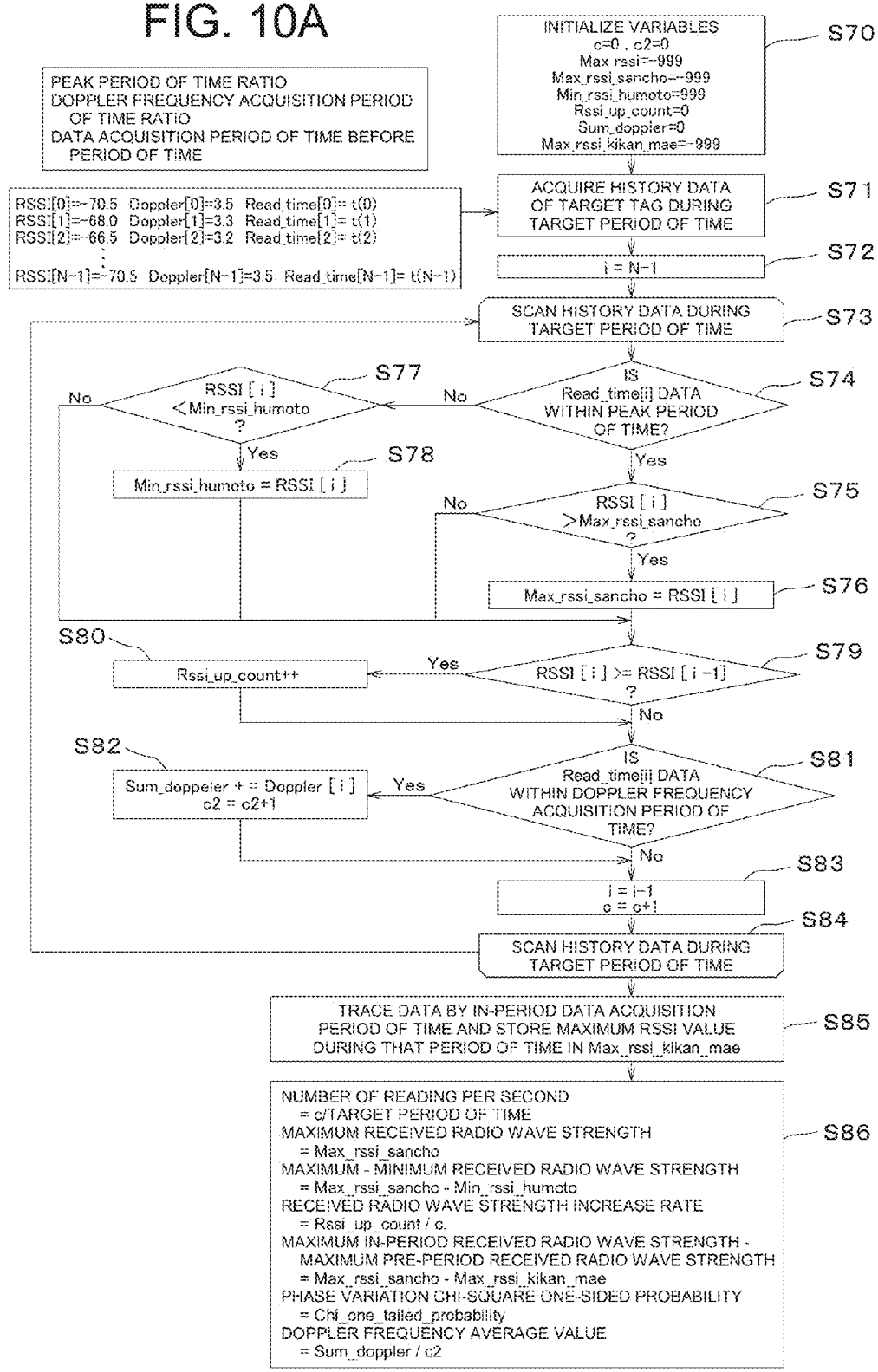

FIG. 12A
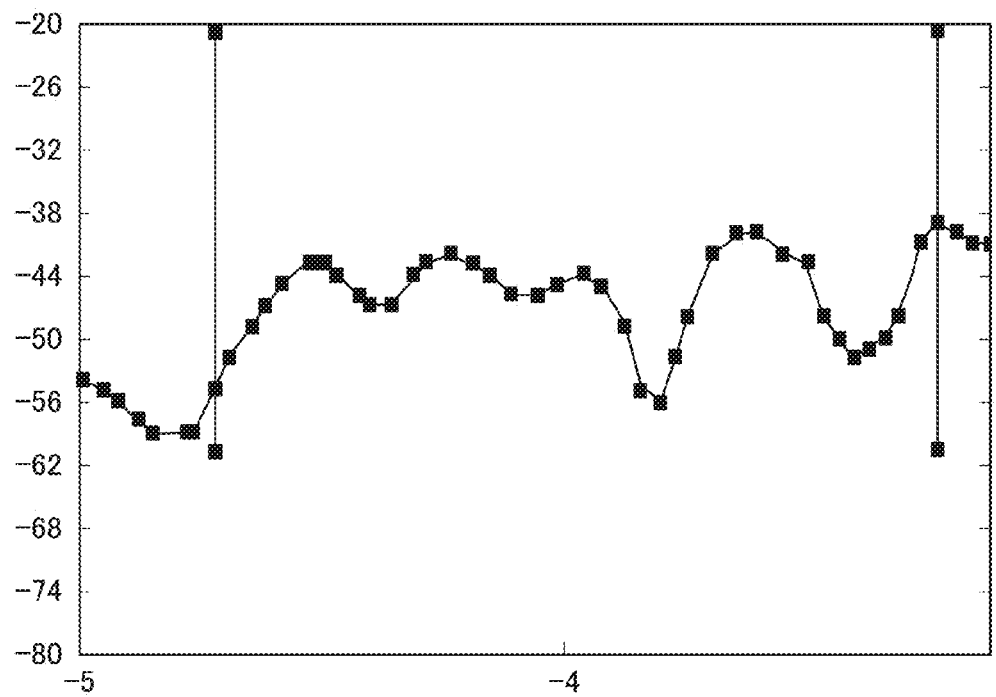
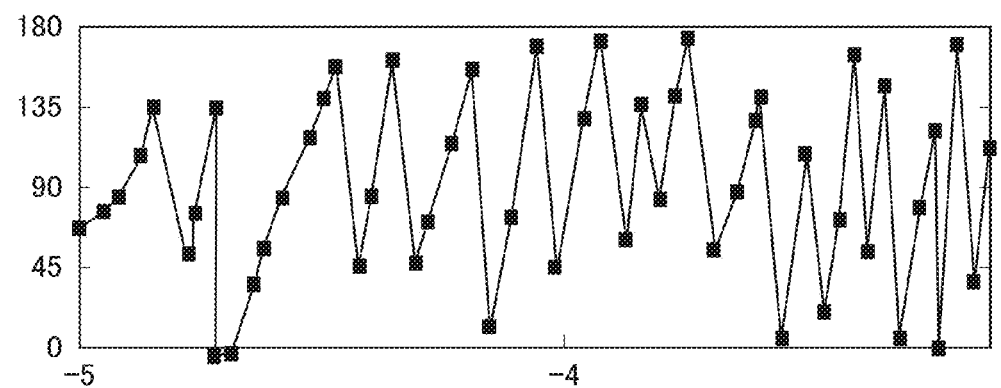

FIG. 13C
(A)
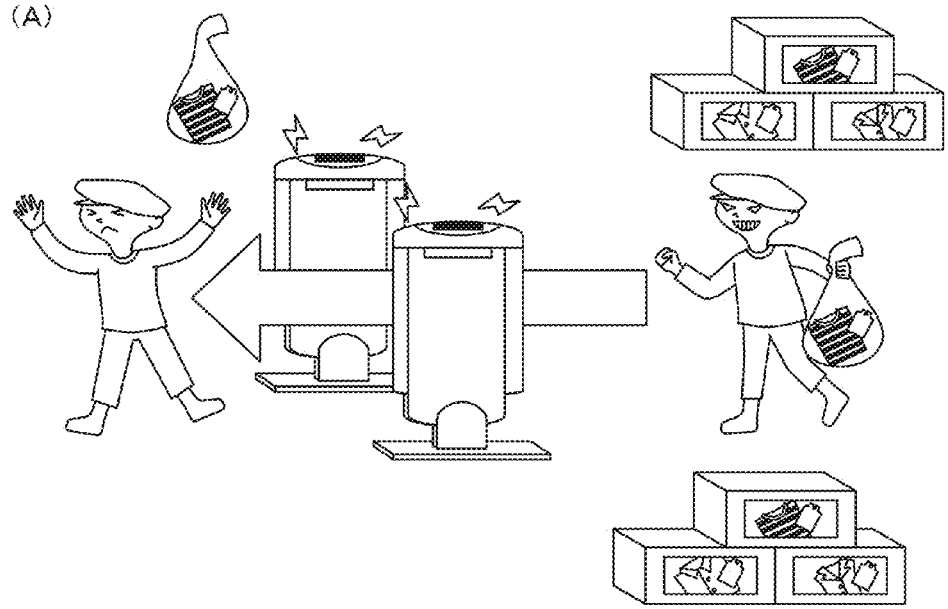
(B)
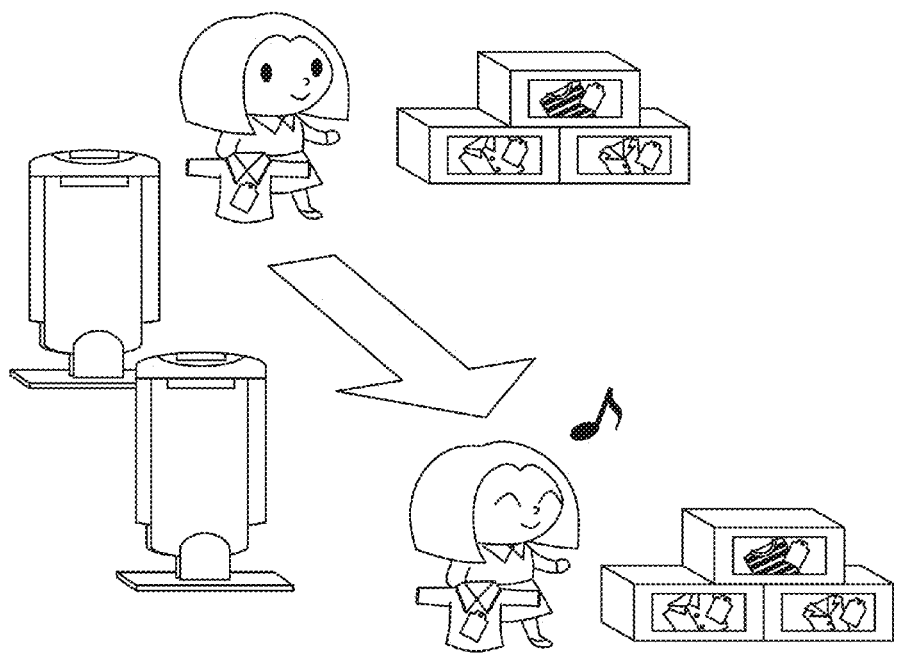

FIG. 16B

| | RSSI INCREASE | RADIAL COMPONENT VELOCITY AT TIME OF RSSI PEAK | EXCLUDABLE FILE NAME |
|---|---|---|---|
| HORIZONTAL MOVEMENT AT POSITION NEARBY ANTENNA | LARGE | 0 | |
| HORIZONTAL MOVEMENT AT POSITION FAR FROM ANTENNA | SMALL | 0 | RSSI NON-CONTIGUOUS INCREASE<br>RSSI ABSOLUTE VALUE<br>QUICK READING |
| VERTICAL MOVEMENT IN DIRECTION FROM FRONT TO REAR OF ANTENNA | SMALL | POSITIVE | RSSI NON-CONTIGUOUS INCREASE<br>VERTICAL DIRECTION MOVEMENT |
| VERTICAL MOVEMENT IN DIRECTION FROM REAR TO FRONT OF ANTENNA | LARGE | NEGATIVE | VERTICAL DIRECTION MOVEMENT |

FIG. 16C

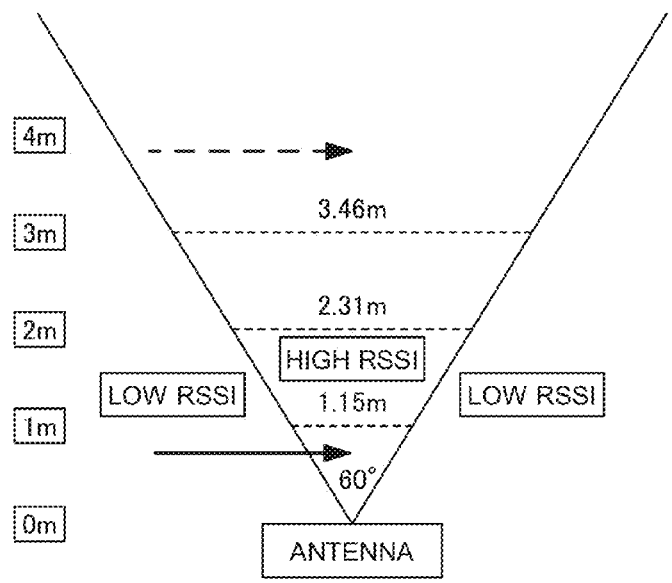

| | VALUE OF TAG | VALUE DESIRED TO BE CHANGED TO "STATIC" | CHANGE ANY |
|---|---|---|---|
| RATE OF NUMBER OF READINGS PER SECOND | 82.4 | MORE THAN 82.4 | 80 [%] |
| MAXIMUM RSSI | -51.0 | MORE THAN -51.0 | -60 [dBm] |
| RSSI DIFFERENCE | 8.5 | MORE THAN 6.5 | 5 [dB] |
| RSSI INCREASE OCCURRENCE RATE | 57.1 (4/7) | MORE THAN 57.1 | 45 [%] |
| INCREASE FROM MAXIMUM PRE-PERIOD RSSI | 5.0 | MORE THAN 5.0 | 3 [dB] |
| USE DATA PERIOD OF TIME | 0.5 | NOT INCLUDING 0.5 | 0.5 ~ 1.4 [SECONDS] |
| PHASE WAGGLING | 3.39 | MORE THAN 3.39 | 0 |

PARAMETER CHANGE

PLEASE CHANGE ANY OF FOLLOWING PARAMETERS IN ORDER TO CAUSE THIS TAG TO BE IDENTIFIED TO BE "STATIC"

SAVE

PLEASE CHECK SETTINGS OF [IDENTIFICATION TARGET TAG EPC], [IDENTIFICATION PARAMETER OF EACH EPC], AND [IDENTIFICATION OPTION]. THIS SCREEN REFLECTS ONLY [MOVING TAG IDENTIFICATION PARAMETER].

RFID TAG MOVEMENT DISTINGUISHING METHOD AND RFID TAG MOVEMENT DISTINGUISHING PROGRAM

TECHNICAL FIELD

The present invention relates to an RFID tag movement distinguishing method and an RFID tag movement distinguishing program, and more particularly, to an RFID tag movement distinguishing method and an RFID tag movement distinguishing program using a common RFID reader or a common antenna.

BACKGROUND ART

In recent years, it has become possible to collectively read a number of RFID tags located at a long distance of 10 m or more from an antenna instantly using a radio frequency identification (RFID) technique of a UHF band. A readable distance is expected to increase further from now on due to an improvement in the performance of a RFID tag chip and the like.

The RFID tags have been increasingly used for many purposes such as high-speed reception and shipment checking in warehouses, stores, or the like, theft detection, and register settlement of products. However, there is a problem in that RFID tags other an originally intended reading target such as RFID tags attached to products displayed around an antenna are read, and thus there is a need for a technique capable of identifying only an RFID tag that has actually moved in front of an antenna.

In this regard, known is a technique in which a data generating means for associating reception information from an RFID tag with chronological information and generating a plurality of sets of a scan angle of a scan antenna at which the reception information is received and chronological information is provided, and a linear approximate straight line representing a relation between the scan angle and the chronological information is obtained using data generated by the data generating means, and a moving direction of a moving object with an RFID tag is detected based on the slope of the linear approximate straight line, or a moving locus of the moving object is obtained, and a moving direction of the moving object with the RFID tag is detected (Patent Document 1).

Further, known is a technique of calculating the distance between a reflective object and a distance measuring device with a high degree of accuracy through a distance measuring device that performs a process of receiving reflective signals transmitted from a reflective object through a plurality of different carrier frequencies and includes a distance calculating unit that analyzes the reflective signals transmitted from the reflective object and calculates the distance between the reflective object and the distance measuring device (Patent Document 2).

Further, known is a technique using a special antenna in which an antenna is arranged obliquely other than horizontally to a moving direction of an RFID tag or a direction of an output radio wave is skewed (Patent Document 3).

Patent Document 1: JP 2007-303935 A
Patent Document 2: JP 2009-80133 A
Patent Document 3: U.S. Pat. No. 7,817,014 B2 (FIG. 17a, and FIGS. 18a to 18b)

DISCLOSURE OF THE INVENTION

Problem to be Solved by the Invention

However, in the technique disclosed in Patent Document 1, the special antenna such as the scan antenna is required. Thus, since the configuration is complicated, there is a problem in that it is difficult to apply it to a versatile device configuration using a general RFID reader and a general antenna.

Further, in the technique disclosed in Patent Document 2, a special reader that transmits a radio wave through two different frequencies in order to measure the distance to a certain tag is required.

Further, in the technique disclosed in Patent Document 3, a special antenna in which a direction of an output radio wave is skewed as an antenna is arranged obliquely other than horizontally to a moving direction of an RFID tag is required, and the technique may be inappropriate to places that are low in a degree of freedom of an installation such as gates of stores. Furthermore, since there are cases in which received radio wave strength from the RFID tag changes even when a person or an object moves in front of the antenna, erroneous detection is likely to occur in a technique of detecting movement based on only upward movement or downward movement.

A method of narrowing a reading range down by adjusting radio wave output or hardware of the antenna and reading only a desired RFID tag may be employed, but in this case, there is no merit to reading a plurality of tags at a long distance. Further, an undesired RFID tag located at a long distance may be read due to multi-path fading of a radio wave.

Furthermore, a method of detecting movement when a read time difference between two antennas is a certain value or more in a state in which two antennas are installed at separate positions or at different angles may be employed, but in this case, an installation space in which the antennas are installed at a certain distance or angle therebetween is required. In addition, due to diffused reflection of a radio wave caused, for example, by movement of a person or an object, it may be erroneously determined that a tag positioned between the two antennas has moved.

As described above, in the UHF band RFID that is excellent in reading a plurality of RFID tags at a long distance, there is a problem of "too much reading" in that an undesired RFID tag is also read. Thus, there is a desire for a technique capable of processing enormous and various wireless information acquired from a reader at a high speed and identifying a desired tag (moving tag) without narrowing the reading range down by an output adjustment or the like and damaging merits of the UHF band.

It is an object of the present invention to provide an RFID tag movement distinguishing method and an RFID tag movement distinguishing program, which are capable of identifying an RFID tag that has moved in front of an antenna and an RFID tag that is static based on chronological data of received radio wave strength, a phase, or a Doppler frequency of a read RFID tag obtained from a general RFID reader and a general antenna regardless of a model thereof even when a single antenna is used.

It is another object of the present invention to provide an RFID tag movement distinguishing method and an RFID tag movement distinguishing program, which can operate on a computer device or an RFID reader.

It is still another object of the present invention to provide an RFID tag movement distinguishing method and an RFID tag movement distinguishing program which can operate on a computer device or an RFID reader as a middle ware that transmits identification information to another application.

Means for Solving Problem

The above-described problem is solved by an RFID tag movement distinguishing method of identifying a moving RFID tag among a plurality of RFID tags using the plurality of RFID tags and an RFID reader that receives radio waves from the plurality of RFID tags, wherein the RFID reader is configured to acquire chronological read data of the plurality of RFID tags including a moving RFID tag and a static RFID tag, and a static RFID tag filter is configured based on a certain parameter to specify the static RFID tag based on information of the plurality of read RFID tags, and the moving RFID tag among the plurality of RFID tags is distinguished, the static RFID tag filter includes an individual static RFID tag filter including any one of the following steps (1) to (6), and the static RFID tag filter identifies the moving RFID tag by identifying the static RFID tag and the moving RFID tag using at least one or more of a plurality of individual static RFID tag filters, and the RFID tag movement distinguishing method includes (1) calculating the number of possible readings per second using a function having the number of tags being read as a variable, and performing identification based on a comparison with the number of readings per second read by the RFID reader, (2) identifying the static RFID tag and the moving RFID tag by chronological analysis of received radio wave strength, (3) tracing up to a predetermined chronological data and determining whether there is another point having high received radio wave strength when chronological data of received radio wave strength of an RFID tag read by the RFID reader has a valley shape, that is, when a point having high received radio wave strength occurs, and identifying an RFID tag to be the static RFID tag when there is a point having high received radio wave strength, (4) identifying the static RFID tag and the moving RFID tag using at least one of a degree in which an overall mountain shape represented by the chronological data of the received radio wave strength of the RFID tag or a rising portion of the mountain shape is fit into as a linear or non-linear curve, a difference between each maximum strength value and a minimum strength value of the mountain shape, and a rate of a point increased from a previous point in chronological order in the mountain shape, (5) identifying the static RFID tag and the moving RFID tag by chronological analysis of a phase of a transmission carrier wave of the RFID reader and a carrier wave reflected and returned from an RFID tag, and (6) identifying a moving direction by comparing either of a phase inflection point of an RFID tag response and a point at which a frequency is zero (0) with at point at which a received radio wave strength peak occurs.

In the RFID tag movement distinguishing method of the present invention, the RFID antenna and the RFID reader can read chronological data and identify the RFID tag regardless of a model.

Further, the static RFID tag filter identifies the moving RFID tag by identifying the static RFID tag and the moving RFID tag using at least one of individual static RFID tag filters. Thus, it is possible to identify the static RFID tag from a plurality of points of view, and it is possible to identify the moving RFID tag with a high degree of accuracy.

Particularly, since the static RFID tag and the moving RFID tag are identified using one or more of individual static RFID tag filters, it is possible to identify even the static RFID tag that is low in received radio wave strength due to diffused reflection or multi-path fading of the radio wave as a person or an object, particularly, a basket cart made of metal, a truck, or the like moves in front of the antenna, particularly, since the radio wave is blocked as an object containing moisture or a person moves in front of the antenna.

At this time, the function having the number of tags being read as a variable in the step (1) is a power curve function or a polynomial function having the number of tags being read as an independent variable, a threshold value obtained by multiplying a calculation value calculated using the function by a predetermined rate is used as a determination criterion, and an RFID tag can be identified as the static RFID tag when the number of readings per second is smaller than the determination criterion.

Further, preferably, as horizontal direction movement nearby an antenna is detected using various kinds of the RFID tag filters, but horizontal direction movement or vertical direction movement that is performed at a position far from the antenna is not detected, movement identification and moving direction determination are performed at a high degree of accuracy.

Further, preferably, in the chronological analysis in the step (5), the RFID tag movement distinguishing method further comprises identifying the static RFID tag and the moving tag by using at least one of setting a threshold value to a standard deviation value of a phase, a binomial test, a chi-squared test, and a G test.

Further, preferably, for the certain parameter, as a start point and an end point at the time of movement are selected after moving an experimental RFID tag in advance, the parameter is automatically calculated. In this configuration, since an optimal parameter in which an environmental difference such as a RFID reader, an antenna, a tag, or a moving velocity is absorbed is automatically calculated, it is easy to set a parameter.

The above-described problem is solved by an RFID tag movement distinguishing program causing a computer to acquire chronological read data of a plurality of RFID tags including a moving RFID tag and a static RFID tag, specify the static RFID tag based on information of the plurality of RFID tags through a static RFID tag filter configured based on a certain parameter, and identify the moving RFID tag among the plurality of RFID tags, and to execute, in an arbitrary order, an individual static RFID tag filter including at least one or more of (1) of calculating the number of possible readings per second using a function having the number of tags being read as a variable, and performing identification based on a comparison with the number of readings per second read by the RFID reader, (2) identifying the static RFID tag and the moving RFID tag by chronological analysis of received radio wave strength, (3) tracing up to certain chronological data and determining whether there is another point having high received radio wave strength when chronological data of received radio wave strength of an RFID tag read by the RFID reader has a valley shape, that is, when a point having high received radio wave strength occurs, and identifying an RFID tag to be the static RFID tag when there is a point having high received radio wave strength, (4) identifying the static RFID tag and the moving RFID tag using at least one of a degree in which an overall mountain shape represented by the chronological data of the received radio wave strength of the RFID tag or a rising portion of the mountain shape is fit into as a linear or non-linear curve, a difference between a maximum strength value and a minimum value of the mountain shape, and a rate of a point increased from a previous point in chronological order in the mountain shape, (5) identifying the static RFID tag and the moving RFID tag by chronological analysis of a phase of a transmission carrier wave of the RFID reader and a carrier wave reflected and returned from an RFID tag, and (6) identifying a moving direction by comparing either of a phase inflection point of an RFID tag response and a point at which a frequency is zero (0) with at point at which a received radio wave strength peak occurs.

According to the RFID tag movement distinguishing program of the present invention, it is possible to cause a device in which the program operates to identify RFID tag movement.

Effect of the Invention

According to the present invention, it is possible to identify an RFID tag that has moved in front of an antenna and an RFID tag that is static based on chronological data of received radio wave strength, a phase, or a Doppler frequency of a read RFID tag obtained from a general RFID reader and a general antenna.

It is possible to identify even the static RFID tag that temporarily drops in received radio wave strength due to diffused reflection or multi-path fading of the radio wave as a person or an object, particularly, a basket cart containing metal, a truck, or the like moves in front of the antenna, particularly, since the radio wave is blocked as an object containing moisture or a person moves in front of the antenna. Further, using a plurality of static RFID tag filters, it is possible to identify a moving direction of an RFID tag, and movement identification can be performed with a high degree of accuracy. As described above, it is possible to the accuracy of movement determination.

BRIEF DESCRIPTION OF THE DRAWINGS

FIG. 9C is a flowchart of a chi-squared test;

FIG. 10A is a flowchart of a determination criterion data calculation;

FIG. 12A is a graph illustrating chronological data obtained by measuring received radio wave strength (upper graph) and a phase (lower graph) of a moving tag;

FIG. 13C is an explanatory diagram illustrating horizontal direction movement and vertical direction movement;

FIG. 16B is a chart illustrating determination criterion information used to filter movement and a filter name;

FIG. 16C is an explanatory diagram illustrating a distance and an angle from an antenna and a high-low relation of RSSI;

FIG. 22 illustrates a parameter change screen;

FIG. 25 illustrates a parameter change screen;

DETAILED DESCRIPTION OF THE INVENTION

Figure 1:
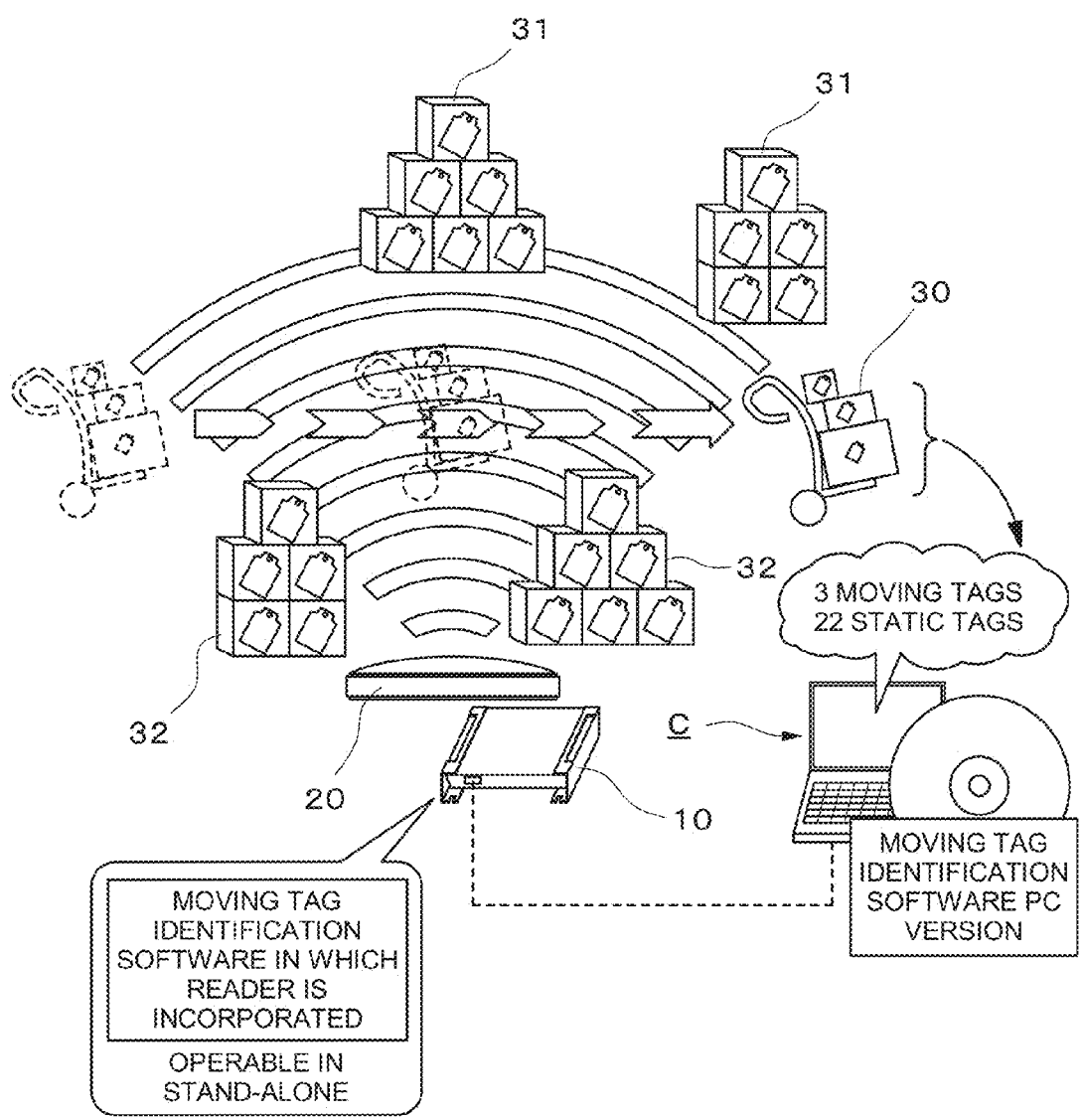
FIG. 1 is a schematic explanatory diagram illustrating a configuration used in an RFID tag movement distinguishing method and an RFID tag movement distinguishing program according to the present invention.

Hereinafter, exemplary embodiments of the present invention will be described with reference to the appended drawings. Here, members or arrangements described below are not intended to limit the present invention, and various changes or improvements can be made according to the spirit of the present invention. Further, in this disclosure and claims, an RFID reader includes an RFID reader/writer.

The nature of the present invention relates to an RFID tag movement distinguishing method and an RFID tag movement distinguishing program and lies in an RFID tag movement distinguishing method and an RFID tag movement distinguishing program, which are capable of identifying an RFID tag that has moved in front of an antenna 20 and an RFID tag that is static in front of the antenna 20 based on data of received radio wave strength, a phase, and a Doppler frequency of an RFID tag read by an RFID reader 10 that is being commonly used regardless of a model and an antenna 20 that is being commonly used regardless of a model. The RFID reader 10 searches for an RFID tag and reads information (data) of an RFID tag by transmitting and receiving a radio wave to and from an RFID tag present nearby.

An RFID tag movement distinguishing method and an RFID tag movement distinguishing program according to the present invention are implemented by controlling an operation of a computer device C controlling the RFID reader 10 or an operation of the RFID reader 10. This can be conceptually described with reference to FIGS. 1 and 2. That is, moving RFID tags are identified by excluding RFID tags that can be determined as a static RFID tag from information of all RFID tags read by the RFID reader 10 through an individual static RFID tag filter serving as a static RFID tag filter F. Table 1 exhibits a list of RFID tag filters.

TABLE 1

| | Filter name | Determination source information | Identification method | Item name in Identification parameter setting tool |
|---|---|---|---|---|
| 1 | Quick-read filter | Number of readings per second | Number of readings per second is less than threshold value during use data period of time (threshold value dynamically changes according to number of tags being read) | Necessary rate of number of readings per second |
| 2 | Excess read filter | Reading occurrence time | reading is being performed even when X seconds elapse after movement candidate determination | |
| 3 | RSSI absolute value filter | RSSI | Maximum received radio wave strength is less than threshold value | Necessary RSSI |
| 4 | RSSI non-contiguous increase filter | RSSI [continuous increase] | "Maximum-minimum received radio wave strength" is less than threshold value | Necessary RSSI difference |
| 5 | | | Occurrence rate of point at which received radio wave strength (t) <= strength (t + 1) is less than threshold value | Necessary rate of RSSI increase occurrence |
| 6 | RSSI valley-shaped filter | RSSI [valley] | value increased from maximum pre-period received radio wave strength is less than threshold value | Necessary increase from maximum pre-period RSSI |
| 7 | Phase shift reduction filter | Phase | Checking amount calculated based on change in phase during period of time is less than threshold value | Necessary phase waggling |
| 8 | Vertical direction movement filter | Doppler frequency | Chronological analysis of moving velocity during period of time | Vertical direction moving filter (setting of enable/disable) |

The known computer device C includes a central processing unit (CPU) (not illustrated), a memory (a read only memory (ROM), a random access memory (RAM), a hard disk drive (HDD), or the like), Wi-Fi (a registered trademark), an input and output (I/O) antenna connected to Wi-Fi (a registered trademark), a power adapter, an I/O means, a sensor (optical sensor) connected with the I/O means, a switch, and the like, and controls a transmission output or the antenna 20 based on the RFID tag movement distinguishing program stored in the memory through the CPU. The RFID reader 10 according to this embodiment is connected with the computer device C.

The RFID reader 10 or the computer device C according to this embodiment performs control such that it is identified whether an RFID tag attached to a person or an object (product) is moving or is static by detecting a chronological change in received radio wave strength, a phase, or a Doppler frequency when an RFID tag attached to a person or an object (product) has moved with respect to the antenna 20.

An RFID tag storing, for example, a product code or an individual article ID used to identify an individual is attached to a person or an object (product). A moving RFID tag identified by the RFID tag movement distinguishing method and the RFID tag movement distinguishing program according to the present invention is used to move, purchase, or manage the person or the object (product). For example, in case of a shelf of a product, in each tier, an RFID tag is attached to a certain position (for example, a corner) of the shelf in order to specify the position of the shelf and a position range thereof. Here, an RFID tag is assumed to be arranged on each of certain portions (for example, corners) configuring one shelf (three-dimensional rectangular parallelepiped region), and a position range of the shelf is assumed to be specified by the RFID tag.

Figure 3:
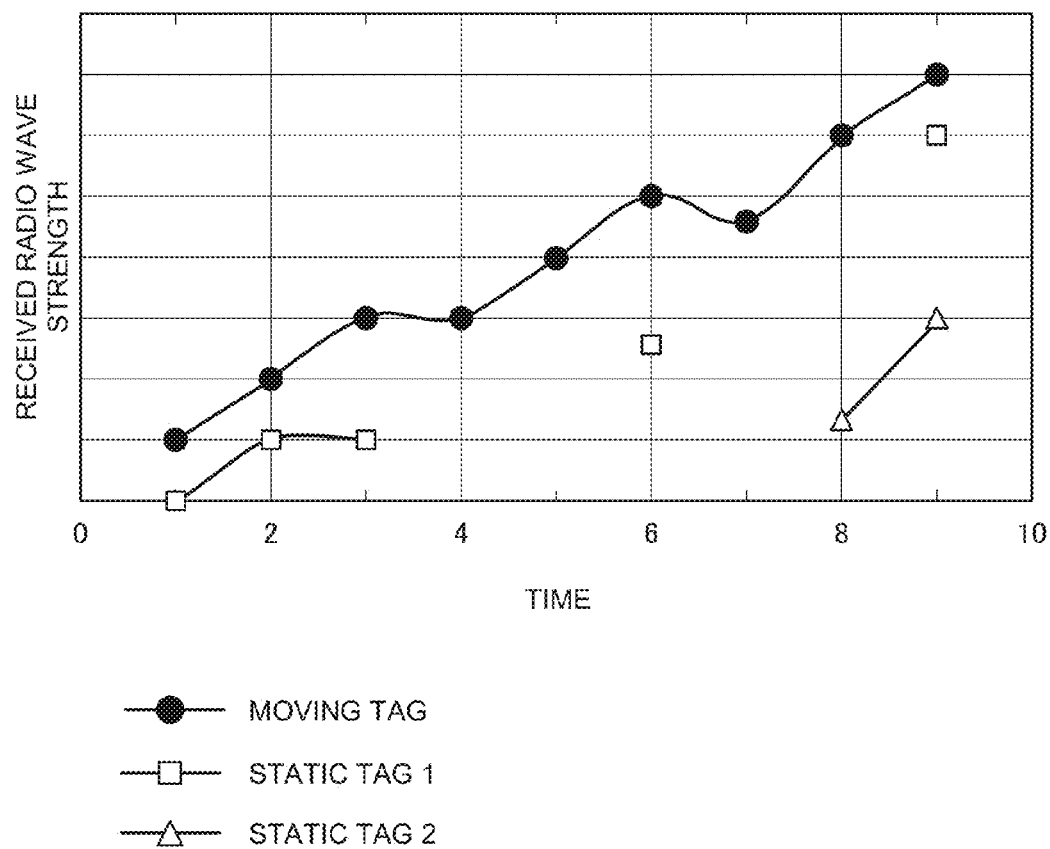
FIG. 3 is a graph illustrating a relation between received radio wave strength and a time in connection with a moving tag and a static tag.

Generally, the antenna 20 equipped in the RFID reader 10 can constantly read a static RFID tag 32 as illustrated in FIG. 1, but may not read a static RFID tag 31 illustrated in FIG. 1 during a certain period of time (time) in which the static RFID tag 31 is hidden behind a passing object when a person having the RFID tag 30 or an object with the RFID tag 30 attached thereto passes in front of the antenna 20 and is at the position of the static RFID tag 31 illustrated in FIG. 1. Further, there are cases in which the places illustrated by the static RFID tag 31 are read during a short period time by a radio wave reflected by a person or an object (see FIG. 3). These are identified by a static RFID tag filter F (which will be described later) that determines a static RFID tag, and a moving RFID tag is specified by excluding the static RFID tags.

Figure 4:
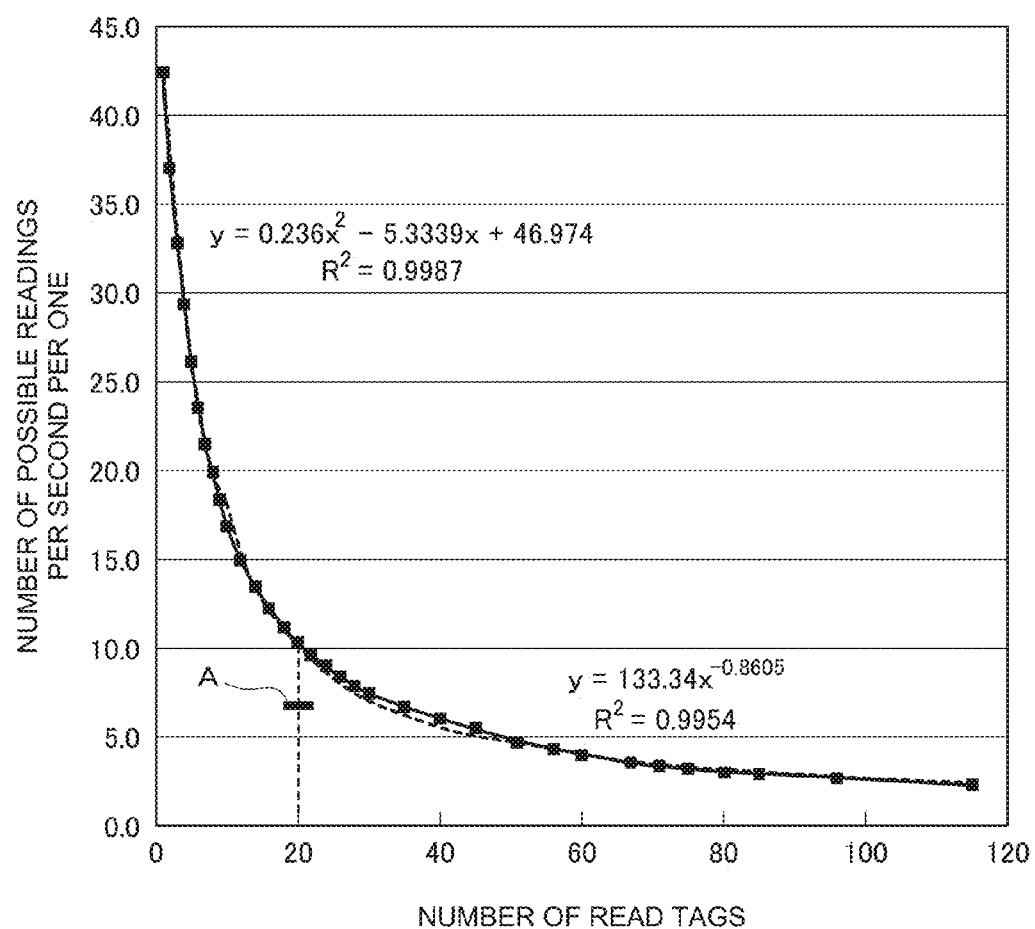
FIG. 4 is a graph that is represented by actually measured data and a regression curve and illustrates a relation between the number of possible readings per second and the number of tags being read.

At this time, as the static RFID tag filter F, there is a technique of setting a threshold value to the number of readings during a certain period of time. The number of possible readings per second per RFID tag when RFID tags can be continuously read can be calculated based on a radio communication parameter of the RFID reader 10, for example, a polynomial function or a power curve function having the number of RFID tags being read as an independent variable (see FIG. 4). When the number of possible readings per second is smaller than a threshold value obtained by multiplying the calculation value by a certain rate, an RFID tag may be determined as a static RFID tag. For example, a threshold value when the number of readable RFID tags at a certain point in time is 20 may be set as A as illustrated in FIG. 4.

Figure 5:
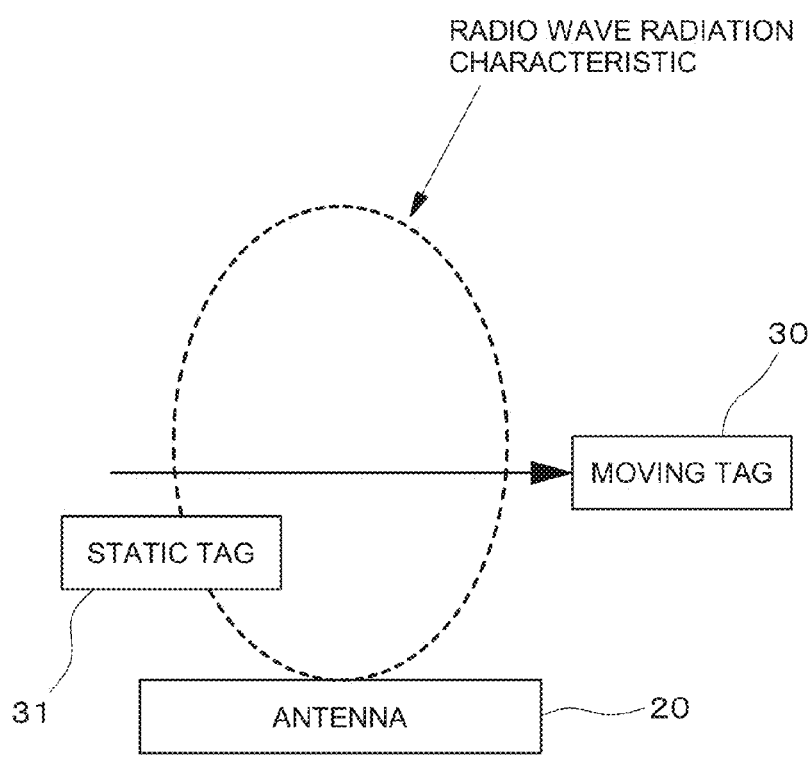
FIG. 5 is an explanatory diagram illustrating radio wave radiation characteristics of an antenna and an RFID tag position relation.
Figure 6:
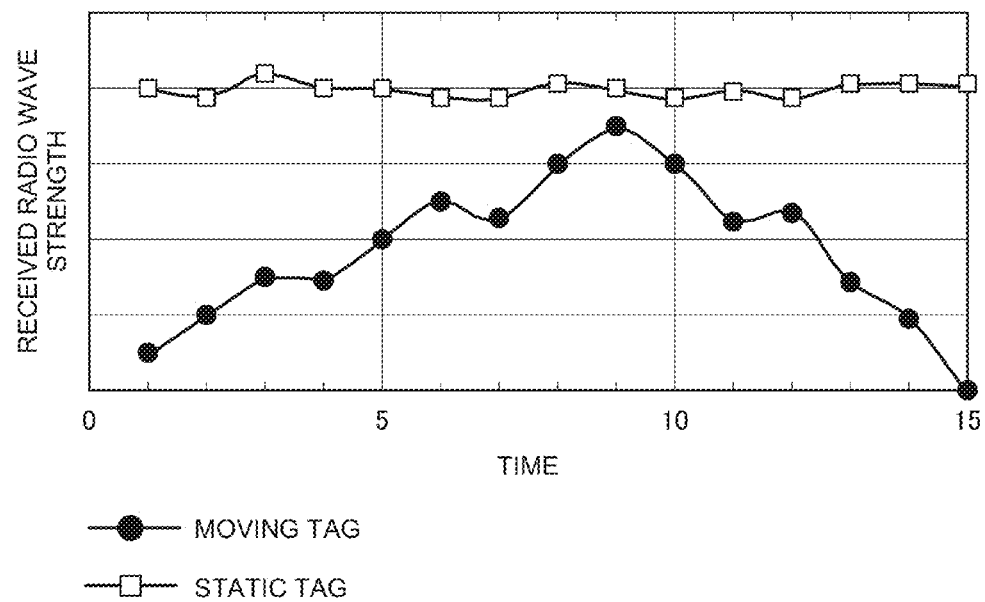
FIG. 6 is a graph for describing a relation between received radio wave strength and a time in connection with a moving RFID tag and a static RFID tag.

Further, as the static RFID tag filter F, there is a technique of using the fact that a received radio wave strength chronological graph of an RFID tag that has moved typically has a mountain shape due to the property that received radio wave strength from an RFID tag is inversely proportional to the fourth square of the distance, radio wave radiation characteristics of the antenna 20, and the like. For example, in an RFID tag that has moved in front of the antenna 20 and an RFID tag that is static as illustrated in FIG. 5, only a moving tag has a mountain shape as illustrated in a graph of FIG. 6. It is possible to specify a static RFID tag by determining an overall mountain shape and a rising part thereof through various kinds of arithmetic or statistical techniques such as goodness of fit determination with a linear or non-linear curve, a difference between a maximum strength value and a minimum value, and a proportion of a point rising from a previous point in chronological order.

Figure 7:
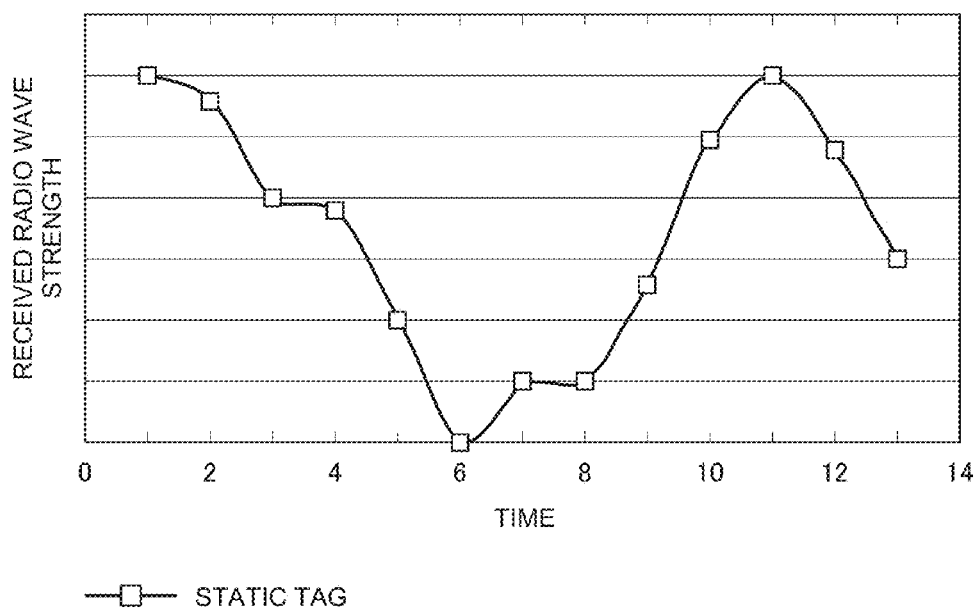
FIG. 7 is a graph for describing a relation between received radio wave strength and a time in connection with static RFID tag.

Further, as the static RFID tag filter F, when a radio wave is blocked in a hiding place and so received signal strength temporarily drops as in the place such as the static RFID tag 31 illustrated in FIG. 1 due to diffused reflection of a radio wave or multi-path fading caused as a person or an object, particularly, a basket cart, a truck, or the like containing metal moves in front of the antenna 20, a mountain-shaped graph is illustrated, for example, after a time axis point 6 even in a static RFID tag as illustrated in FIG. 7. In this case, it is possible to identify a static RFID tag through a technique of detecting a valley shape illustrated in FIG. 7 by tracing up to previous time axis data and determining whether there is a point having high received radio wave strength.

Further, it is possible to specify a static RFID tag through a technique of comparing strength obtained by combining a transmission carrier wave of the RFID reader 10 with a carrier wave reflected and returned from an RFID tag in the RFID reader 10 with received radio wave strength of the RFID tag. In other words, it is possible to detect a phase difference between the two carrier waves within a range of 0 to 180° or 0 to 360°. This function may be provided as a function of the RFID reader 10, and it is possible to use this function. Generally, a phase goes around a loop each time a distance between the antenna 20 and the RFID tag varies by ¼ wavelength or a ½ wavelength. For example, when the frequency is 953 MHz, a ¼ wavelength corresponds to 7.86 cm, and a ½ wavelength corresponds to 15.72 cm.

In the static RFID tag, the phase does not change, but in the moving RFID tag, the phase continuously varies. When the wavelength is smaller than the moving distance of a person or an object as in the frequency band, the phase significantly varies by little movement, for example, a person swinging his/her hand, and the phase at the time of movement continuously varies and has a uniform distribution as illustrated in a conceptual graph of FIG. 8A.

Figure 8A:
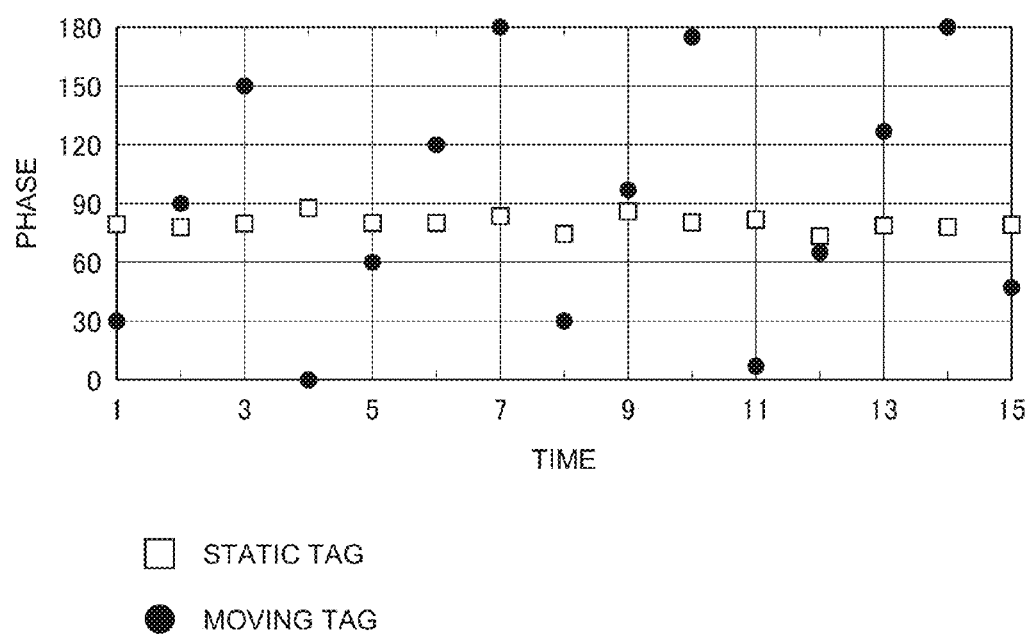
FIG. 8A is a graph for describing a relation between a phase and a time in connection with a moving RFID tag and a static RFID tag.

It is possible to distinguish difference between the two chronological data illustrated in FIG. 8A by setting a threshold value to the standard deviation value or a technique such as the binomial test, the chi-squared test, or the G test, thereby identifying the a static RFID tag.

At this time, when the number of data is small, the standard deviation largely varies, and it may be difficult to perform correct identification. In case of the binomial test, the chi-squared test, and the G test, it is possible to express ambiguity of an identification accuracy caused when the number of data is small using a probability, and thus they are more effective methods than RFID tag reading in which the number of readings at the time of movement largely varies by several times to hundreds of times. Further, it is possible to identify an RFID tag through a technique using the binomial test, the chi-squared test, the G test, or the like.

Figure 9A:
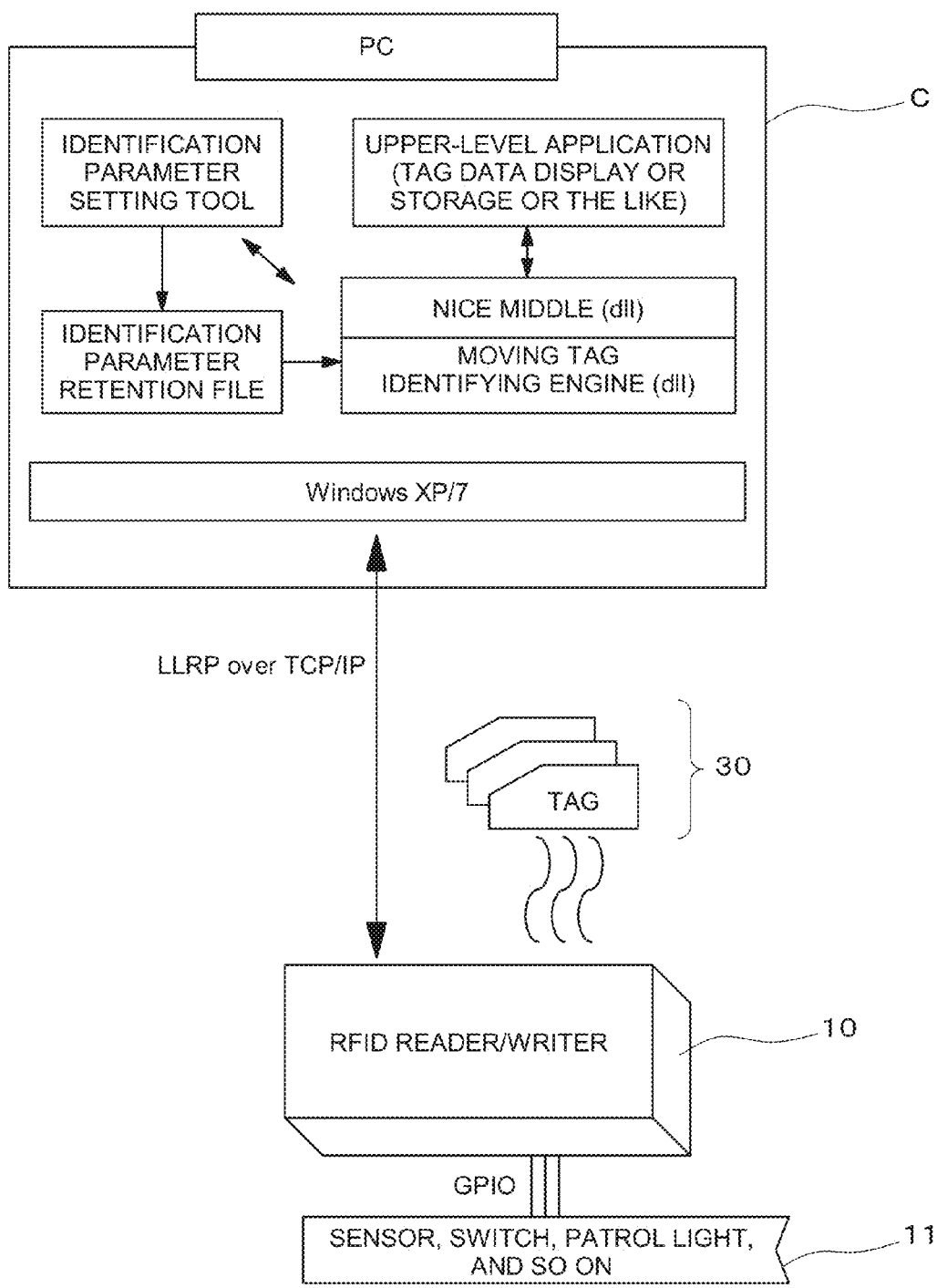
FIG. 9A is an explanatory diagram a more concrete configuration used in an RFID tag movement distinguishing method and an RFID tag movement distinguishing program.

FIG. 9A is an explanatory view more specifically illustrating a configuration used in the RFID tag movement distinguishing method and the RFID tag movement distinguishing program, and the computer device (PC) C and the RFID reader 10 are provided, and connected with each other using a protocol (TCP/IP) used in the Internet or the intranet through an LLRP (a low-level reader protocol). The computer device (PC) C and the RFID reader 10 are versatile, and are not those which are provided particularly for the present invention. Further, the RFID reader 10 may be connected with a sensor, a switch, a patrol light (a registered trademark), or the like through a general-purpose input output (GPIO).

The computer device C is configured so that an identification parameter setting tool, an identification parameter retention file, an upper-level application (an upper-level application: displays or holds RFID tag data) located on an upper layer, middle ware (nice middle), an RFID tag identifying engine, and the like can operate on an operating system (OS). FIG. 9A illustrates an example in which Windows XP (a registered trademark) or Windows7 (a registered trademark) is used as an OS.

Figure 9B:
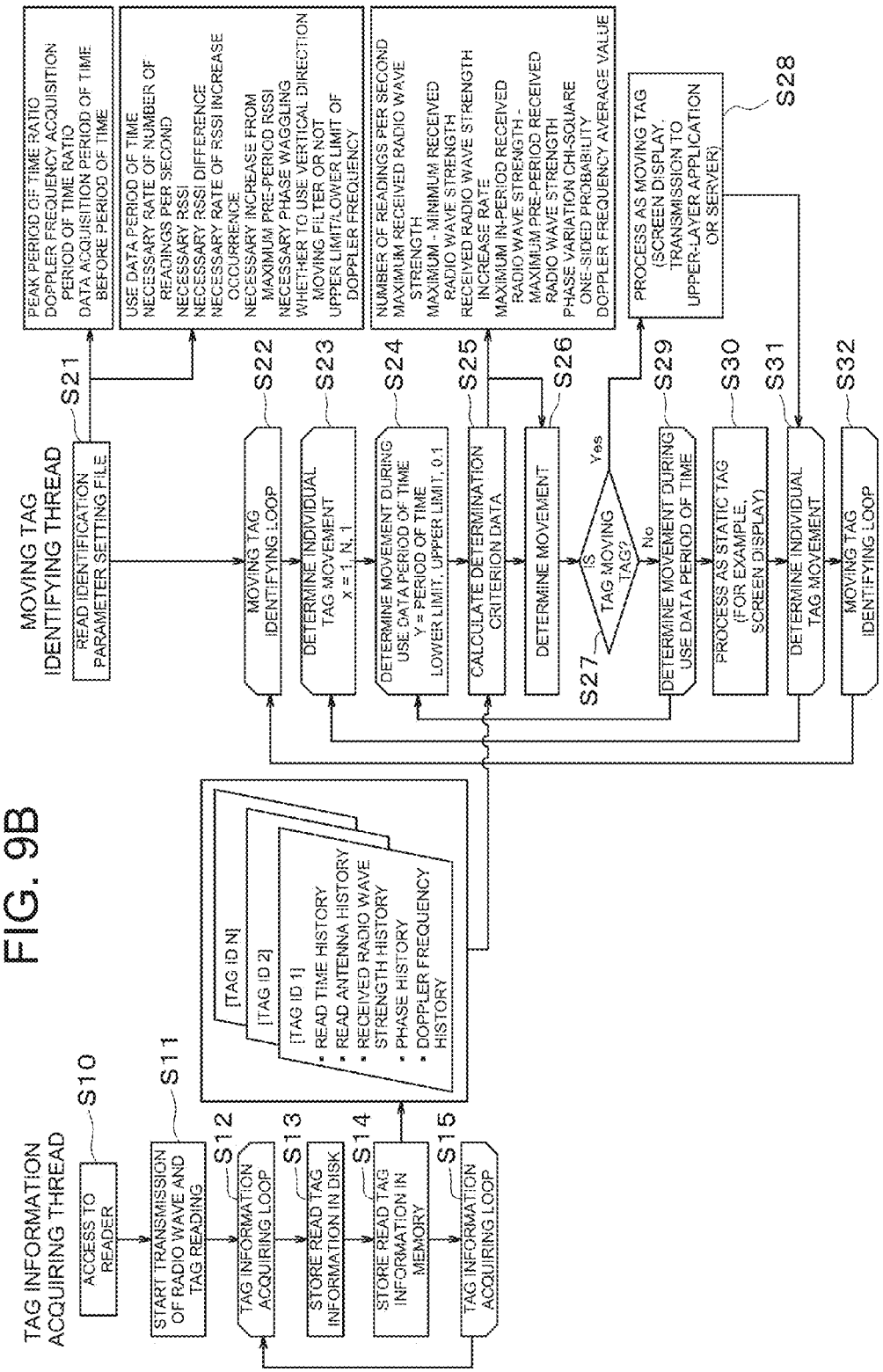
FIG. 9B is a flowchart a tag information acquiring thread (program) and a moving tag identifying thread (program)

FIG. 9B is a flowchart of a tag information acquiring thread (program) and a moving tag identifying thread (program).

In this embodiment, tag information acquisition is performed steps S10 to S15. A process (S10) of connecting the computer device C with the RFID reader 10 is performed, a radio wave is then transmitted from the antenna 20, and reading of information from an RFID tag starts (step S11). Steps S12 to S15 form a loop. In step S12, the read information of the RFID tag is acquired, and the read information of the RFID tag is stored, for example, in a hard disk that is a memory (storage medium). In step S14, the read information of the RFID tag is stored, for example, in a RAM that is a memory (storage medium). Read information is acquired by the number obtained by multiplying the number of RFID tags by the number of readings of each RFID tag by the loop. Here, the RFID tag information includes information such as a read time history, a read antenna history, a received radio wave strength history, a phase history, and a Doppler frequency history.

The RFID tag information is used in a determination criterion data calculation of step S25 in next moving tag identification.

In this embodiment, moving tag identification is performed in steps S21 to S32, and steps S22 to S32, steps S23 to S31, and steps S24 to S29 form a loop. In step S21, a process of reading an identification parameter setting file and storing various kinds of parameters in a memory such as a RAM is performed.

In step S23, a movement determination process of an individual RFID tag is performed. Then, in step S24, the movement determination process during a use data period of time is performed. Next, in step S25, a determination criterion data calculation process is performed. At this time, the number of readings per second, a maximum received radio wave strength, maximum-minimum received radio wave strength, a received radio wave strength increase rate, maximum in-period received radio wave strength—maximum pre-period received radio wave strength, a phase variation chi-square one-sided probability, a Doppler frequency average value, and the like are calculated. The process of step S25 will be described later.

After the process of step S25, in step S26, the movement determination process is performed. The process of step S26 will be described. Then, it is determined whether an RFID tag is a moving RFID tag (step S27). When an RFID tag is determined as a moving RFID tag (Yes in step S27), the RFID tag is processed as a moving tag (step S28). Based on this determination, a screen display, a transmission process to an upper-layer application or a server, or the like is performed. After step S28, when there is a remaining determination target tag, the loop process of steps S23 to S31 is continuously performed. When an RFID tag is not determined as a moving RFID tag (No in step S27), the use data period of time increases by 0.1 second, and the movement determination process is performed (steps S24 to S29). When it is difficult to determine an RFID tag as a moving tag, the loop process of steps S24 to S29 is continuously performed until it reaches an upper limit of the use data period of time. When an RFID tag is determined to be static, in step S30, the RFID tag is processed as a static RFID tag. When there is a remaining determination target tag, the loop process of steps S23 to S31 is continuously performed. The process of steps S22 to S32 is repeated as described above.

FIG. 10A is a detailed flowchart of the determination criterion data calculation of step S25. Various kinds of parameters (a peak period of time ratio, a Doppler frequency acquisition period of time ratio, and a data acquisition period of time before a period of time) used at the time of calculation are read from a setting file to a memory in step S21 (FIG. 9B).

In step S70, various kinds of variables used in the process of calculation are initialized. A variable storing a count or a sum of a numerical value has an initial value of "0." Since a range of a value available as the RSSI is about −100 to 30, −999 is stored in a variable storing a maximum value as an initial value, and 999 is stored in a variable storing a minimum value as an initial value. In this case, Yes is determined in a first comparison operation which will be performed later, and thus the process is simplified.

In step S71, among history data stored in the memory in step S14, N pieces of data of a target tag during a target period of time are set as a calculation target. In order to scan all data corresponding to the target period of time, in step S72, N−1 is stored in a variable i as an initial value, and in the process of steps S73 to S84, the calculation is performed while decreasing the variable i by one from N−1 to 0, and when the variable i has a negative value, the process leaves the loop.

In step S74, it is determined whether Read_time[i] is data within the peak period of time based on the peak period of time ratio parameter. When Read_time[i] is determined as data within the peak period of time (Yes in step S74), a maximum in-period received radio wave strength update process (steps S75 and S76) is performed using RSSI[i], but when Read_time[i] is not determined as data within the peak period of time (No in step S74), a minimum in-period received radio wave strength update process is performed in steps S77 and S78.

In step S79, RSSI[i] is compared with RSSI[i−1], and when the previous received radio wave strength is lower or equal (Yes in step S79), in step S80, the received radio wave strength increase counter increases by 1. Further, this comparison is not performed when i=0. In step S81, it is determined whether Read_time[i] is data within a Doppler frequency acquisition period of time based on the Doppler frequency acquisition period of time ratio parameter. When Yes is determined, the value is added in order to calculate an average value later, and the counter increases by 1 (step S82). In step S83, for loop end determination, i decreases by 1, and the data counter increases by 1. In step S85, it traces data by the pre-period data acquisition period of time parameter, and the maximum value of the received radio wave strength during that period of time is acquired. In step S86, various kinds of movement determination criterion data is calculated. Among them, a calculation method of the phase variation chi-square one-sided probability will be described later.

Figure 10B:
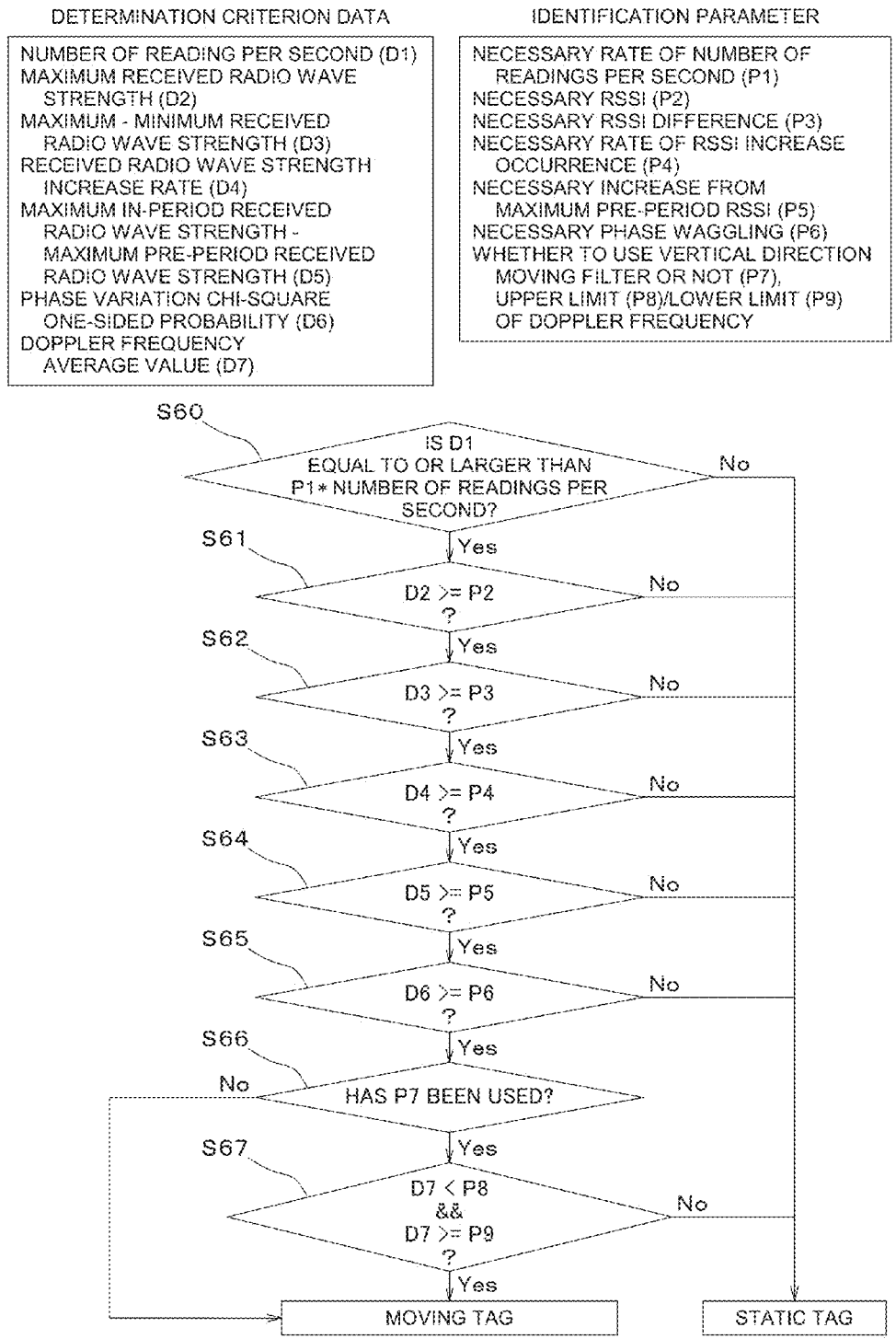
FIG. 10B is a flowchart of movement determination.

FIG. 10B is a detailed flowchart of the movement determination of step S26 (FIG. 9B) Determination criterion data D1 to D7 are values calculated in step S25, and identification parameters P1 to P9 are parameters read from the setting file to the memory in step S21.

Step S60 is a process of a quick-read filter, that is, a process of comparing the product of the number of possible readings per second calculated by the function having the number of RFID tags being read as an independent variable and P1 with D1. When a comparison determination result is No, an RFID tag is determined as a static tag, and a subsequent process is not performed. When comparison determination result is Yes, a next determination is performed. This bifurcation is common in a subsequent process.

Step S61 is a process of an RSSI absolute value filter. Steps S62 and S63 is a process of an RSSI non-contiguous increase filter. Step S64 is a process of an RSSI valley-shaped filter. Step S65 a process of a phase shift reduction filter. In step S66, it is determined whether a vertical direction movement filter has been used, and when a determination result is Yes, step S67 that is a process of the vertical direction movement filter is performed. When all determination results in the process of up to step S67 are Yes, an RFID tag is determined as a moving tag. Further, the determination result of step S66 is No, step S67 is not performed, and an RFID tag is determined as a moving tag.

Figure 13A:
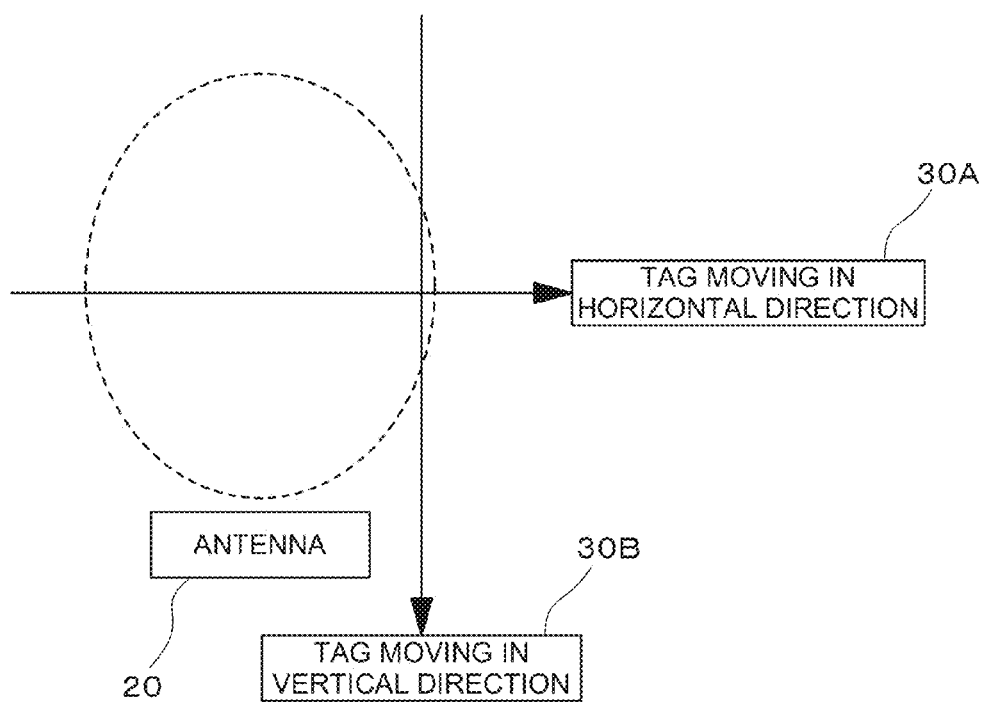
FIG. 13A is an explanatory diagram for describing a horizontal direction and a vertical direction of a moving RFID tag.

Further, vertical direction movement represents movement in a direction vertical to a radio wave reflecting surface of an antenna, and horizontal direction movement represents movement in a direction horizontal to a radio wave reflecting surface of an antenna as illustrated in FIG. 13A.

Figure 8B:
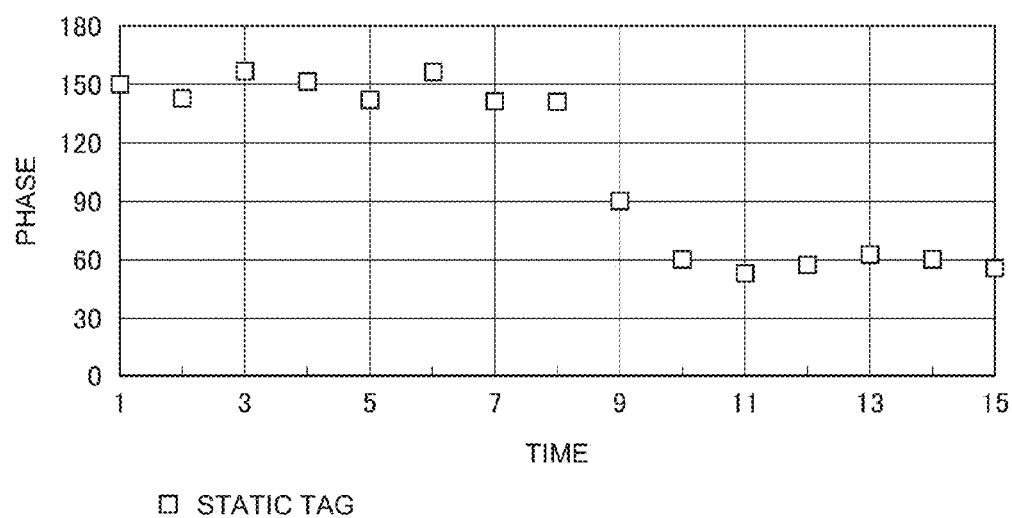
FIG. 8B is a graph for describing a relation between a phase and a time in connection with a static RFID tag.

In the binomial test, a probability of a uniform distribution can be very accurately obtained, but when the number of data is large, there is a problem in that the computation amount is enormous. The chi-squared test and the G test are small in the computation amount and can approximate the binomial test at a high degree of accuracy and thus useful techniques. However, in all the above-mentioned techniques, when the phase values are divided into two groups of first half and second half as a person or the like moves as illustrated in FIG. 8B, it is determined to have a uniform distribution, and thus an RFID tag may be erroneously identified as a moving tag.

Even in the case of the above-described situation, by dividing in-period data into first half and second half and calculating an observation frequency, it is possible to identify a tag as a static tag. FIG. 9C is a flowchart of the chi-squared test for describing an example of dividing in-period data into first half and second half and calculating an observation frequency and the description will proceed with reference to the flowchart of FIG. 9C. The process of the flowchart is performed at intervals of the use data period of time of each RFID tag.

The flowchart of FIG. 9C corresponds to the "determination criterion data calculation" (step S25) process of obtaining the phase variation chi-square one-sided probability in the moving tag identifying thread in FIG. 9B.

The "determination criterion data calculation" process is performed as follows.

In step S40, a process of acquiring M pieces of phase history data of a target tag during a target period of time from the memory is performed. This data is on which is already obtained by the "read tag information memory storing" process of step S14 of the tag information acquiring thread (program) process in FIG. 9B. Hereinafter, the description will proceed with a case in which for example, data having a phase of a range of 0 to 180° is returned from the RFID reader 10. The phase history data is assumed to be stored in arrangements Phase_angle[0] to Phase_angle[M−1], and corresponding read time history data is assumed to be stored in arrangements Read_time[0] to Read_time[M−1]. In the following, an angle is described using [°] instead of a radian Arguments of Cos and Sin and a return value of Arctan are assumed to be calculated using [°] as well.

Figure 8C:
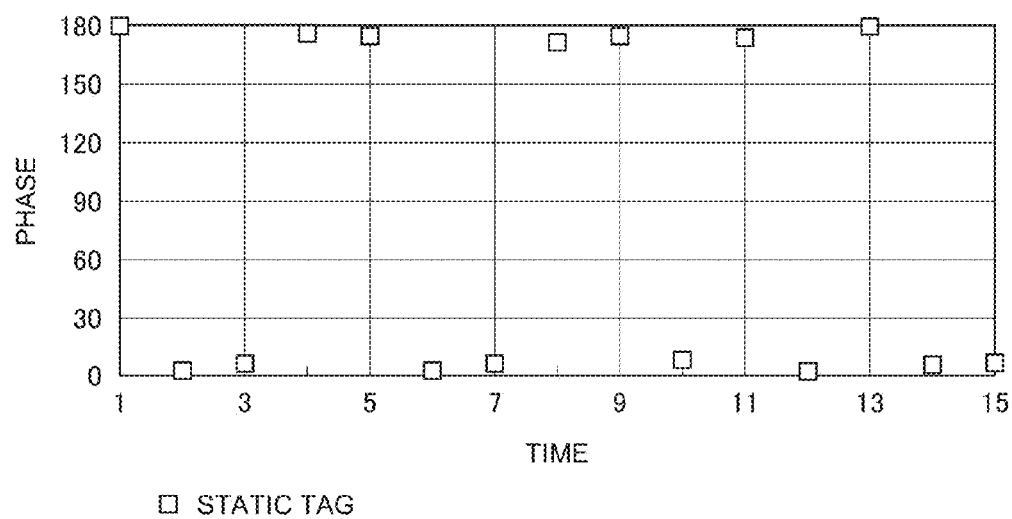
FIG. 8C is a graph for describing a relation between a phase and a time in connection with a static RFID tag.

Steps S41 to S45 are a loop for calculating a phase vector sum in preprocessing for obtaining an average phase value later. Since a phase is periodic data of 180°, there are cases in which it is undesirable to obtain an average value thereof by arithmetic average. For example, in the case in which a static RFID tag is slightly shaken by a wind or the like or in the case in which chronological data interposing 0° (=180°) of FIG. 8C is obtained due to internal noise of the RFID reader 10 or the like, when 90° obtained by arithmetic average is used as an average value, it is regarded as data having a large variation, and it may be erroneously recognized as a moving RFID tag. In this case, it is desirable that 0° is used as an average. First, in order to use different average values in first half and second half of a period of time, in step S42, it is determined whether it is the first half. When it is the first half, the process of step S43 is performed, but when it is the second half, the process of step S44 is performed. This is a process of doubling original data of 0 to 180°, that is, converting it into 0 to 360° and calculating a unit vector sum in which an angle thereof is on an xy plane. Different variables are set for the first half and the second and calculated by the following formulas. Step S43 is implemented as follows:

$$\text{Sum\_unit\_vector\_x\_anterior} = \text{Sum\_unit\_vector\_x\_anterior} + \text{Cos}(\text{Phase\_angle}[x]*2)$$

$$\text{Sum\_unit\_vector\_y\_anterior} = \text{Sum\_unit\_vector\_y\_anterior} + \text{Sin}(\text{Phase\_angle}[x]*2)$$

Step S44 is implemented as follows:

$$\text{Sum\_unit\_vector\_x\_posterior} = \text{Sum\_unit\_vector\_x\_posterior} + \text{Cos}(\text{Phase\_angle}[x]*2)$$

$$\text{Sum\_unit\_vector\_y\_posterior} = \text{Sum\_unit\_vector\_y\_posterior} + \text{Sin}(\text{Phase\_angle}[x]*2)$$

In step S46, average phase values of the first half and the second half before a period of time are obtained by calculating angles based on the previously calculated x and y coordinates of the unit vector sum using the following formulas.

$$\text{Average\_phase\_angle\_anterior} = A\tan 2(\text{Sum\_unit\_vector\_y\_anterior}, \text{Sum\_unit\_vector\_x\_anterior})$$

$$\text{Average\_phase\_angle\_posterior} = A\tan 2(\text{Sum\_unit\_vector\_y\_posterior}, \text{Sum\_unit\_vector\_x\_posterior})$$

Here, Atan 2(y,x) is a function described as follows:
when x>=0, Arctan(y/x)
when x<=0, Sign(y)180+Arctan(y/x) (Sign(y) is a sign of y)

Steps S47 to S55 are a loop of dividing each phase into data in which a difference with an average value is less than 90° and data in which a difference with an average value is between 90° and 180° and counting each observation frequency in order to calculate a chi-square value later. In step S48, since different values are used as average values of the first half and the second half in the period of time, it is determined whether it is the first half in the period of time. When it is the first half, in step S49, a first half average phase value is stored in a variable Average_pa, and when it is the second half, in step S50, a second half average phase value is stored in the variable Average_pa. Further, for example, an angular difference between 10° and 170° is calculated as 20° which is the shortest distance other than 160°, the following formula is used in step S51.

Diff_angle=|Average_pa−A tan 2(Sin(Average_pa)+
    Sin(Phase_angle[$x$]*2), Cos(Average_pa)+Cos
    (Phase_angle[$x$]*2))|

In step S51, it is determined whether the angular difference is smaller than 90°. When the angular difference is smaller than 90° (Yes in step S52), the process of step S53 is performed, and when the angular difference is larger than 90° (No in step S52), the process of step S54 is performed. As a result, M points are divided into two groups, and each observation frequency is counted (steps S53 and S54).

In the loop of steps S47 to S55, if data has a uniform distribution, an occurrence frequency expectation value of each group is M/2, and in step S56, a process of calculating the value is performed.

Then, in step S57, a chi-square value ($\chi 2$) obtained by dividing a square sum of a difference between the expectation value and each observation frequency by the expectation value is obtained by the following formula:

$\chi^2$=((Observed[0]−Expected)^2+(Observed[1]−Expected)^2)/Expected

Further, in step S58, a value associated with $\chi^2$ is calculated based on a "chi-square distribution table of a degree of freedom of 1" read in an arrangement Chi_probability[ ] in a memory when a program is activated. Since a suffix of the arrangement Chi_probability[ ] is an integer of 0 or more, a value of $\chi^2$ is converted into an integer as well. This is used as the "phase variation chi-square one-sided probability" of the determination criterion data, and represents a probability of a uniform distribution in which phase chronological data is balanced in the first half and the second half of the period of time, and in case of a moving RFID tag, this value is high.

In other words, a process of obtaining an average phase value of M pieces of data during a target period of time is performed, and a process of dividing all data into N groups based on a difference with an average is performed. In the above example, data is divided into two based on the angular difference, but data may be divided into N groups. In case of data of a uniform distribution, an expectation value of a frequency of all groups is M/N. Further, a process of calculating the chi-square statistic ($\chi^2$) based on the occurrence frequency of each group is performed. Further, a process of obtaining a one-sided probability (P) that the value of the chi-square statistic ($\chi^2$) will occur at a degree of freedom of N−1 is performed. At this time, in order to reduce processing when a program is activated, a previously calculated representative value may be stored in a memory. Further, the value can be regarded as a probability in which phase data has a uniform distribution.

Then, it is determined whether the one-sided probability is larger than a previously set threshold value by comparing the threshold value with the obtained one-sided probability (P). When the one-sided probability (P) is smaller than the threshold value, an RFID tag is determined as a static RFID tag, and when the one-sided probability (P) is larger than the threshold value, an RFID tag is determined as a moving RFID tag.

It is possible to identify whether or an RFID tag is moving or static in the above-described way. Further, in an application such as a security gate in which there should be no erroneous detection of determining that an RFID tag is moving when an RFID tag is not actually moving, erroneous detection can be reduced by setting a high value as the threshold value.

Meanwhile, when only the above-described technique using the phase is used, movement in a place remote from the antenna 20 or movement in the side or the read of the antenna 20 that is originally undesired to be detected is likely to be detected. Further, when only the technique using the received radio wave strength is used, erroneous movement detection is likely to occur when a person or an object moves after a radio wave is blocked for a long time. In this regard, in order to a possibility of erroneous detection, an individual static RFID tag filter may be configured using a plurality of techniques including the technique using the number of possible readings per second, and movement of an RFID tag can be identified with a high degree of accuracy using an individual static RFID tag filter configured using a combination of techniques or all techniques.

Figures 12B, 12C:
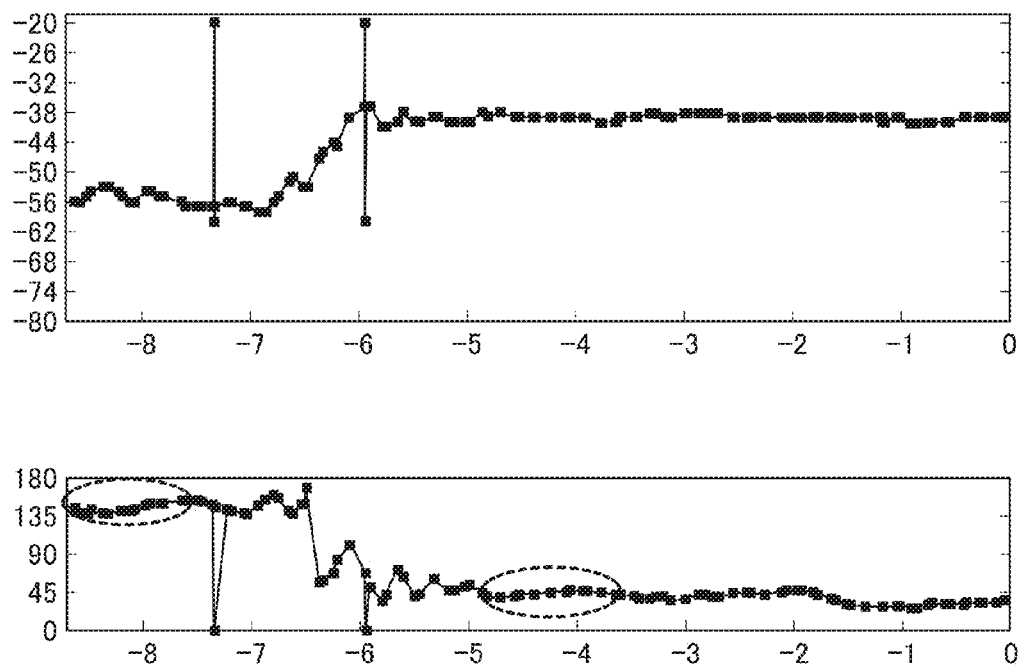
FIG. 12B is a graph illustrating chronological data obtained by measuring received radio wave strength (upper graph) and a phase (lower graph) of a static tag.
FIG. 12C is a diagram an example in which phase waggling is represented by a numerical number.

FIG. 12B is a graph illustrating chronological data obtained by measuring received radio wave strength (an upper graph) and a phase (a lower graph: 0° to 180°) of the tag 31 when the RFID tag 31 is actually arranged to be in a static place as illustrated in FIG. 1, and a person having no RFID tag gets away from the antenna 20 after a radio wave is blocked for a long time in front of the antenna 20. A period of time T1 defined by straight lines of the upper graph, received radio wave strength mountain shapes (rising parts of a mounting) at a certain number or more of readings per second are detected, but phase values are not uniformly distributed during or after the period of time T1, and when phase values are not uniformly distributed, an RFID tag can be identified as a static RFID tag as described above.

A slope of change in the phase when it is approaching the antenna 20 is opposite to a slope when it is getting away from the antenna 20. It is possible to identify whether an RFID tag has moved in a direction horizontal to the antenna 20 or a direction vertical to the antenna 20 by comparing a time at which an inflection point occurs with a point in time at which a peak of received radio wave strength occurs. As a result, it is possible to detect only an RFID tag that has passed through the gate which is important in an application such as a security gate.

Figure 11A:
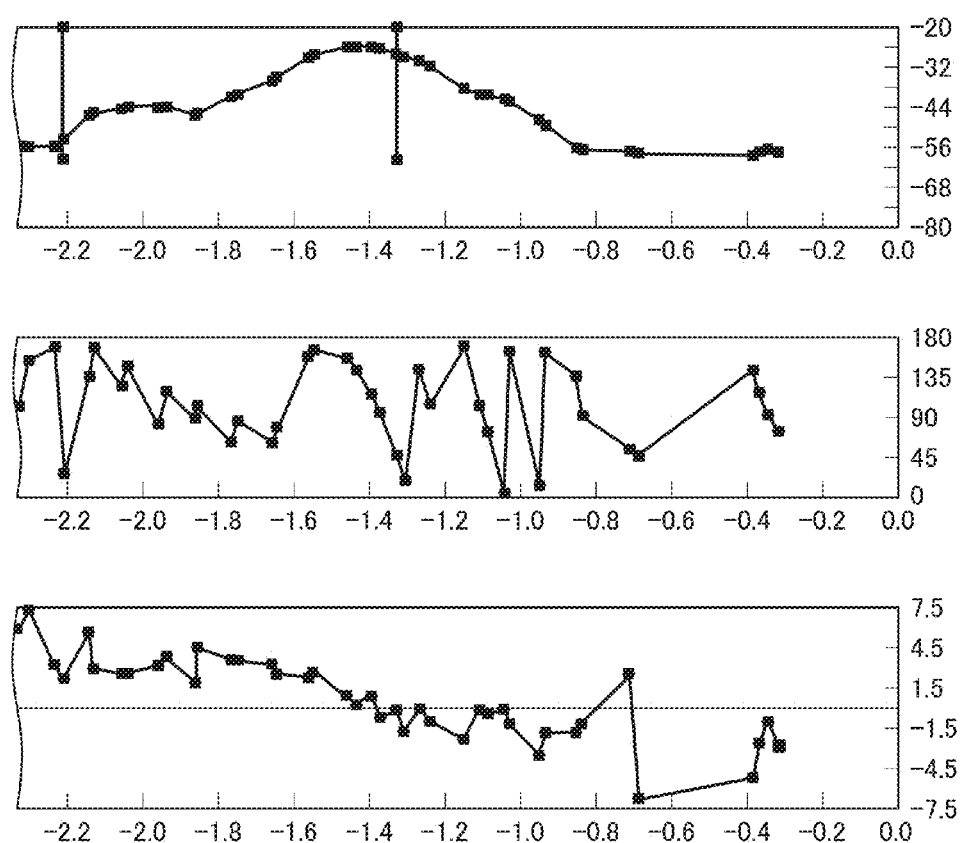
FIG. 11A is a graph illustrating chronological data obtained by measuring a graph of an RSSI (received radio wave strength), a phase, and a Doppler frequency of a tag moving in a horizontal direction.

FIG. 11A illustrates graphs of actual chronological data of the RSSI, the phase, and the Doppler frequency in order from the top when a person walks near an antenna in the horizontal direction with a shirt with a tag in hand. A unit of an x axis is a second, and the more data is on the left, the older data is. It is identified that an RFID tag is moving based on data in a period of time (−2.2 to −1.3 seconds) defined by two vertical lines on the RSSI graph. In FIG. 11A, an RSSI peak point occurs nearby −1.5 seconds, but an inflection point and the Doppler frequency of 0 occurs around that peak point.

The phase is a function of a tag and a distance in a radial direction of a reader antenna as illustrated in Formula (5), and a direction of change when it is approaching an antenna is opposite to when it is getting away from an antenna, and an inflection point occurs in a graph at a point at which a velocity is 0 [m/s]. In order to obtain information of a phase change, read data of two points is necessary, but when movement of 7.86 cm or more (when a frequency is 953 MHz and a phase is between 0° and) 180° occurs between acquisition points thereof, there are two directions of change, and it is difficult to distinguish two change directions. When an interval between the acquisition points is large, for example, when the number of simultaneously read tags or the amount of tag response data is large, there are cases in which it is difficult to detect a correct change direction.

Meanwhile, in case of the Doppler frequency expressed by Formula (6), since information can be acquired based on read data of one point, even when movement is performed at a high speed, a direction of change can be detected based on a sign thereof. A moving velocity of a tag in a radial direction is obtained using Formula (7) modified from Formula (6).

[Equation 1]

$$f_m = \frac{v}{c} f \qquad \text{Formula (6)}$$

[Equation 2]

$$v = \frac{f_m}{f} c \qquad \text{Formula (7)}$$

Figure 11B:
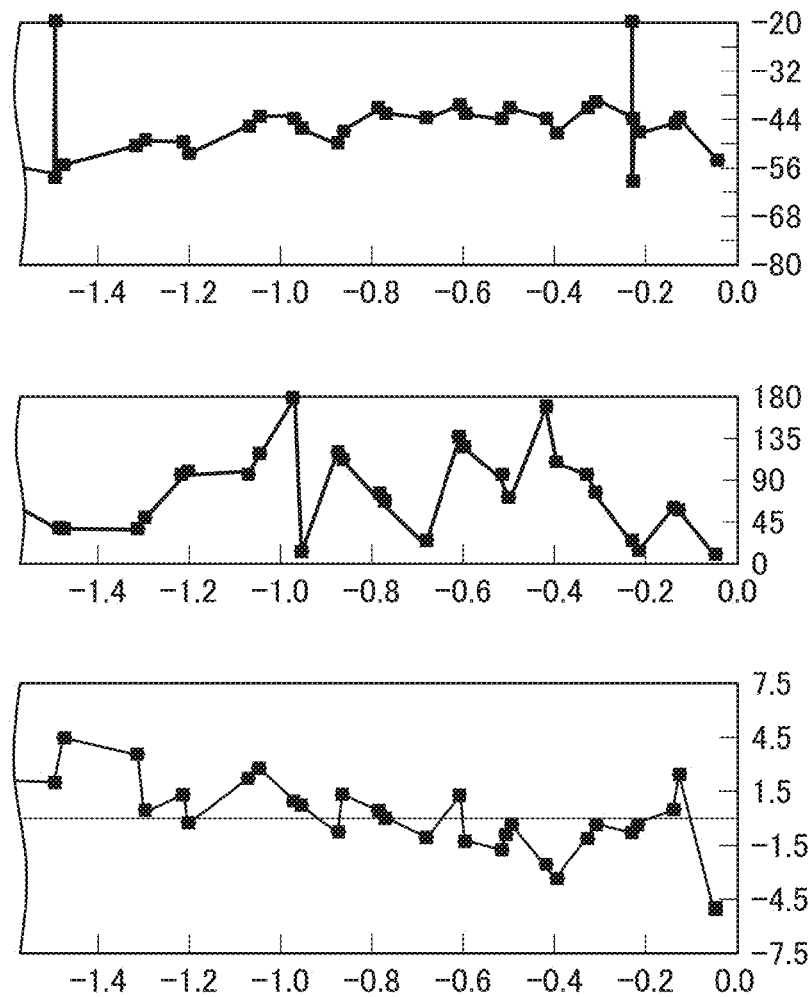
FIG. 11B is a graph illustrating chronological data obtained by measuring a graph of an RSSI, a phase, and a Doppler frequency of a tag moving in a vertical direction.

In the Doppler frequency graphs of FIGS. 11A and 11B, a unit of a vertical axis is [Hz], but it can be converted into a velocity per hour [km/h] by multiplying a value by 1.1.

FIG. 11B illustrates data obtained when a person walks in a direction from the rear of an antenna to the front thereof in the same environment as FIG. 11A. In a phase graph, a downward line that transitions from a point close to 180° to a point close to 0° is drawn nearby −1.0 seconds, but since a phase is periodic data, a slope of change in that period of time is actually positive. Thereafter, since a slope between two points fixed nearby −0.9 seconds is negative, a phase inflection point occurs nearby −0.95 seconds, and a Doppler frequency nearby −0.95 seconds is close to 0. Nearby −0.3 seconds, an RSSI peak occurs, but a slope of the phase is negative, and the Doppler frequency has a negative value. A time difference of about 0.65 seconds occurs from a point at which the Doppler frequency is 0 to a point at which an RSSI peak occurs.

From the above, it can be understood that it is possible to identify that a vertical direction movement has been performed when there is a time difference between the occurrence of the RSSI peak and the phase inflection point or the occurrence of the point at which the Doppler frequency is 0. In the Doppler frequency graphs of FIGS. 11A and 11B, the Doppler frequency waggles, but this is considered to be influenced by swinging of a person's hand, shaking in the vertical direction, or the like. In view of this influence, in the determination criterion data calculation illustrated in FIG. 9B, a Doppler frequency average value during a certain period of time other than a value at only one pint is calculated.

FIG. 12A are graphs illustrating received radio wave strength (upper graph) and a phase (lower graph) of a moving tag, and a phase of an RFID tag being moving typically continuously changes as illustrated in FIG. 12A. Further, an RFID tag that is a static state as illustrated in FIG. 12B continuously has a certain value as indicated by circles in the lower graph. Since a person has moved after staying in front of an antenna during a long time, a static tag hidden behind a person changes in received radio wave strength (a part defined by straight lines), and a tag is erroneously recognized as a moving tag. In this period of time, waggling of a phase is lower compared to a real moving RFID tag.

FIG. 12C is a diagram illustrating an example in which waggling of a phase is indicated by a numerical number, and waggling of a phase is indicated by a numerical number between 0 to 100 as illustrated in FIG. 12C. When a small value is set as the threshold value of the phase shift reduction filter, more RFID tags are identified as a moving RFID tag. When the threshold value is set to 0, all RFID tags are regarded as a candidate moving RFID tag (no filter), and when the threshold value is set to 100, all RFID tags are identified as a static RFID tag. A default value is 5, but the default value can be appropriately adjusted by an identification parameter setting tool.

As described above, in various kinds of static RFID tag filters F, parameters optimal to whether to use or not, a threshold value, and the like differ according to circumstances such as a radio wave output or performance of the RFID reader 10, the used antenna 20, a performance of an RFID tag, an assumed position of a surrounding static RFID tag, and the number of RFID tags. Since the optimal parameters are different, it is desirable that in an actual reading environment, in order to check in advance, for example, behavior or data is collected while moving an RFID tag, and an optimal parameter in which an environmental difference is absorbed is obtained based on the data.

Figure 16A:
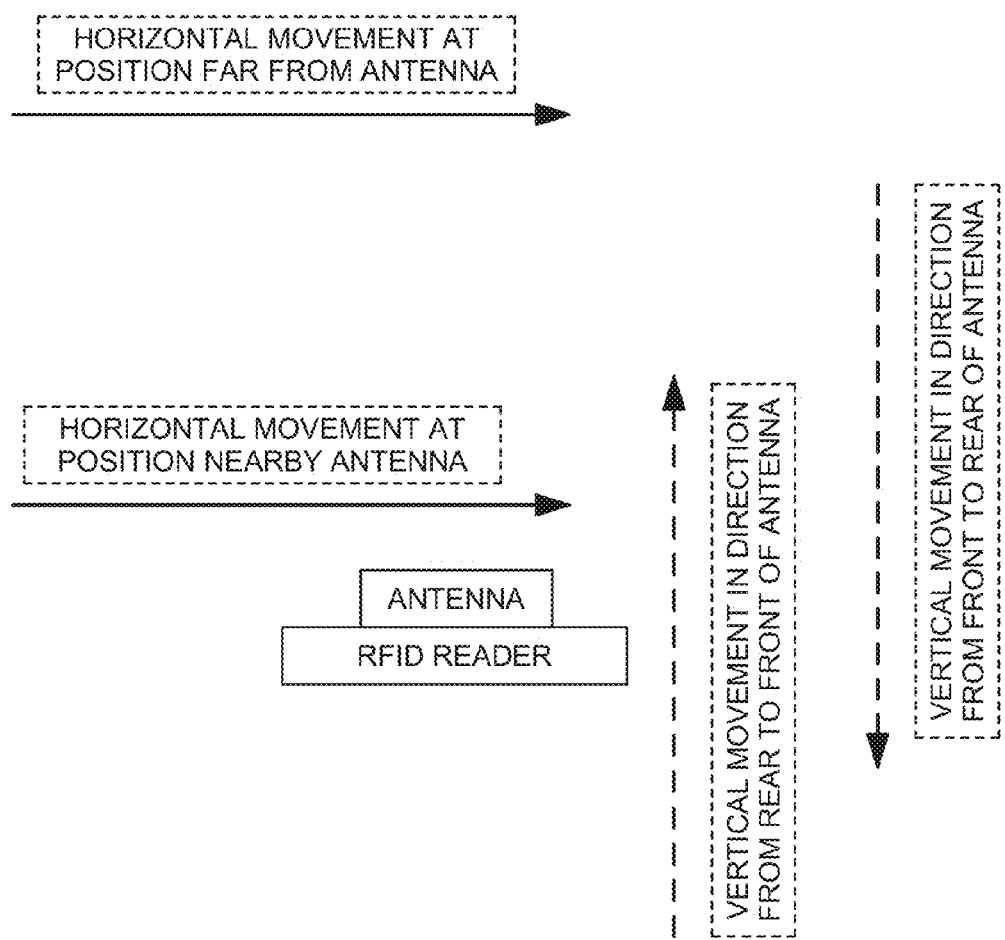
FIG. 16A is a conceptual diagram in which movements of an RFID tag are divided into four.

Depending on an application purpose of the present invention, there are cases in which it is necessary to further filter a moving tag according to a distance between an RFID tag and an antenna or a moving direction as well. For example, when the present invention is applied to reception and shipment checking in warehouses having a plurality of gates for reception and shipment, there are cases in which it is desired to detect only tag movement in a gate in which an antenna is installed, but it is undesired to detect movement in a neighboring separate gate. Further, when the present invention is applied to an anti-theft gate, there are many cases in which it is desired to detect only products that are likely to be stolen and have moved in the horizontal direction in front of an antenna, and it is undesired to detect vertical direction movement corresponding to movement of shoppers in stores. FIG. 16A is a conceptual diagram in which movements are divided into four types, and FIG. 16B illustrates determination criterion information and filter name used to filter each movement.

In case of horizontal direction movement from the position far from an antenna, movement is detected only in a place in which RSSI is high on an antenna radiation pattern as indicated by a dashed arrow in the upper portion of FIG. 16C, and a reduction in the distance in the radial direction of the antenna is small, and thus there are many cases in which such horizontal direction movement can be excluded by the "RSSI non-contiguous increase filter". Further, according to Frith's formula, the RSSI is low in a place at a long distance, and RSSI waggling hardly occurs as indicated in the Rayleigh distribution and the Nakagami-Rice distribution, and thus the "RSSI absolute value filter" is effective as well. Further, since it is difficult to provide with a distant tag with sufficient power and read the distant tag, there are cases in which the quick-read filter is useful as well. On the other hand, when it is desired to detect movement at a long distance from an antenna, the threshold values of the filters are loosely set.

Figure 16D:
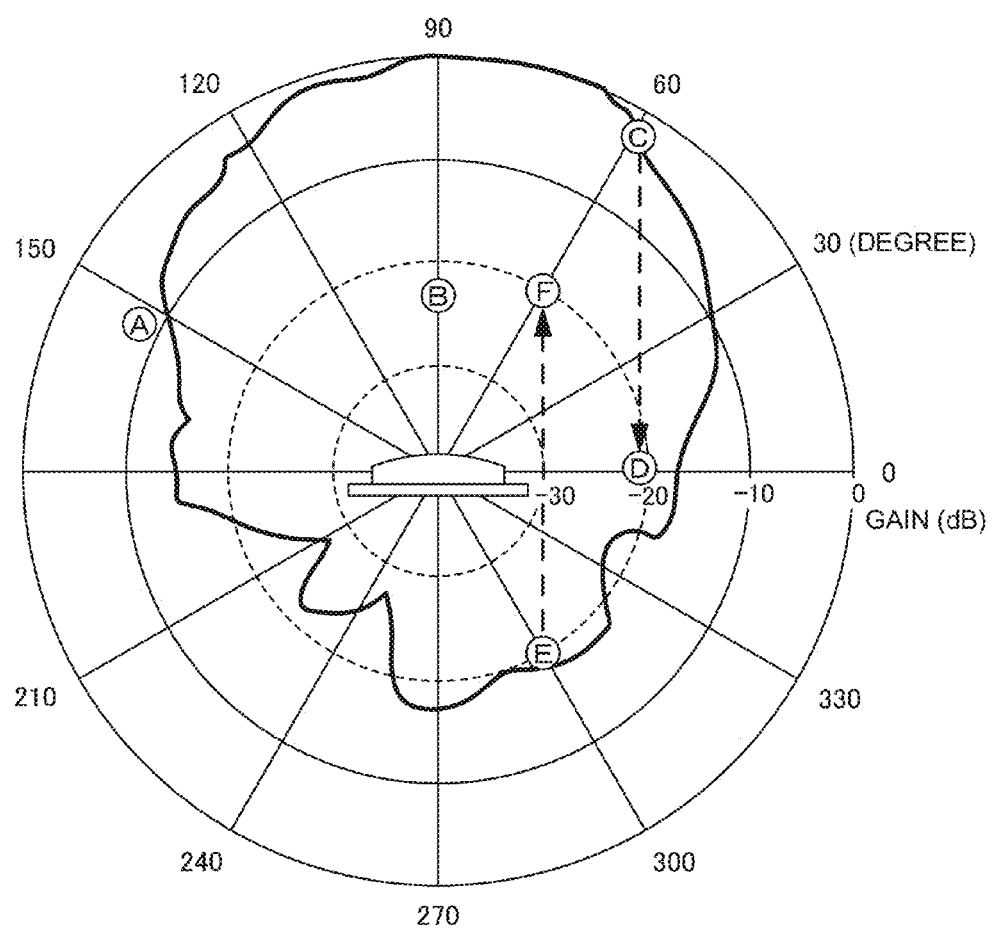
FIG. 16D is an explanatory diagram illustrating the same radio wave radiation pattern as in FIG. 13B in connection with vertical movement.

In case of vertical direction movement in a direction from the front of an antenna to the read thereof such as from a point C to a point D in FIG. 16D, the distance is ½, and so the RSSI is +12 dB, but the RSSI is −20 dB in view of the antenna radiation pattern, and the sum is −8 dB, and thus such vertical direction movement can be filtered through the "RSSI non-contiguous increase filter."

Meanwhile, in case of vertical direction movement in a direction from the rear of an antenna to the front thereof such as from a point E to a point F in FIG. 16D, since an increase in the RSSI is +30 dB or more in view of the antenna radiation pattern, it is difficult to filter such vertical direction movement through the "RSSI non-contiguous increase filter" or the like. In this regard, in case of vertical direction movement, filtering is performed using the fact that a radio component velocity is not zero (0) when an RSSI peak occurs. Such a method will be described below.

Figure 17A:
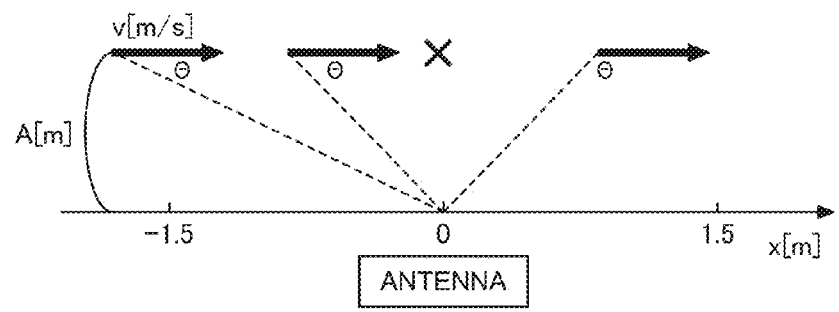
FIG. 17A is an explanatory diagram illustrating a relation between movement and an angle of an RFID tag with respect to an antenna.
Figure 17B:
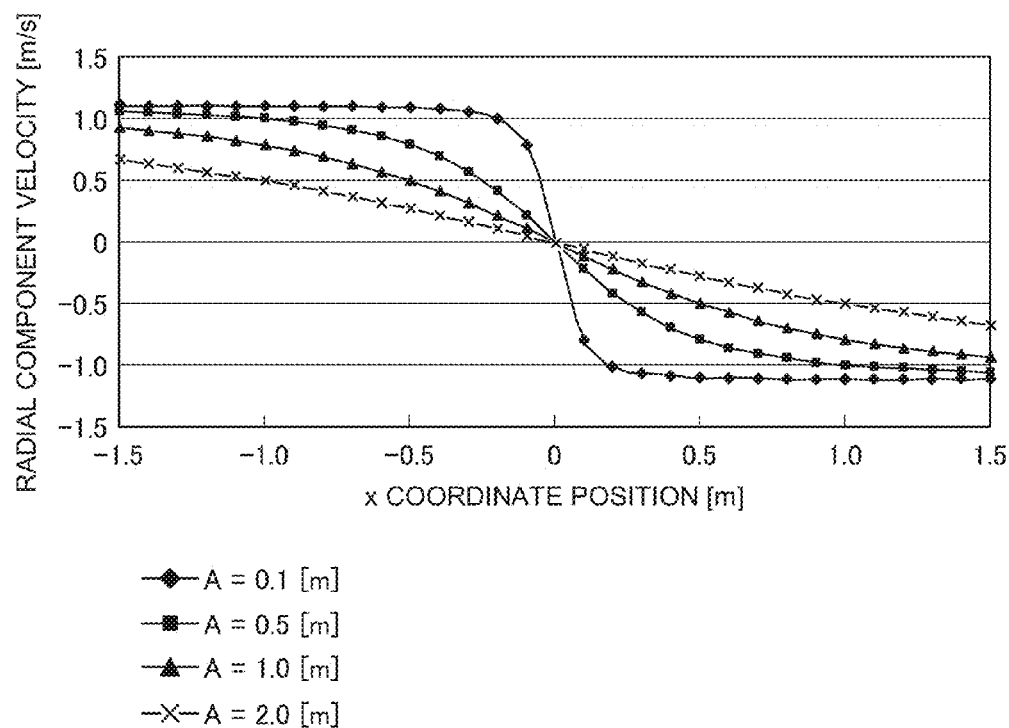
FIG. 17B is a graph illustrating a change in a radial component velocity according to movement of an RFID tag.

When a tag passes through a point A[m] from an antenna in the horizontal direction at a velocity v[m/s] as illustrated in FIG. 17A, the velocity of a radial direction (a dotted line in FIG. 17A) component toward the center of the antenna is given by $v \cdot \cos \theta$, and is 0 [m/s] at a point x=0[m] at which $\theta$ is 90°. FIG. 17B illustrates a change in a radial component velocity when x of FIG. 17A moves within a range of −1.5[m] to 1.5[m] at the velocity of 1.11 [m/s] (the velocity per hour of 4 km). The velocity in the direction toward the antenna is positive, and the velocity getting apart from the antenna is negative. The RSSI is maximum at the point x (x=0) in FIG. 17A in view the antenna radiation pattern and the straight line distance, but the radial component velocity at this point is zero (0).

Figure 17C:
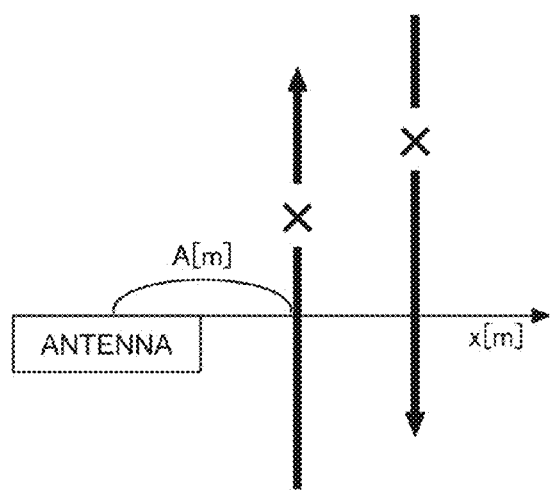
FIG. 17C is an explanatory diagram illustrating an RSSI peak occurrence position in a radiation pattern in a normal RFID antenna at the time of vertical direction movement.

Meanwhile, in case of vertical direction movement illustrated in FIG. 17C, similarly to the time of horizontal direction movement, the radial component velocity at a point on an x axis is 0 [m/s], but the RSSI peak point is typically a position such as a point x other than a point on the x axis according to a radiation pattern of a typical RFID antenna in which radio wave radiation to the rear of the antenna or the side is small. The radial component velocity at that point in time is positive in case of movement from the front to the rear and negative in case of movement from the rear to the front.

A more concrete description will be given below.

The computer device C has a known configuration and thus includes a CPU, a storage device (an external storage device or any other memory such as a HDD, a RAM, a ROM, a CD, a DVD, a BL, or a flash memory), a display, an input unit (a keyboard, a mouse, or a touch panel), an output unit (including an output relation with a radio wave, an acoustic wave, light, or any other communication means), and the like.

In this embodiment, the RFID reader 10 is connected with the computer device C as illustrated in FIG. 1. Further, a signal is received through the antenna 20, and the computer device C is configured to receive information from the RFID reader 10 and controls the RFID reader 10. In this embodiment, the computer device C is configured to control the RFID reader 10, but the same configuration as the computer device C may be mounted in the RFID reader 10, and in this case, control may be performed only by the RFID reader 10.

In this embodiment, the RFID tag movement distinguishing program includes the following three modules (software: programs):
1. Identification parameter setting tool
2. Moving tag identifying engine
3. LLRP middle ware "nice middle" (a trademark: the same shall apply hereinafter)

The modules (software: programs) operate on an OS, and are configured to operate on Windows XP (a registered trademark) or Windows 7 (a registered trademark) in this embodiment.

Further, an environment is set by the identification parameter setting tool, identification is then performed by the moving tag identifying engine, and an interface (I/F) function with an upper-level application is provided by the LLRP middle ware "nice middle" as the front end of the moving tag identifying engine. Thus, an application in which only a function of each purpose is mounted is developed. As an application, for example, an application for performing reception and shipment checking, inventory management, entering/leaving management, stolen object management, audience management, product management, sales management of products or services, or various kinds of managements according to movement of an RFID tag can be constructed.

First, since an optimal identifying method or parameter differs according to a reading environment (a configuration of the antenna 20, an RFID tag to be used, a moving velocity, a radio wave output, and the like), the parameter is set to be optimal in an actual environment, but the "identification parameter setting tool" is activated.

Through the "identification parameter setting tool," it is possible to calculate and set a determination parameter in the environment after moving a certain RFID tag. A setting content is stored in the "identification parameter retention file," and used in the "moving tag identifying engine." Depending on a parameter, there is a parameter that is used in the "identification parameter setting tool" and not used in the "moving tag identifying engine (items of blue characters in a setting screen such as a reader IP address or a transmission output). These are configured to be set to the LLRP middle ware (nice middle) from the upper-level application.

Next, a method of using the identification parameter setting tool will be described based on screen transition.

First, the identification parameter setting tool is activated by double-clicking PickMovedTagsParamsAutoConfigTool.exe. In the setting screen illustrated in FIG. 18, the RFID reader 10 to be connected is set by a "movement identification parameter" tab.

In this setting screen, in addition to setting of the RFID reader 10, an identification option, a log output, a movement identification parameter, an identification target electric product code (EPC), a movement identification parameter of each EPC, and the like are set. Here, the EPC is a code used when product identification is performed using an IC tag, and a product identification code, an identification code of a transportation container or the like, an office code, an identification code of a returnable asset, an asset management code in a company, and the like are incorporated into the EPC.

In the RFID reader setting, it is possible to specify a reader IP address, a transmission output (a radio wave output), a radio channel, an antenna number, and the like.

In the identification option (movement identification), it is possible to set whether to use the vertical direction movement filter or not, whether to display a moving direction or not, and a plurality of antenna groups, and it is possible to designate an antenna (antennas 1 to 4 together with groups A and B in this embodiment) of each group.

In the log output, it is possible to select a movement identification summary log, a replay log, and used parameter backup.

In the "movement identification parameter," it is possible to narrow down an EPC serving as a movement identification target by a setting. In a non-target EPC, an event of OnMovedTagReport does not occur.

In the movement identification parameter, it is possible to set a use data period of time, a necessary rate (%) of the number of readings per second, a necessary RSSI (dBm), a necessary RSSI difference (dB), a necessary rate (%) of RSSI increase occurrence, a necessary increase (dB) from a maximum pre-period RSSI, and the like.

An identification target EPC and a parameter setting of each EPC will be described. For the identification target EPC, an entry column is set, and when this entry column is empty, all EPCs are a target. When this entry column is filled, an EPC head is described by a hexadecimal number, and when a plurality of EPCs are designated, writing is performed using a new line. Further, up to four different movement identification parameters can be set for each EPC. For the movement identification parameter of each EPC, entry columns such as an EPC head, a necessary RSSI (dBm), a necessary RSSI difference (dB), and a necessary increase (dB) from a maximum pre-period RSSI are set.

Figure 27:
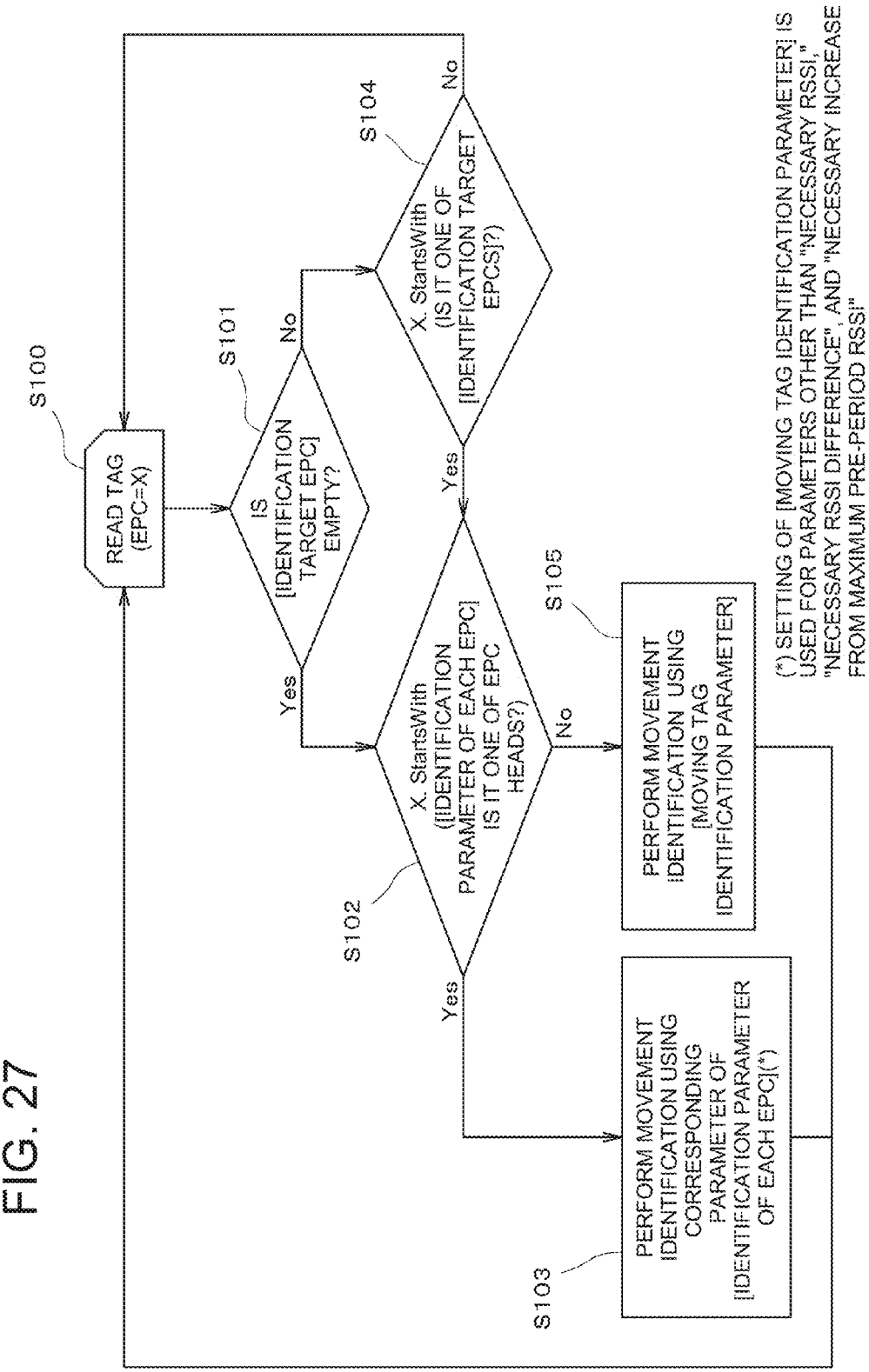
FIG. 27 is a flowchart of classifying a use parameter according to an EPC of an RFID tag.

The identification target EPC and a parameter to be used are decided as in a flowchart illustrated in FIG. 27. In other words, in step S100, tag reading (EPC=X) is performed. Then, in step S101, it is determined whether the identification target EPC is empty. When the identification target EPC is empty (Yes in step S101), in step S102, it is determined whether it is one of EPC heads in the identification parameter of each EPC. When it is one of EPC heads (Yes in step S102), in step S103, a movement identification execution process is performed using a corresponding parameter of the movement identification parameter of each EPC. Then, the process returns to step S100, and a process for a tag to be read next is similarly performed. When the identification target EPC is not empty (No in step S101), in step S104, it is determined whether it is one of identification target EPCs. When it is not one of identification target EPCs (No in step S104), the process returns to step S100, and a process for a tag to be read next is similarly performed.

When it is one of identification target EPCs (Yes in step S104), the determination of step S102 is performed. In step S102, in the identification parameter of each EPC, it is determined whether it is one of EPC heads, but when it is not one of EPC heads (No in step S102), in step S105, the movement identification execution process is performed using the moving tag identification parameter. Then, the process returns to step S100, and a process for a tag to be read next is similarly performed.

Figure 18:
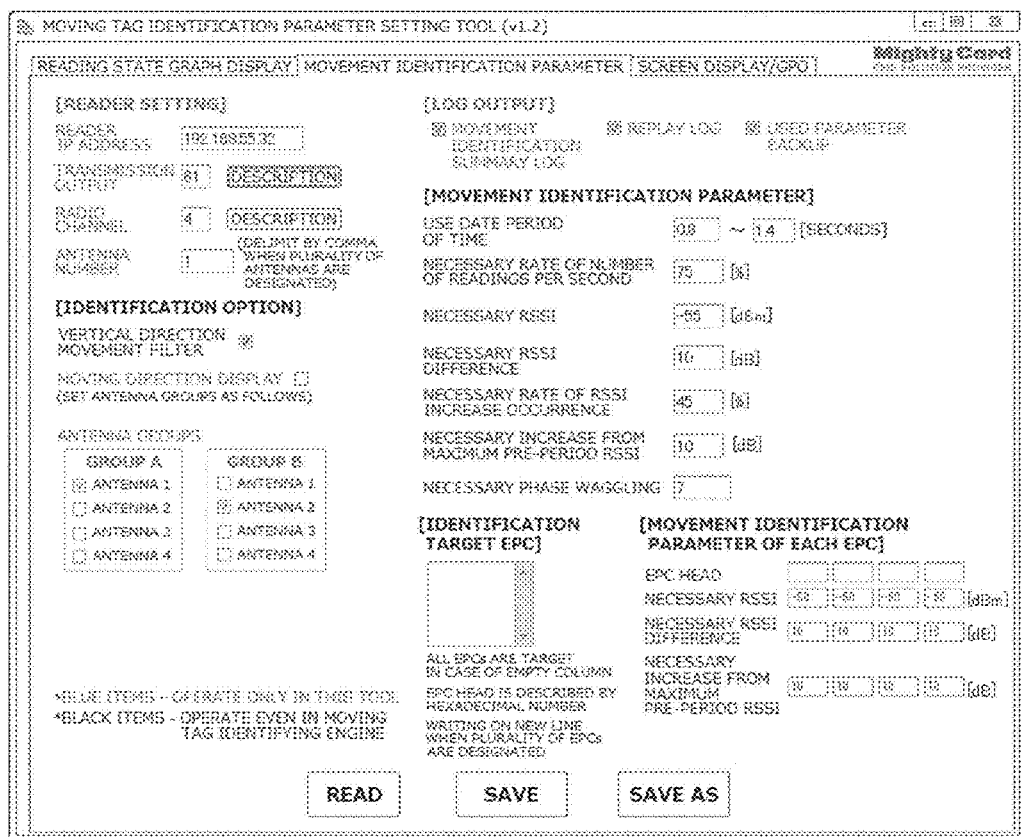
FIG. 18 illustrates a parameter setting screen.

In the setting screen illustrated in FIG. 18, when a parameter is set, the parameter is saved in the identification parameter retention file by pressing a save button.

Figure 19:
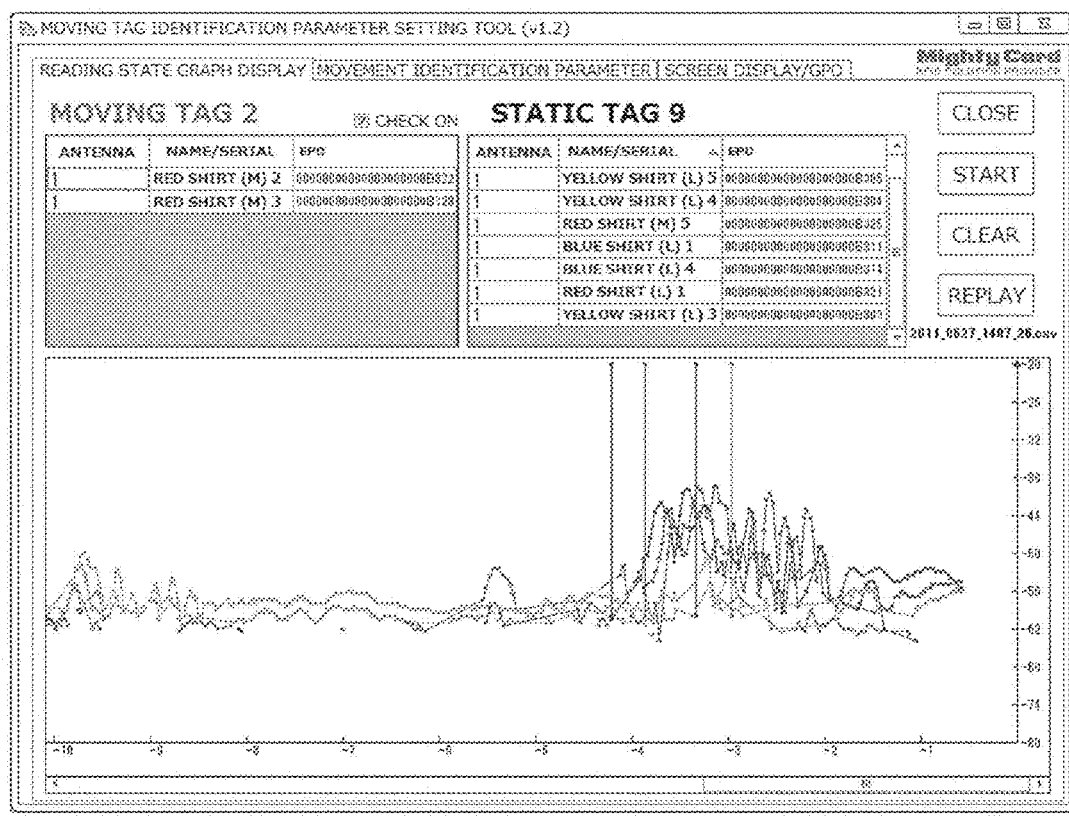
FIG. 19 is an explanatory diagram illustrating a moving RFID tag identification parameter setting.

Next, in a screen of FIG. 19 used to identify a moving tag, the screen is divided into two sections, that is, upper and lower sections, and a column of a moving tag and a column of a static tag are displayed on the upper section, and a chronological graph of a data reception record from an RFID tag is displayed on the lower section. In this screen, an "open/close" button, a "start/stop" button, a "clear" button, and a "replay" button are set. The "replay" button is to perform a replay function, and used to perform operation checking (setting content checking) after a parameter change.

Further, reading starts when the "open" button is pressed and then the "start" button is pressed, and an RFID tag identified to be moving in the current parameter is displayed on a "moving tag" column, and an RFID tag identified to be static in the current parameter is displayed on a "static tag" column. In case of a moving tag, a vertical bar is displayed in a graph at a point at which the use data period of time starts or ends. In this embodiment, a total of the number of RFID tags displayed on the screen is set to 2048, but is not limited to 2048.

Figure 20:
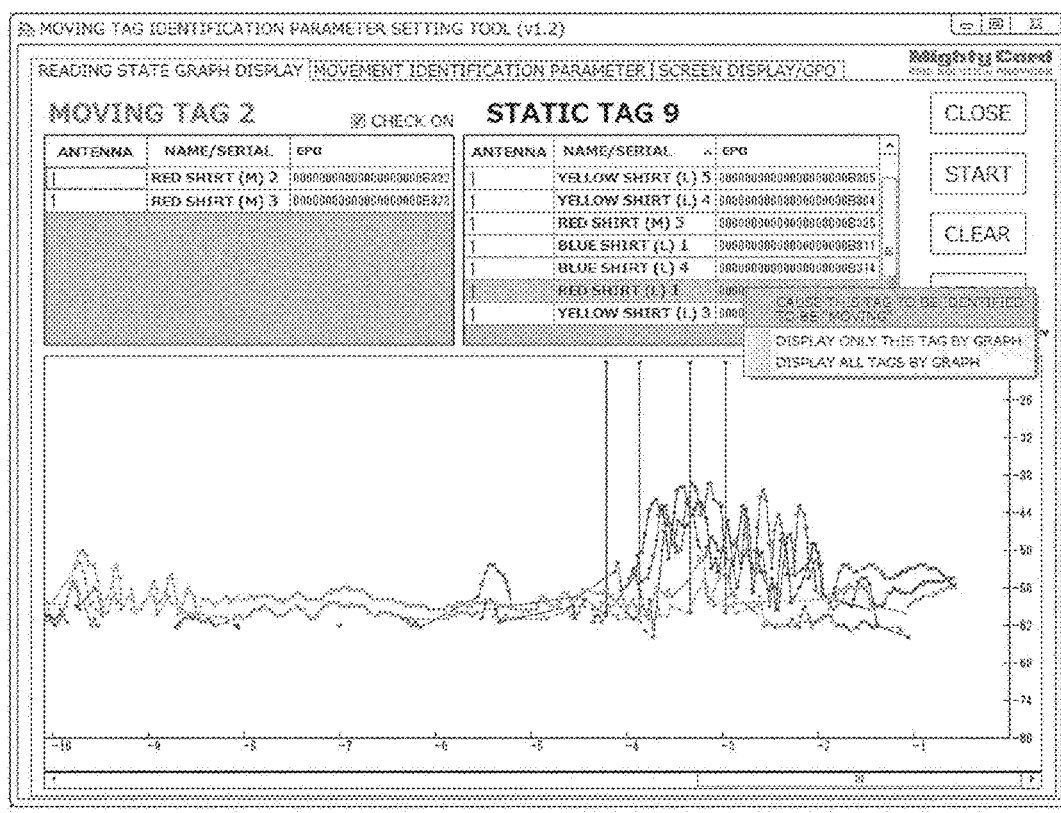
FIG. 20 is an explanatory diagram illustrating a moving RFID tag identification parameter setting.
Figure 21A:
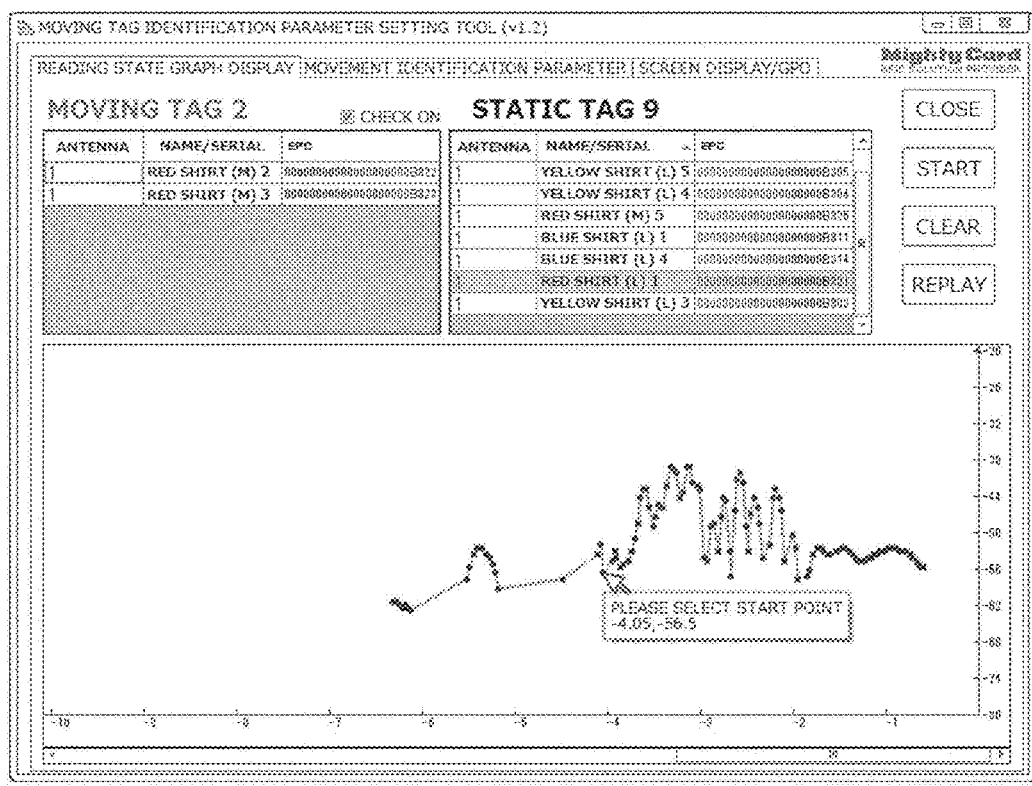
FIG. 21A is an explanatory diagram illustrating a moving RFID tag identification parameter setting.
Figure 21B:
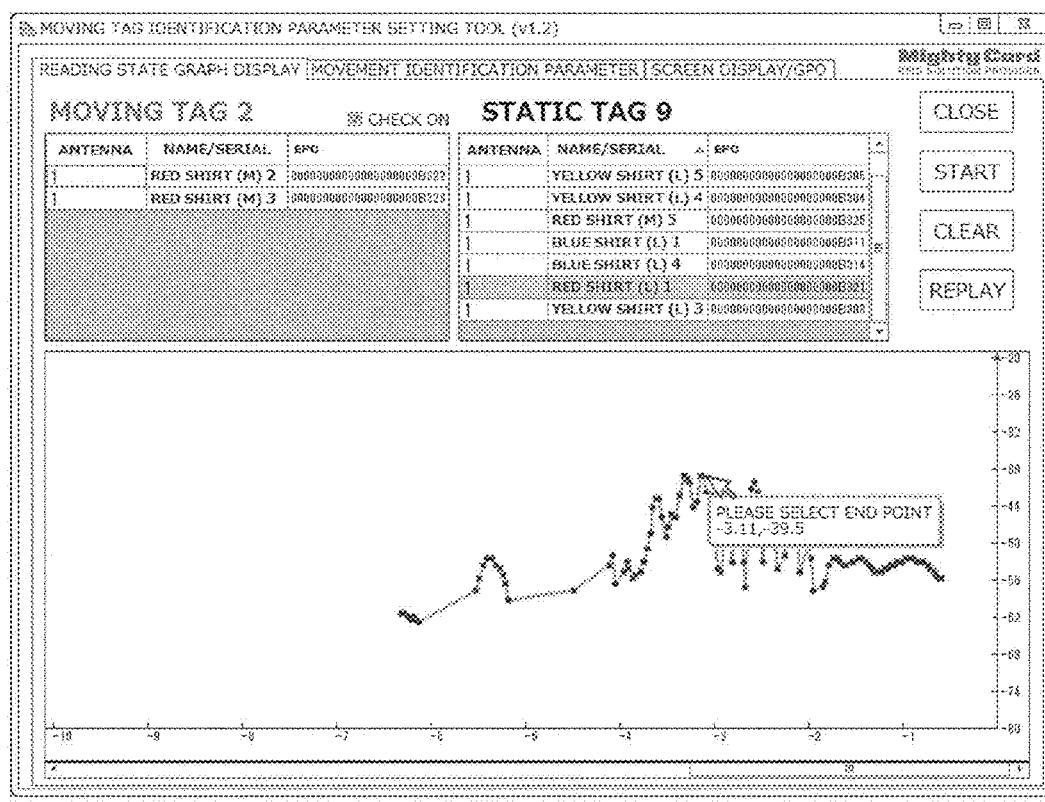
FIG. 21B is an explanatory diagram illustrating a moving RFID tag identification parameter setting.

When an RFID tag is identified as a static RFID tag even though the RFID tag has moved, as illustrated in FIG. 20, an RFID tag (a red shirt 1 in the example of FIG. 20) is selected from a list, and "change this tag to be identified to be "moving"" is selected, for example, by clicking a right button of a mouse. As a result, as illustrated in FIG. 21A, only a graph of a corresponding RFID tag is displayed on the lower section. Then, a start point and an end point of a period of time to be identified to be moving are selected. The selection is performed, for example, by clicking the left button of the mouse. At this time, as illustrated in FIGS. 21A and 21B, it is possible to select a point at which a numerical value is displayed below a message "please select start (end) point." As a result, a start point and an end point of an increase in a received radio wave strength of a range in which reading is stably performed are selected.

Further, the selection is cancelled when an area having no point in the graph is double-clicked.

Figure 22:
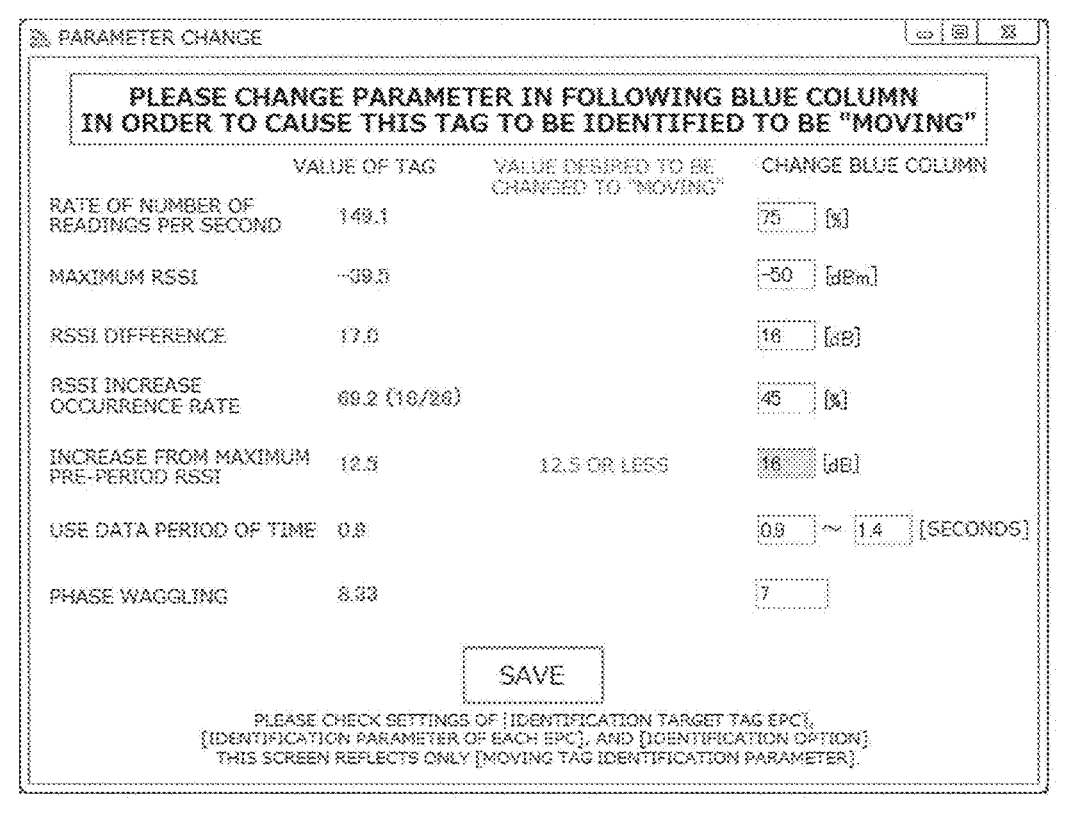

When data of a selected range is identified to be "moving" as described above, a parameter change screen is displayed as illustrated in FIG. 22. On this parameter change screen, a value of this RFID tag, a value desired to be changed to "moving," and a column for "change blue column" are displayed together with a message "please change parameter in following blue column in order to change this tag to be identified to be "moving"." Among a necessary rate (%) of the number of readings per second, a maximum RSSI (dBm), the RSSI difference (dB), a necessary rate (%) of RSSI increase occurrence, a necessary increase (dB) from maximum pre-period RSSI, a use data period of time, and phase waggling, a parameter that needs to be changed is displayed in blue characters. In this embodiment, a value (an increase from the maximum pre-period RSSI is "12.5 or less") to be changed is displayed at a position of the "value desired to be changed to "moving"." Further, an operation of changing a numerical number of a blue column is performed, and then an operation of pressing the "save" button is performed.

Figure 23:
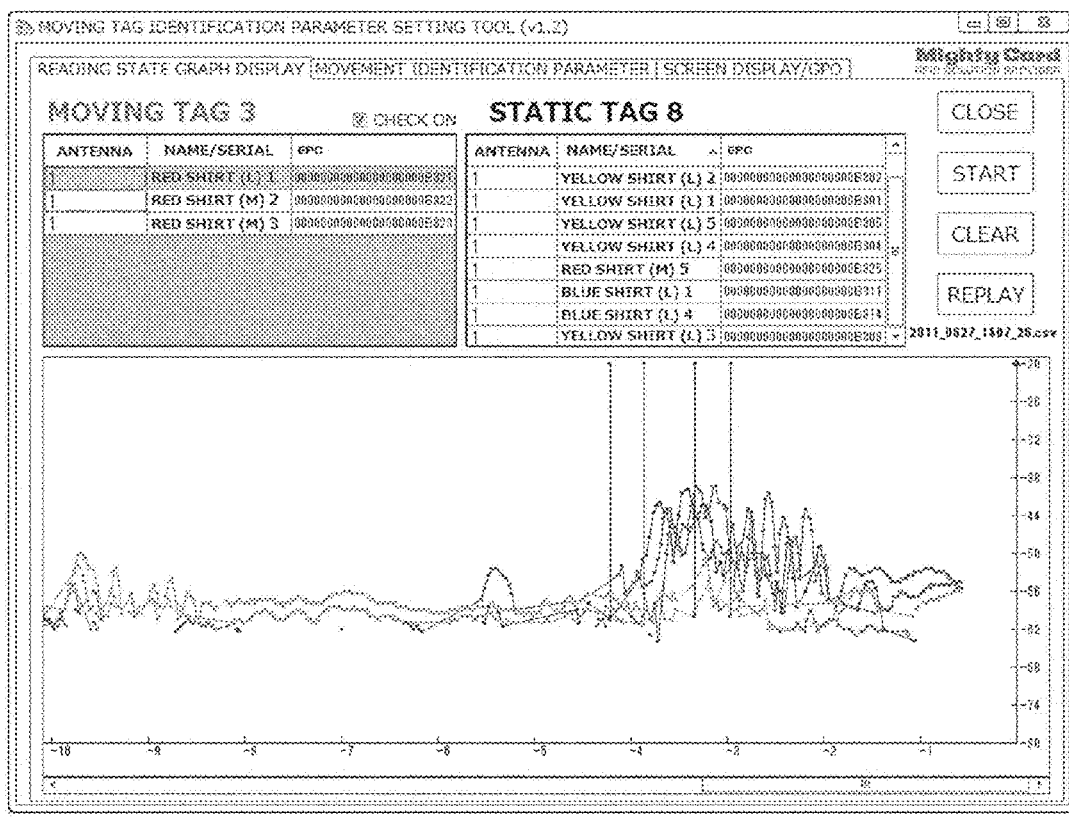
FIG. 23 is an explanatory diagram a screen after a moving RFID tag identification parameter is changed.

Further, in order to check an operation after the parameter change, as illustrated in FIG. 23, by pressing the "replay" button and selecting a corresponding replay log, it is possible to check an operation after the parameter change. In this embodiment, a log file name is displayed below the "replay" button. Further, in this embodiment, a setting is made such that a replay of data storing logs during a long period of time (one minute or more) is not supported, but the setting is not limited to this example. When an antenna number at the time of reading is different from a setting at the time of replaying, since a graph of an RFID tag selected from a list is not selected, it is used according to a setting.

Figure 24:
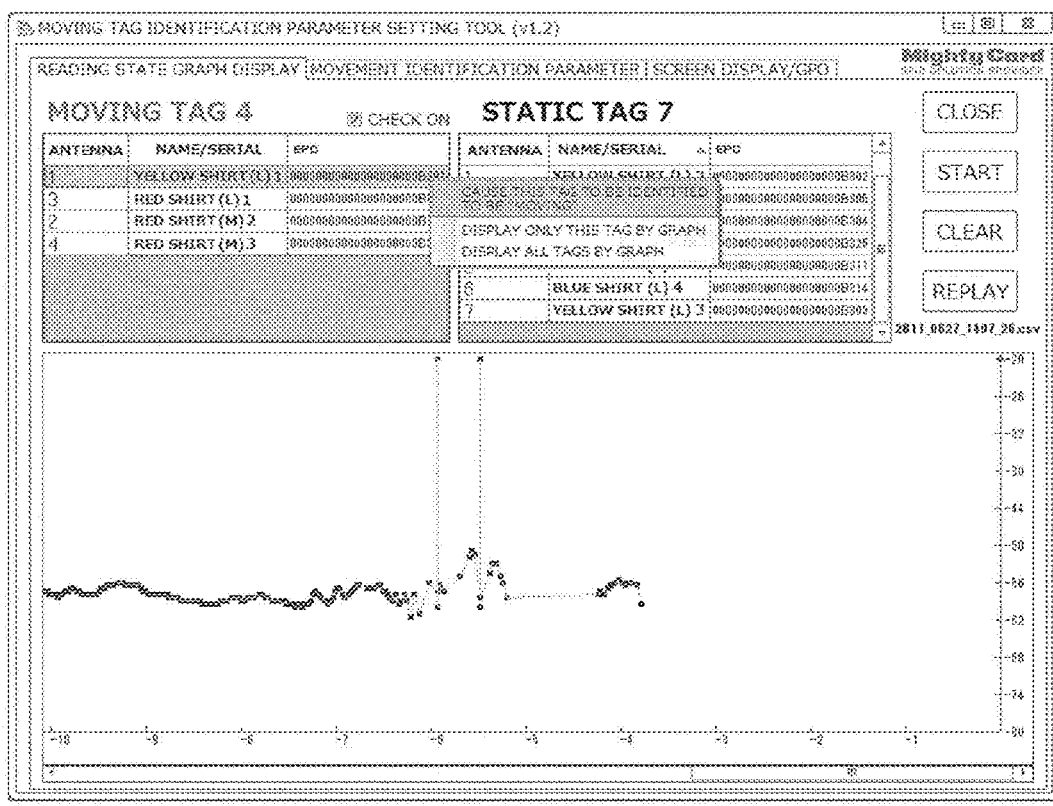
FIG. 24 is an explanatory diagram illustrating a moving RFID tag identification parameter setting screen.

Meanwhile, in order to change an RFID tag identified to be moving to "static," as illustrated in FIG. 24, "change this tag to be identified to be "static" is selected by clicking the right button on a corresponding RFID tag. As a result, as illustrated in FIG. 25, among a necessary rate (%) of the number of readings per second, the maximum RSSI (dBm), the RSSI difference (dB), necessary rate (%) of RSSI increase occurrence, a necessary increase (dB) from maximum pre-period RSSI, the use data period of time, and phase waggling, changeable parameters are displayed in blue characters in columns of a value of this RFIG tag, a value desired to be changed to "static," and "change any" together with a message "please change any of following parameters in order to change this tag to be identified to be "static"." In this embodiment, the column of "change any" that is an item to be changed among these items is displayed in blue, and guidance for a value desired to be changed to "static" is displayed.

Thus, an operation of changing one or more numerical numbers to a "value desired to be changed to "static"" is performed, and then an operation of pressing the "save" button is performed.

Figure 26:
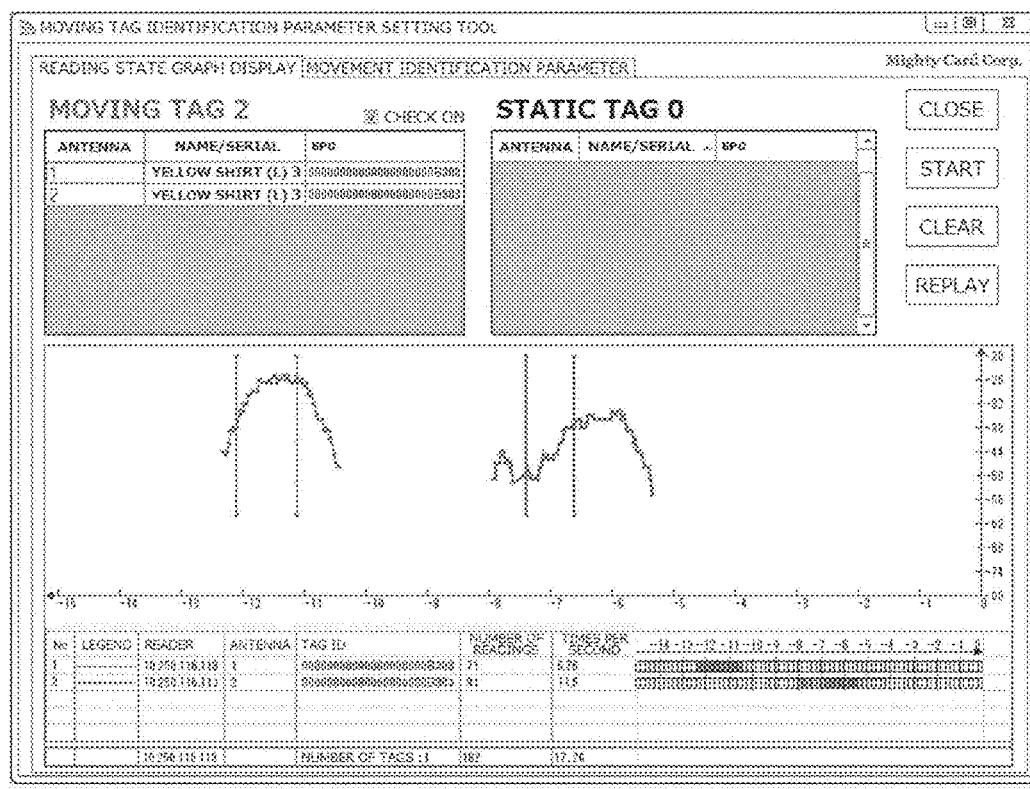
FIG. 26 is an explanatory diagram illustrating a moving RFID tag identification setting screen when there are two antennas.

When a plurality of antennas 20 are set, movement identification is performed by each of the antennas 20. FIG. 26 illustrates an example in which the same RFID tag passes through in front of the antennas 20 (both of the two antennas). Further, after a setting of the antenna 20 is changed in the movement identification parameter screen, a re-connection with the RFID reader 10 is performed by pressing the "close" button and then the "open" button.

Next, the log file will be described.

In the identification parameter setting tool, four log files of a movement identification summary log, a replay log, a used parameter backup, and an error log are output. It is possible to set whether the movement identification summary log, the replay log, and the used parameter backup are output through the "movement identification parameter" screen.

(1) Movement Identification Summary Log

Tag information is stored at a timing at which a tag is displayed as static or moving in a "reading state graph display" screen. For a tag that has moved, "static" is first output, and then "moving" is output.

A file name of a date and a time on which a start button is pressed is generated under the control of .\LOG directory.

File name example: SUMMARY_2010_1217_1115_45.csv

Output content includes a PC time when tag information is displayed, static/moved identification, an EPC, PCBits, ReaderIp, AntennaId, RSSI, and (information of no. 6 and later of Table 2 in case of a moving tag)

Output Examples

2010/12/24

19:07:40.108, STATIC, 000000000000000000000B302, 3000,192.168.5 5.31,1, -59

2010/12/24

19:07:43.061,MOVED,000000000000000000000B302, 3000,192.168.55   .31,1,   -32,0.8,1293217662.753, 1293217663.538,30,1.293,18.0,0.448,16 .5,13.80,04

(2) Replay Log

In this embodiment, all read data is stored for the replay function. When reading is performed for a long period of time, it is desirable to turn off an output.

File name example: 2010_1217_1115_45.csv (3) Used parameter backup

Backup of used identification parameter. It is created initially after the tool is activated and when a start button is pressed after the parameter change.

File name example: 2011_0616_2118_27.xml (4) Error log

A connection error with the reader, a program error, or the like is output.

File name: PACT_debug.log

Next, the moving tag identifying engine will be described.

As described above, the moving tag identification is performed by the method set by the identification parameter setting tool.

The middle ware (nice middle) used in this embodiment provides an interface (I/F) function with an upper-level application as the front end of the moving tag identifying engine. An upper-level application developer conducts development with reference to a document of moving tag identification software and a user manual, a help file, and a sample source of the nice middle.

As an RFID reader/writer used in this embodiment, for example, Impinj Speedway: F/W version 3.2.4 (no LBT version), Impinj Speedway Revolution: F/W version 4.6.1 or later (no LBT), or the like may be used.

An OS operating in this embodiment and a development environment example of an upper layer application are WindowsXP (a registered trademark) or Windows7 (a registered trademark) OS and a Microsoft VisualStudio (a registered trademark) development environment, similarly to the middle ware "nice middle." Examples of a more specific configuration file include:

PickMovedTagsAgent.dll (moving tag identifying engine)

PickMovedTagsAgent.xml (identification parameter retention file: non-editable)

PickMovedTagsParamsAutoConfigTool.exe (identification parameter setting tool)

MightyControl.dll (the identification parameter setting tool configuration file)

EPCtoNAME.csv (a name is displayed in a "name/serial" column when an EPC in this file is read by the identification parameter automatic setting tool. A name and a PEC are described in a CSV format. It is necessary to re-activate the tool after the change. In case of an EPC not included in this file, lower 3 bytes (6 characters at the right side of the EPC column) are displayed in the "name/serial" column by a decimal number)

log4net.dll (Apache log4net library used when an error log is output by the identification parameter setting tool)

LICENSE.txt, NOTICE.txt (LICENSE and NOTICE of Apache log4net)

.\WAVE\notify.wav (sound file output when a moving tag is identified by the identification parameter setting tool ♡moving tag. A sound can be changed by overwriting another WAVE file on this file.)

.\Ja-JP\PickMovedTagsParamsAutoConfigTool.resources.dll MightyControl.resources.dll ("Japanese (Japan)" resource file for the identification parameter setting tool)

.\LOG\ (log file storing directory)

The other files (LLRP.dll, LLRP.Impinj.dll, LLRPNiceM-W.dll, SET_READER_CONFIG.xml) are configuration files of the nice middle.

Figure 2:
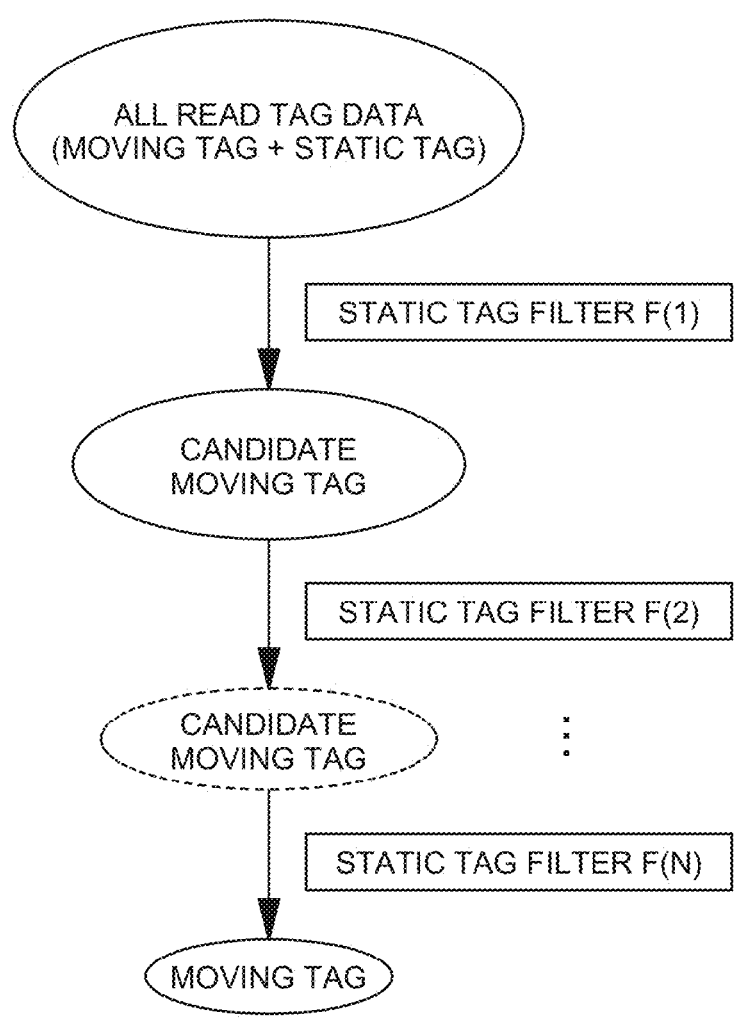
FIG. 2 is an explanatory diagram for describing an RFID tag movement distinguishing method.

In the movement identification method of this embodiment, basically, tags remaining after excluding static tags from all read tags are recognized as a moving tag. In other words, as illustrated in FIG. 2, a static RFID tag is specified and taken out from all read tag data (both an RFID tag being moving and an RFID tag being static) obtained by reading all RFID tags using a plurality of individual static RFID tag filter. For example, RFID tags of a movement candidate are narrowed down by a first individual static tag filter F (1), and an RFID tag of a movement candidate is specified by narrowing down the narrowed-down RFID tags of the movement candidate by a second static RFID tag filter F (2). Further, in order to narrow down by a next individual static RFID tag filter and further improve an accuracy, an RFID tag being moving is finally specified as a moving RFID tag using a plurality of individual static RFID tag filter such as an N-th individual static RFID tag filter F (N) and the like.

Next, the identification parameter setting tool will be described.

Figure 14A:
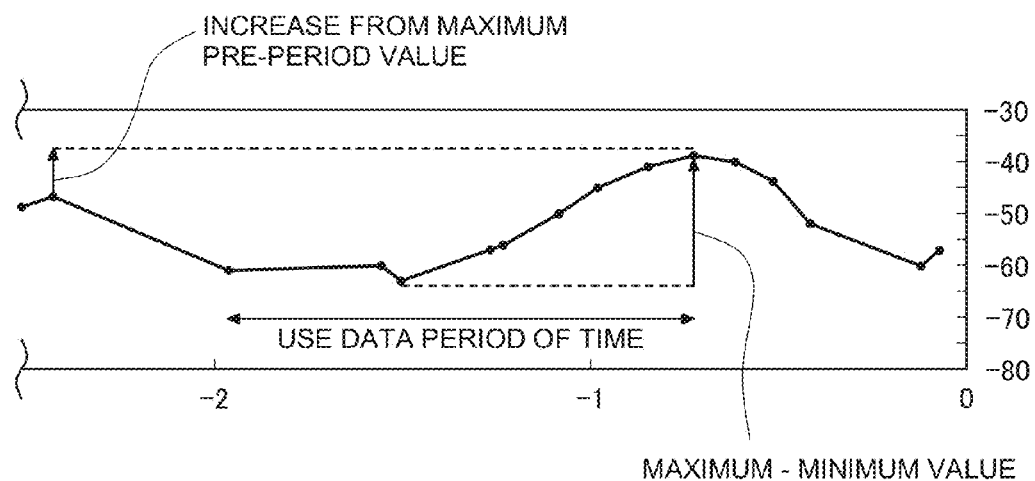
FIG. 14A is a graph for describing a use data period of time, maximum received radio wave strength value, a minimum received radio wave strength value, and a maximum pre-period value.

A maximum value during the use data period of time is acquired from a mountain peak of the second half of the use data period of time, and a minimum value is acquired from a mountain foot portion of the first half as illustrated in FIG. 14A.

Further, it is possible to set a maximum pre-period value acquisition period of time, and by increasing a value of this period of time, it is possible to strictly perform movement determination. In other words, as illustrated in FIG. 14A, the maximum value is typically a value increased from the maximum pre-period value by a predetermined value.

In this embodiment, there are the following filters as an example of the individual static tag filter. In other words, (1) Quick-read filter (the number of readings per second is less than a threshold value during the use data period of time), (2) RSSI absolute value filter (a maximum RSSI (maximum received radio wave strength) is less than a threshold value), (3) RSSI non-contiguous increase filter ("maximum–minimum RSSI (received radio wave strength)" is less than a threshold value), (an occurrence rate of a point at which RSSI (received radio wave strength) (t)> received radio wave strength (t−1) or a point at which RSSI (received radio wave strength) (t)<received radio wave strength (t+1) is less than a threshold value), (4) RSSI valley-shaped filter (RSSI (valley): a value increased from the maximum pre-period received radio wave strength is less than a threshold value), (5) Excess read filter (reading is being performed even when X seconds elapses after a movement candidate is determined (+X seconds are required until movement determination)), (6) Phase shift reduction filter (a checking amount calculated based on a change in a phase during a period of time is less than a threshold value)

In the quick-read filter of (1), during the use data period of time, the number of readings per second is less than the threshold value, and here, the number of readings per second will be described.

For the number of possible readings per second, for example, in radio parameters (M=4, Tari=20[usec], and BDR=320 k in the mirror sub carrier scheme of the ISO/IEC18000-6C standard) of a certain RFID tag, the number of readings per second per RFID tag is measured by actually performing reading while changing the number of RFID tags. A graph at this time is a solid line illustrated in FIG. 4. This can be approximated to determination coefficients 0.9987 and 0.9954 at a high degree of accuracy by a polynomial curve (y=0.236x$^2$−5.3339x+46.974) illustrated by a dotted line when the number of tags is 10 or less and a power curve (y=133.34x$^{-0.8605}$) when the number of tags is larger than 10.

Even when other radio parameters are used, similarly, it is possible to obtain an approximate function (x), and it is possible to calculate the number of possible readings per second per tag based on radio parameters being used and the number of tags being read. When N antennas (N is 1 or more) are used, a numerical number calculated by f (x/N)/N can be used as the number of possible readings per second. A value obtained by multiplying the number of possible readings per second by a set rate can be used as a threshold value of the number of readings per second.

In the RSSI absolute value filter of (2), the maximum RSSI (maximum received radio wave strength) is less than the threshold value, and here, the received radio wave strength will be described.

For the received radio wave strength, a theoretical value of the received radio wave strength from an RFID tag received by the RFID reader 10 is expressed by the following Formula (1).

[Equation 3]

$$P_{RX,reader}=P_{TX,reader} \cdot G^2_{reader} \cdot G^2_{tag} \cdot T_b \cdot (\lambda/4\pi r)^4 \quad \text{Formula (1)}$$

$P_{RX, reader}$ Received radio wave strength
$P_{TX, reader}$ Reader transmission output
$G_{reader}$ Transmitting antenna gain
$G_{reader}$ Receiving antenna gain
$G_{tag}$ Tag antenna gain
$T_b$ Loss when tag is reflected
$\lambda$ Wavelength
$\gamma$ Distance between tag and reader Formula 1 can be expressed as in Formula 2 using dBm,

[Equation 4]

$$10 \log(P_{RX,reader}/1 \text{ mW})=10 \log(P_{TX,reader}/1 \text{ mW})+ 10 \log T_b+20 \log G_{reader}+20 \log G_{tag}+40 \log(\lambda/4\pi r) \quad \text{Formula (2)}$$

Figure 13B:
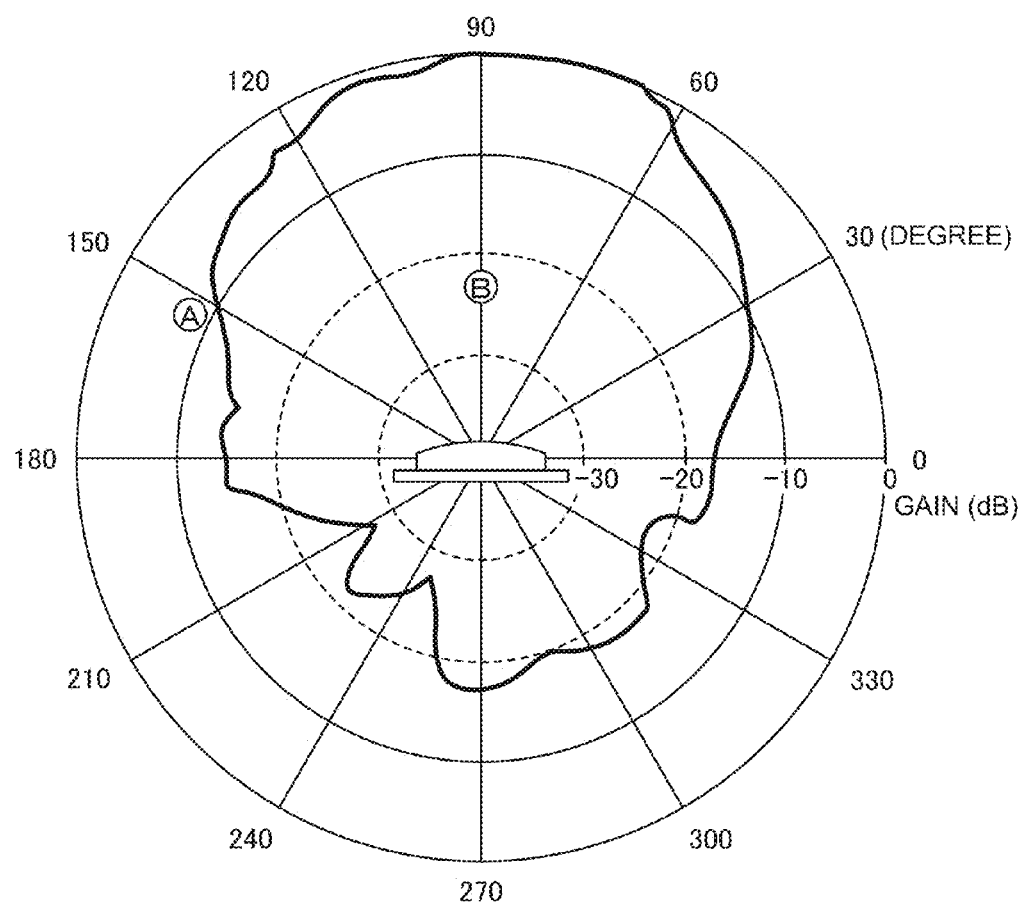
FIG. 13B is an explanatory diagram illustrating a radio wave radiation pattern of a general RFID antenna.

Here, the antenna 20 typically has a radio wave radiation pattern illustrated in FIG. 13B, and when a point A of FIG. 13B is compared with a point B in front of the antenna 20, a straight line distance is ½, and the received radio wave strength is +12 dB. As illustrated in FIG. 13B, when a tag moves from the point A to the point B, the received radio wave strength increases by 20 dB since a coefficient of log $G_{reader}$ is 20. When a value based on the above-described distance is added, a large difference of 32 dB continuously occurs with a tendency.

Meanwhile, a reflective wave and a diffracted wave caused by a floor, a ceiling, furniture, or the like as well as a direct wave exist between the antenna 20 and a tag, and such waves interfere with one other, and multi-path fading occurs. The multi-path fading is known to be modeled by the Nakagami-Rice distribution (the direct wave is stronger in strength than the reflective wave or the diffracted wave) or the Rayleigh distribution (strength of the direct wave is weak), and probability density functions thereof are expressed as in Formulas (3) and (4).

Nakagami-Rice Distribution:

$$f(r) = \frac{r}{\sigma^2}\exp\left(-\frac{r^2+a^2}{2\sigma^2}\right)I_0\left(\frac{ar}{\sigma^2}\right) \quad \text{[Equation 5]}$$

($I_0$:0-order modified Bessel function)  Formulas (3)

Here, $K=a^2/2\sigma^2$ is a ratio of average direct wave power ($a^2/2$) and average scattered wave power ($\sigma^2$). r is a signal amplitude.

Rayleigh Distribution:

[Equation 6]

$$f(r) = \frac{r}{\sigma^2}\exp\left(-\frac{r^2}{2\sigma^2}\right) \quad \text{Formula (4)}$$

Figure 15A:
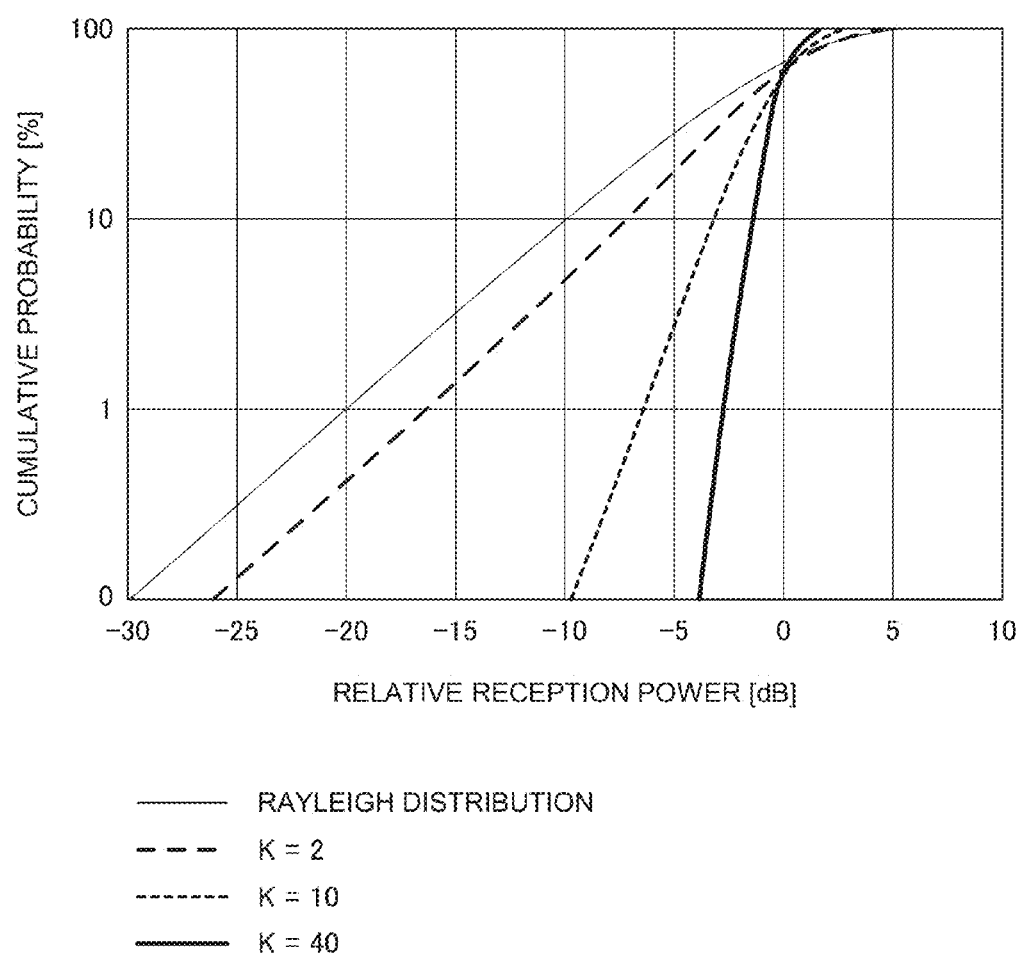
FIG. 15A is a graph illustrating cumulative probability distributions of various kinds of K distributions and a Rayleigh distribution of a Nakagami-Rice distribution and a relation between a cumulative probability and relative reception power.

Cumulative probability distributions of various kinds of K distributions and the Rayleigh distribution of the Nakagami-Rice distribution are obtained as illustrated in FIG. 15A.

Figure 15B:
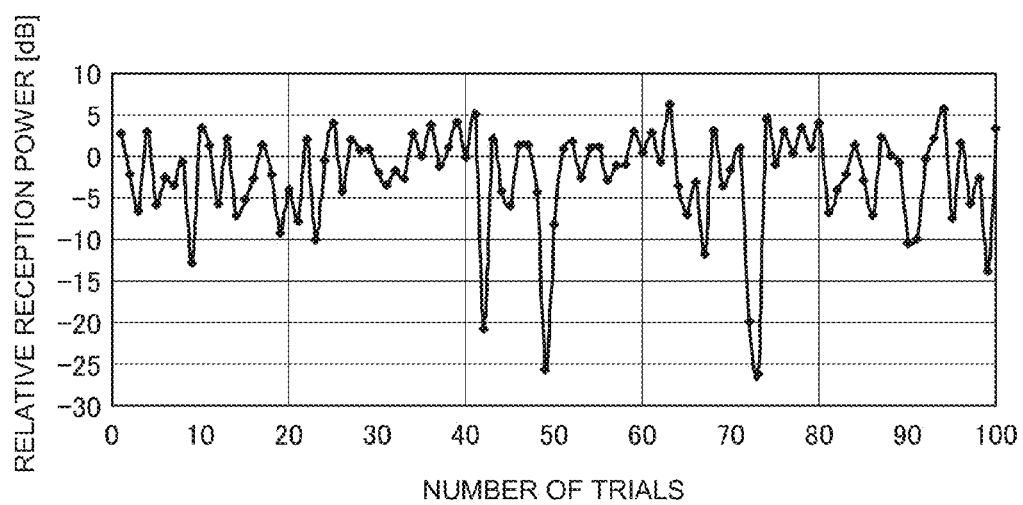
FIG. 15B is a graph illustrating a Rayleigh fading simulation and a relation between relative reception power and the number of trials.

Since the direct wave is dominant, the RFID tag that moves in front of the antenna 20 has the Nakagami-Rice distribution (K=10 or K=40), and in this case, it can be understood that a variation in the received radio wave strength is much smaller than that occurring due to the above-described distance or the antenna radiation pattern. Further, FIG. 15B is a graph obtained by simulating a change in the received signal strength when fading occurs for a static tag as a person or an object passes through in front of an antenna by the Rayleigh distribution, and it can be understood that a large difference of the received signal strength may occur, but the change hardly occurs continuously with a tendency.

From the above, it can be understood that the above-described technique (various kinds of arithmetic or statistical techniques of determining an overall mountain shape and a rising part thereof such as goodness of fit determination with a linear or non-linear curve, a difference between a maximum strength value and a minimum value, and a proportion of a point rising from a previous point in chronological order) is effective as the moving tag identification technique.

In the RSSI non-contiguous increase filter of (3), the "maximum–minimum RSSI (received radio wave strength)" is less than a threshold value, and an occurrence rate of a point at which RSSI (received radio wave strength) (t)> received radio wave strength (t−1) or a point at which RSSI (received radio wave strength) (t)< received radio wave strength (t+1) is less than a threshold value.

In the RSSI valley-shaped filter of (4), a value increased from the maximum pre-period received RSSI (radio wave strength) is less than a threshold value.

Figure 14B:
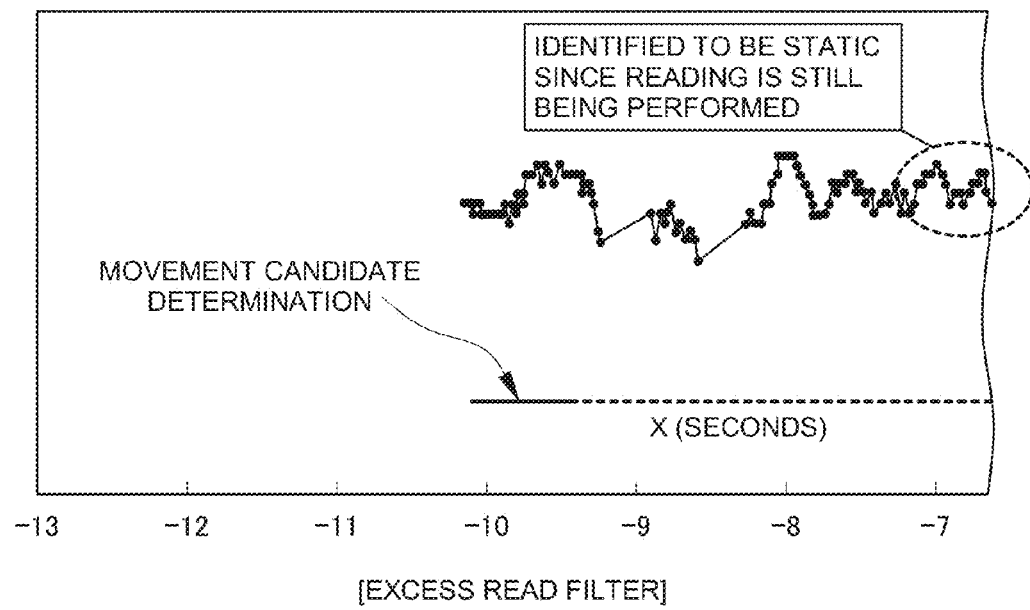
FIG. 14B is an explanatory diagram illustrating an excess read filter.

In the excess read filter (5), reading is being performed even when X seconds elapses after a movement candidate is determined (+X seconds are required until movement determination). This is illustrated in a graph illustrated in FIG. 14B.

In the phase shift reduction filter of (6), a checking amount calculated based on a change in a phase during a period of time is less than a threshold value, and here, a phase will be described.

The phase may be expressed as in the following Formula (5).

[Equation 7]

$$\theta = 2 \cdot \pi \cdot \left(\frac{2r}{\lambda}\right) + \theta_T + \theta_R + \theta_{TAG}$$ Formula (5)

In Formula (5), the following three terms can be regarded to be constant during a period of time in which the movement determination is performed.

$\theta_T$: a phase that varies when a radio wave is transmitted from a reader $\theta_R$: a phase that varies when a tag response wave is received by a reader $\theta_{TAG}$: a phase that internally varies at the time of tag response Since a wavelength ($\lambda$) is decided according to a use frequency, a phase $\theta$ becomes a function having only a distance (r) between a reader and a tag and also becomes a periodic function by obtaining a remainder at $2\pi$)(360°).

An example using the middle ware will be more concretely example. In order to receive information of an RFID being moving, MovedTagReportHandler is set such that IsPickMovedTag and SyncLocalTime are set to true. Further, a SessionOn property is not set.

In order to receive all read RFID tags without distinguishing "static" and "moving" from each other, a TagReportHandler delegate of the middle ware (nice middle) is set as well.

As a delegate of this embodiment, there is MovedTagReportHandler (MovedTagData), and this represents a method of processing OnMovedTagReport event of LLRPAgent.

For an LLRPAgent class, when an event is a name such as OnMovedTagReport, a delegate is vedTagReportHandler, and information of a moved tag is transferred in the form of MovedTagData.

As public properties, there are IsPickMovedTag and SyncLocalTime, true is set when moving tag information is acquired from the middle ware (nice middle).

The public properties are described based on differences between information (MovedTagData) of an RFID tag being moving and RFID tag information (TagData) in the middle ware (nice middle).

TABLE 2

Public properties (bold characters represent different points with TagData)

| | Name | Description |
|---|---|---|
| 1 | Epc | EPC |
| 2 | CRC | CRC-16 region of tag |
| 3 | PCBits | PC region of tag |
| 4 | Reader Ip | IP address of reader |
| 5 | Antenna Id | Antenna number |
| 6 | Rssi | Maximum RSSI during use data period of time |
| 7 | Moved Time | Use data period of time (seconds) |
| 8 | Read Time Start | First tag reading time during use data period of time |
| 9 | Read Time End | Last tag reading time during use data period of time |
| 10 | Read Count | Number of readings during use data period of time |
| 11 | Read Rate Ratio | Ratio of number of readings per second during use data period of time |
| 12 | Rssi Diff | Maximum - minimum RSSI during use data period of time |
| 13 | Rssi Increased Ratio | RSSI increase occurrence rate |
| 14 | Rssi Diff Previous | Maximum RSSI during use data period of time - maximum pre-period RSSI |
| 15 | Phase Info_4 | Phase waggling |
| 16 | Phase Info_10 | Horizontal (0) vertical (90) movement type determined during use data period of time |

Next, a sample source will be described. The following bold characters are added to a source code of the middle ware.

```
using mightycard.rfid.llrpmw;
try{
.
.
llrpAgent.OnErrorReport    +=new    ErrorReportHandler
(llrpAgent_OnErrorReport);
    setting for using //→moving tag identifying engine
    llrpAgent.IsPickMovedTag = true;
    llrpAgent.SyncLocalTime = true;
    llrpAgent.OnMovedTagReport    +    =    new
MovedTagReportHandler (llrpAgent_OnMovedTagReport);
    setting for using //←moving tag identifying engine
.
.
}catch (Exception e)
MessageBox.Show (e.Message)
}
//OnMovedTagReport event processing function
void llrpAgent_OnMovedTagReport (MovedTagData tagData)
{
    MessageBox.Show ("this tag has been moved: " +
tagData.Epc)
. . .
}
```

Figure 29:
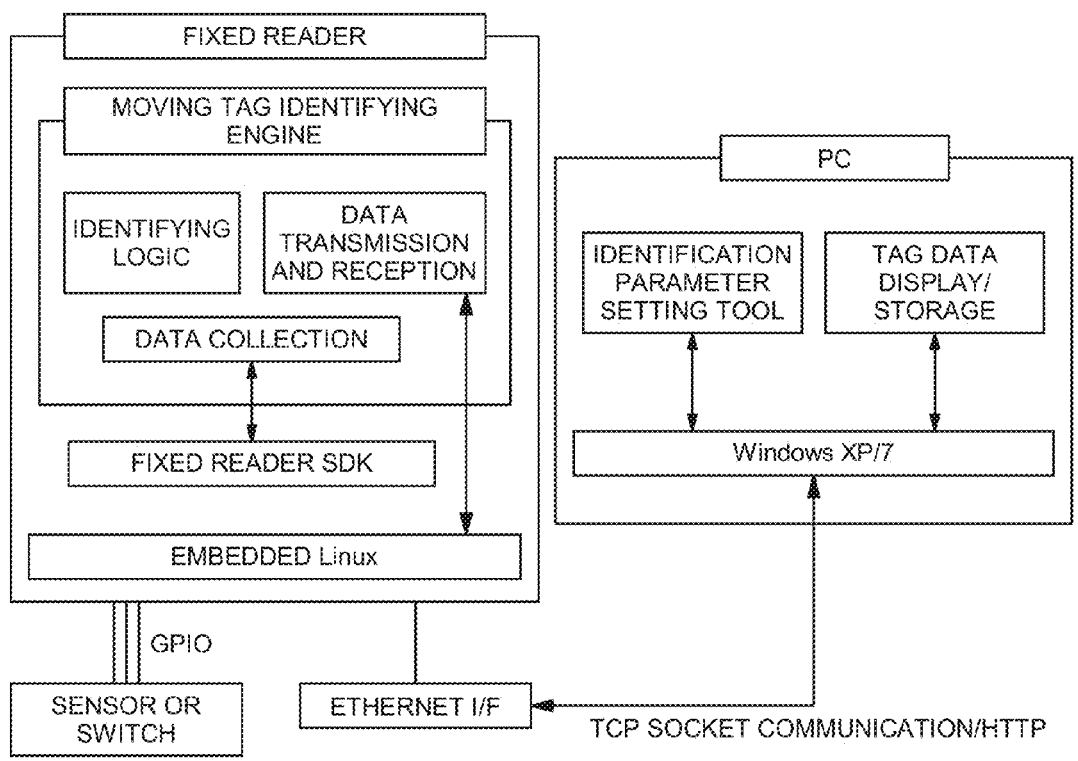
FIG. 29 is an explanatory diagram illustrating another example of a configuration used in an RFID tag movement distinguishing method and an RFID tag movement distinguishing program.

In addition, there is also a type in which the "moving tag identifying engine" operates on Linux OS (a trademark) in the RFID reader, and the identification parameter setting tool operates on the computer device C as illustrated in FIG. 29. In this case, as the LLRP middle ware is not used, the moving tag identifying engine acquires information of an RFID tag directly from an SDK of the RFID reader.

As described above, it is possible to operate the "moving tag identifying engine" on Linux OS (a trademark) in the RFID reader.

Figure 28:
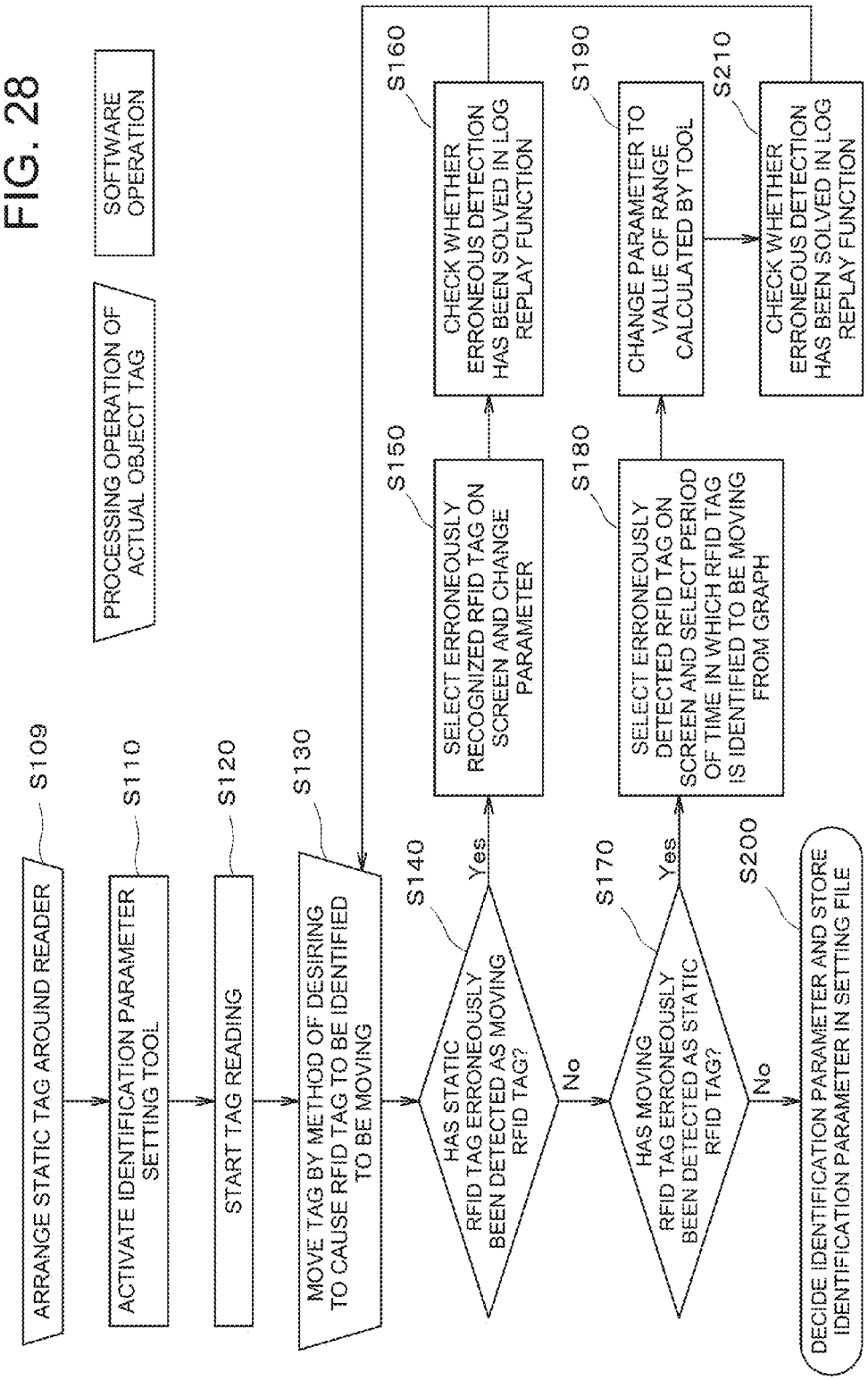
FIG. 28 is a flowchart of changing and setting a parameter.

Next, a parameter adjustment process of the identification parameter setting tool will be described with reference to a flowchart of FIG. 28.

First, in step S109, a static RFID tag is arranged around an RFID tag reader. At this time, the RFID tag is arranged at the position assumed in the actual environment. For example, when an antenna is installed at an anti-theft gate of a selling area, a setting tool is used in an environment in which products with an RFID tag are placed on a shelf closest to the antenna.

Next, in step S110, a process of activating the identification parameter setting tool is performed by an operation means (not illustrated). Then, in step S120, identification parameter retention file stored in a storage device of the computer device C or the like is read, and a process of starting reading of an RFID tag using the moving tag identifying engine (and the middle ware "nice middle") is performed.

In step S130, an RFID tag is moved by a method of desiring to cause the RFID tag to be identified to be moving in the environment in which the static tags are arranged therearound.

Here, the "environment in which the static tags are arranged therearound" means that RFID tags are arranged at the positions assumed in the actual environment. For example, as described above, when the antenna 20 is installed at the anti-theft gate of the selling area, the setting tool is used in the environment in which the products with the RFID tag are placed on the shelf closest to the antenna 20.

Further, a "case in which it is desired to cause an RFID tag to be identified as moving" is a case of moving a reading target object with an RFID tag in front of the antenna 20 by an actual moving method (a forklift operation or a person's walking). An RFID tag is moved by a method having a reading condition more difficult than a normal condition (for example, high-speed movement in a place nearby the antenna 20, low-speed movement in a place distant from the antenna 20, a case in which an RFID comes in contact with and is hidden by claws of a fork, or a case in which a plurality of RFID tags are hidden in a bag), and in this state, by adjusting parameters, parameters that can be sufficiently identified to be moving are obtained in case of normal movement.

At this time, in step S140, it is determined whether a static RFID tag has erroneously been detected as a moving RFID tag. When a static RFID tag has erroneously been detected as a moving RFID tag (Yes in step S140), in step S150, an erroneously recognized RFID tag is selected on the screen, and the parameter is changed. Then, in step S160, the replay function is activated, and it is checked whether the erroneous detection has been solved. Then, the process returns to step S130.

Meanwhile, when it is determined in step S140 that a static RFID tag has not erroneously been detected as a moving RFID tag (No in step S140), in step S170, it is determined whether a moving RFID tag has erroneously been detected as a static RFID tag. When it is determined in step S170 that a moving RFID tag has erroneously been detected as a static RFID tag (Yes in step S170), in step S180, an erroneously detected RFID tag is selected on the screen, and a period of time in which an RFID tag is identified to be moving is selected from the graph. Then, in step S190, the process of changing the parameter to the value of the range calculated by the tool is performed. After this process, in step S210, the replay function is activated, and it is checked whether the erroneous detection has been solved. Then, the process returns to step S130.

Further, when it is determined in step S170 that a moving RFID tag has not erroneously been detected as a static RFID tag (No in step S170), in step S200, the process of deciding the identification parameter and storing the identification parameter in the setting file is performed.

Next, reception and shipment checking in a warehouse or a store, in an anti-theft gate in a store, stolen product checking in a warehouse, and inventory clearance in a warehouse will be described as an example of the present invention. A filter to be used or a parameter setting thereof differs according to the purpose or the reading environment. As another application, there is identification of baggage or products with a tag moving on a conveyor in an airport or a factory. Using a phase or Doppler information in addition to a change in the received radio wave strength, it is possible to separately read a plurality of conveyors even by a single antenna and detect a moving direction and a velocity.

First, an application example on reception and shipment checking in a warehouse or a store will be described. It is possible to check a large amount of products at a high speed by causing read target objects (apparel products such as suits or bags or electric products or articles such as televisions or mobile phones) to pass through in front of an antenna through a truck or a forklift as illustrated in FIG. 1. The features of this use lie in that a situation in which it is difficult to read due to overlapping of tags (and RSSI is low) may occur and that it is easy to perform environment control such that a non-target tag is not placed next to an antenna.

In this environment, for example, the RSSI absolute value filter is not used, and the parameters of the RSSI non-contiguous increase filter are lightly set, and thus it is possible to exclude a distant static tag through the quick-read filter or the phase shift reduction filter while detecting a tag that is difficult to read as a moving tag.

Next, an application example on an anti-theft gate in a store will be described. As illustrated in FIG. 13C, it is possible to detect that a product with a tag that has not been paid by a cash register moves in front of a gate in which an RFID antenna and a reader are incorporated and cause a buzzer to sound. In gates of a magnetic field type, it is difficult to detect when a distance between gates exceeds 1 m, but using a UHF band RFID of an electromagnetic field type, it is possible to detect at a gate width of 2 m or more. Further, it is possible to arrange an antenna in a ceiling or below a floor using characteristics of long-distance communication.

In this application, if a tag around a gate is read and a buzzer sounds when a person who did not conduct theft passes through, a customer gets upset, and a store is likely to be evaluated bad. For this reason, even when it is difficult to detect all moving tags, under the assumption that it is possible to detect all moving tags, it is possible to set a high value as threshold values of various kinds of moving filters. In order to cause a buzzer not to sound by vertical direction movement illustrated in FIG. 13C (B) while detecting horizontal direction movement illustrated in FIG. 13C (A), first, using the identification parameter setting tool, data is acquired when movement is performed in the vertical direction, and the "movement identification parameter" column is adjusted so that that movement can be identified to be "static."

In many cases, by strictly setting a filter, it is possible to identify the vertical direction as "static" while identifying the horizontal direction as "moving." However, particularly, when the vertical direction is also identified at the time of movement from the read close to the antenna to the front, it is possible to solve using the "vertical direction movement filter" of the "identification option" (setting check to ON).

Further, an application example on stolen product checking in a warehouse will be described. As the RFID antenna 20 is installed in a ceiling nearby a door as illustrated in FIG. 30, it is possible to detect that an article with a tag in a warehouse moves.

Figure 30:
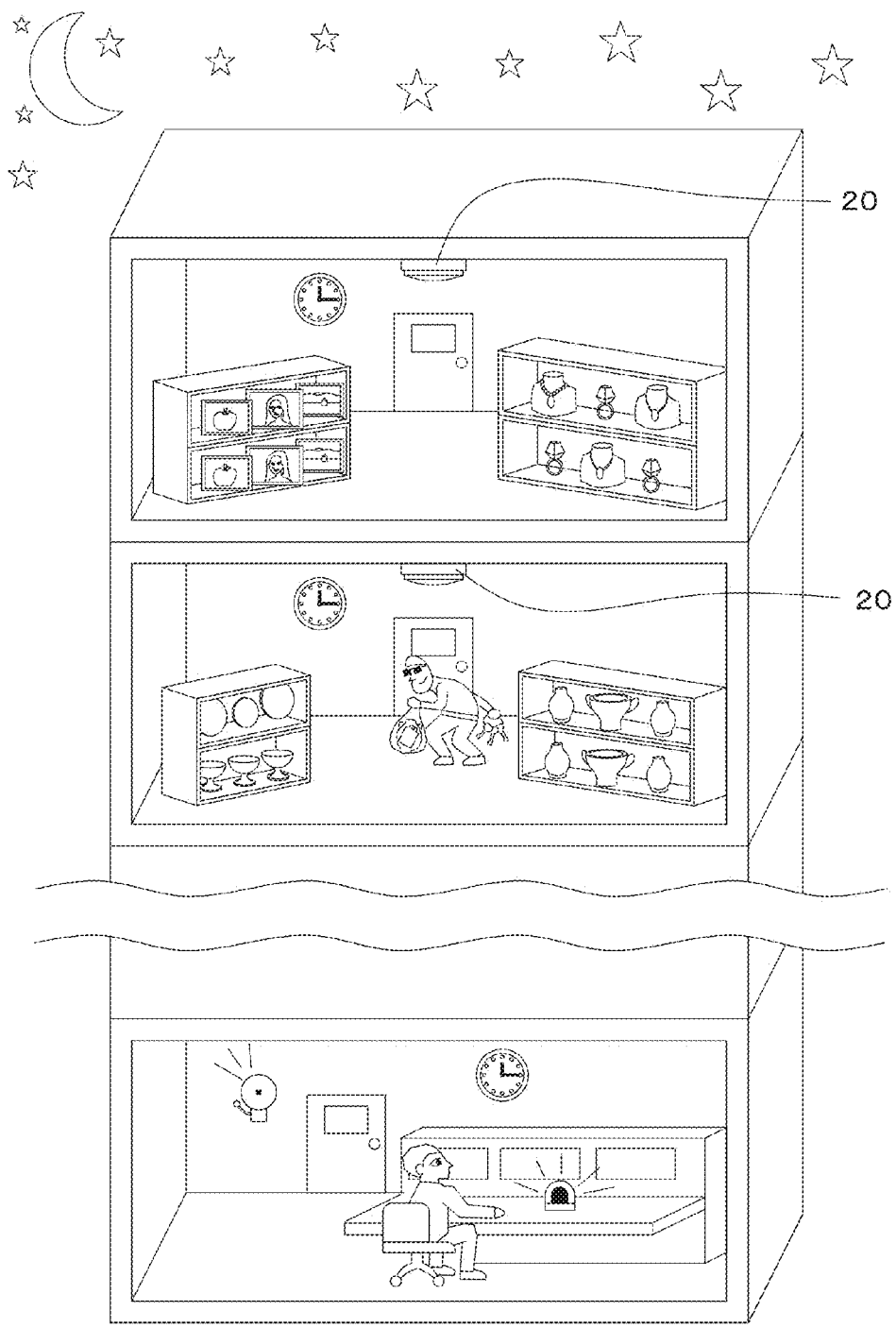
FIG. 30 is an explanatory diagram illustrating an application example on stolen product checking in a warehouse.

FIG. 30 illustrates an example of detecting that a "green vase" in a fourth floor of a warehouse is stolen in a central monitoring room in the basement. Unlike a method of monitoring by a camera or an infrared-ray (IR) sensor, it is a big feature to be able to detect in the dark or to detect a stolen article even or when hidden in a bag or the like. There are cases in which a phase waggles even by a person's movement, and a static tag is likely to be erroneously detected as moving, but by using only the phase shift reduction filter, for example, for monitoring at night at which normal people do not move in or out, it is possible to perform a broader range of entrance detection than when the RSSI non-contiguous increase filter or the like is used. After the entrance detection, it is possible to specify an article through the RSSI non-contiguous increase filter or the like.

Figure 31:
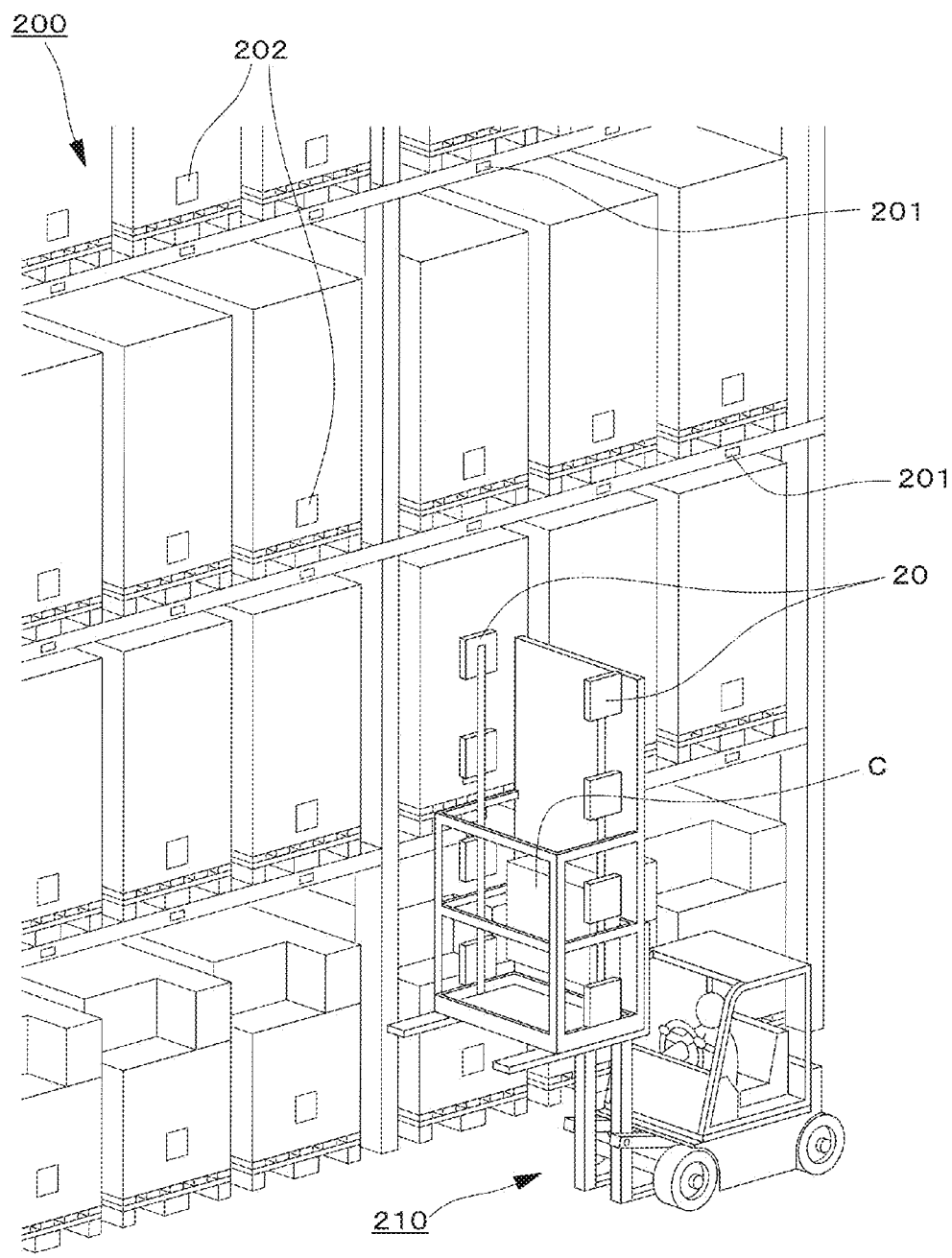
FIG. 31 is an explanatory diagram illustrating an application example on inventory clearance in a warehouse.

Next, an application on inventory clearance in a warehouse will be described. As illustrated in FIG. 31, a warehouse 200 is an existing one, and shelves are installed according to the height of an article (product) or the like. A location tag 201 configured with an RFID tag is attached to the shelf, and position information represented by the location tag 201 is obtained. Meanwhile, a product tag 202 configured with an RFID tag storing product information including a property, a quantity, or the like is attached to an article (product) stored on the shelf as well. As an automatic reading device including a control device (the computer device C) in which the antenna 20 and the RFID reader 10 are equipped is moved by a forklift 210, it becomes the same state in which a tag moves in front of a static antenna.

By appropriately setting the parameter of the RSSI non-contiguous increase filter using the fact that only RSSI of a tag that is in front of an antenna has a large mountain shape while a forklift is moving, it is possible to detect only a location tag and a product tag that are just in front of an antenna. Thus, it is possible to safely perform inventory clearance of checking products and positions thereof at a high speed. Through a wireless line, read product information, product information, position information, or association of product information (including the presence or absence thereof) and position information are transferred in real time. As the UHF band RFID that is excellent in reading at a long distance is used, it is possible to freely decide an attachment position of a tag compared to when a barcode technique is used in a device of the same type. Further, a tag can be attached to an invisible position inside a box.

REFERENCE NUMERALS

10 RFID reader
20 antenna
30 RFID tag
F static RFID tag filter
C computer device

The invention claimed is:

1. An RFID tag movement distinguishing method of identifying a moving RFID tag among a plurality of RFID tags using the plurality of RFID tags and an RFID reader that receives radio waves from the plurality of RFID tags,
    wherein the RFID reader is configured to acquire chronological read data of the plurality of RFID tags including the moving RFID tag and a static RFID tag, and a static RFID tag filter is configured based on a certain parameter to specify the static RFID tag based on information of the plurality of RFID tags read by the RFID reader, and the moving RFID tag among the plurality of RFID tags is distinguished,
    the static RFID tag filter includes a plurality of individual static RFID tag filters, each respective individual static RFID tag filter of the plurality of individual static RFID tag filters corresponds to a respective step of the following steps (1) to (6), and
    the static RFID tag filter identifies the moving RFID tag by identifying the static RFID tag and the moving RFID tag using at least the individual static RFID tag filter corresponding to step (1) of the following steps (1) to (6) of the RFID tag movement distinguishing method, comprising:
    (1) calculating a number of possible readings per second using a function having a number of tags being read as a variable, and performing identification based on a comparison with a number of readings per second read by the RFID reader, wherein the function having the number of tags being read as a variable is a power curve function or a polynomial function having the number of tags being read as an independent variable, a threshold value obtained by multiplying a calculation value calculated using the function by a predetermined rate is used as a determination criterion, and an RFID tag is identified as the static RFID tag when the number of readings per second is smaller than the determination criterion;
    (2) identifying the static RFID tag and the moving RFID tag by chronological analysis of received radio wave strength;
    (3) tracing up to a predetermined chronological data and determining whether there is another point having high received radio wave strength when chronological data of received radio wave strength of an RFID tag read by the RFID reader has a valley shape, that is, when a point having high received radio wave strength occurs, and identifying an RFID tag to be the static RFID tag when there is a point having high received radio wave strength;
    (4) identifying the static RFID tag and the moving RFID tag using at least one of a degree in which an overall mountain shape represented by the chronological data of the received radio wave strength of the RFID tag read by the RFID reader or a rising portion of the mountain shape is fit into as a linear or non-linear curve, a difference between each maximum strength value and a minimum strength value of the mountain shape, and a rate of a point increased from a previous point in chronological order in the mountain shape;
    (5) identifying the static RFID tag and the moving RFID tag by chronological analysis of a phase of a transmission carrier wave of the RFID reader and a carrier wave reflected and returned from an RFID tag; and
    (6) identifying a moving direction by comparing either of a phase inflection point of an RFID tag response and a point at which a frequency is zero (0) with at point at which a received radio wave strength peak occurs.

2. The RFID tag movement distinguishing method according to claim 1, wherein horizontal direction movement nearby an antenna is detected using one or more of the plurality of individual static RFID tag filters, but horizontal direction movement or vertical direction movement that is performed far from the antenna is not detected.

3. The RFID tag movement distinguishing method according to claim 1, wherein in the chronological analysis in the step (5), the RFID tag movement distinguishing method further comprises identifying the static RFID tag and the moving RFID tag by using at least one selected from a group consisting of setting a threshold value to a standard deviation value of a phase, a binomial test, a chi-squared test, and a G test.

4. The RFID tag movement distinguishing method according to claim 1,
wherein a start point and an end point of movement of an experimental RFID tag are selected after the experimental RFID tag is moved in advance, and a parameter is automatically calculated for the certain parameter.

5. A non-transitory computer readable medium including one or more computer executable instructions that cause a computer to:
acquire chronological read data obtained by reading a plurality of RFID tags including a moving RFID tag and a static RFID tag through an RFID reader,
specify the static RFID tag based on information of the plurality of RFID tags read through a static RFID tag filter configured based on a certain parameter, and
identify the moving RFID tag among the plurality of RFID tags, and to execute, in an arbitrary order, an individual static RFID tag filter of the static RFID tag filter including at least (1) of the following (1) to (6):
(1) calculating a number of possible readings per second using a function having a number of tags being read as a variable, and performing identification based on a comparison with a number of readings per second read by the RFID reader, wherein the function having the number of tags being read as a variable is a power curve function or a polynomial function having the number of tags being read as an independent variable, a threshold value obtained by multiplying a calculation value calculated using the function by a predetermined rate is used as a determination criterion, and an RFID tag is identified as the static RFID tag when the number of readings per second is smaller than the determination criterion;
(2) identifying the static RFID tag and the moving RFID tag by chronological analysis of received radio wave strength;
(3) tracing up to certain chronological data and determining whether there is another point having high received radio wave strength when chronological data of received radio wave strength of an RFID tag read by the RFID reader has a valley shape, that is, when a point having high received radio wave strength occurs, and identifying an RFID tag to be the static RFID tag when there is a point having high received radio wave strength;
(4) identifying the static RFID tag and the moving RFID tag using at least one of a degree in which an overall mountain shape represented by the chronological data of the received radio wave strength of the RFID tag or a rising portion of the mountain shape is fit into as a linear or non-linear curve, a difference between each maximum strength value and a minimum value of the mountain shape, and a rate of a point increased from a previous point in chronological order in the mountain shape;
(5) identifying the static RFID tag and the moving RFID tag by chronological analysis of a phase of a transmission carrier wave of the RFID reader and a carrier wave reflected and returned from an RFID tag; and
(6) identifying a moving direction by comparing either of a phase inflection point of an RFID tag response and a point at which a frequency is zero (0) with at point at which a received radio wave strength peak occurs.

* * * * *